United States Patent [19]
Sacks et al.

[11] Patent Number: 5,526,288
[45] Date of Patent: Jun. 11, 1996

[54] MULTIPLE CHANNEL DISCRETE TO DIGITAL INTERFACE

[75] Inventors: Stephen Sacks, Melville; Cliff Weber, Center Moriches; Barry E. Becker, Smithtown, all of N.Y.

[73] Assignee: ILC Data Device Corporation, Bohemia, N.Y.

[21] Appl. No.: 148,838

[22] Filed: Nov. 5, 1993

[51] Int. Cl.$^6$ ................................................. G08B 29/06
[52] U.S. Cl. ................................ 364/551.010; 371/3.000; 324/73.100
[58] Field of Search ............................. 324/73.1; 371/3, 371/22.1, 22.4, 22.5, 22.6, 29.1; 364/551.01–551.02, 579, 580

[56] References Cited

U.S. PATENT DOCUMENTS

| | | | |
|---|---|---|---|
| 4,484,330 | 11/1984 | Moy | 371/36 |
| 4,665,390 | 5/1987 | Kern et al. | 364/551.01 |
| 5,305,325 | 4/1994 | Roos | 371/3 |
| 5,361,264 | 11/1994 | Lewis | 371/22.5 |
| 5,377,205 | 12/1994 | Shi | 371/36 |

Primary Examiner—Ellis B. Ramirez
Assistant Examiner—Craig Steven Miller
Attorney, Agent, or Firm—Louis Weinstein

[57] ABSTRACT

An integrated circuit device for comparing the state of a large number of inputs (i.e. "discretes") against any one of a plurality of selectable voltage levels. The compared data is examined in a 3×3 matrix format. In a redundant mode, comparators are utilized in a triple-redundant configuration to obtain a consensus on input states, at three successive time intervals, raising a flag when consensus fails. Inputs, whether in a redundant or non-redundant mode are distributed along three different sides of a rectangular-shaped substrate to prevent catastrophic mechanical failures. In the redundant mode, discretes are compared using a voting technique such that when all three levels are the same, an error free status is provided, whereas a two-out-of-three vote is interpreted as correct but with an indication that the discrete being monitored requires further checking. Data, fault and self-test results are made available to the outside world by a serial transmitter and in parallel form by discrete output terminals. Output data is compared with data inputted for further assuring integrity of the device. Output data is selectable in either an eight bit or sixteen bit tri-state port, which is addressable for channel data, status, bounds, mismatch, built-in self-test and major fault information.

40 Claims, 59 Drawing Sheets

| ARINC 429 BITS: | PAR | 98M | MSB | 16 BIT DATA | | | | | | | | | | | | | LSD | F | C | 901 | LSB | LSD | | | | MSD |  |
|---|---|---|---|---|---|---|---|---|---|---|---|---|---|---|---|---|---|---|---|---|---|---|---|---|---|---|---|
| | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | |
| TRIPLE BOUNCE 16: | P | A | B | D | D | D | D | D | D | D | D | D | D | D | D | D | D | D | O | F | C | O | O | 1 | O | O | O | O | O | O | O | 001 |
| TRIPLE BOUNCE 32: | P | A | B | D | D | D | D | D | D | D | D | D | D | D | D | D | D | D | O | F | C | O | O | O | 1 | O | O | O | O | O | O | 002 |
| MISMATCH 16: | P | A | B | D | D | D | D | D | D | D | D | D | D | D | D | D | D | D | O | F | C | O | O | 1 | 1 | O | O | O | O | O | O | 003 |
| MISMATCH 32: | P | A | B | D | D | D | D | D | D | D | D | D | D | D | D | D | D | D | O | F | C | O | O | O | O | 1 | O | O | O | O | O | 004 |
| BIT 16: | P | A | B | D | D | D | D | D | D | D | D | D | D | D | D | D | D | D | O | F | C | O | O | 1 | O | 1 | O | O | O | O | O | 005 |
| BIT 32: | P | A | B | D | D | D | D | D | D | D | D | D | D | D | D | D | D | D | O | F | C | O | O | O | 1 | 1 | O | O | O | O | O | 006 |
| TRIPLE FAULT 16: | P | A | B | D | D | D | D | D | D | D | D | D | D | D | D | D | D | D | O | F | C | O | O | 1 | 1 | 1 | O | O | O | O | O | 007 |
| TRIPLE FAULT 32: | P | A | B | D | D | D | D | D | D | D | D | D | D | D | D | D | D | D | O | F | C | O | O | O | O | O | 1 | O | O | O | O | 010 |
| TRIPLE DATA 16: | P | A | B | D | D | D | D | D | D | D | D | D | D | D | D | D | D | D | O | F | C | O | O | 1 | O | O | 1 | O | O | O | O | 011 |
| TRIPLE DATA 32: | P | A | B | D | D | D | D | D | D | D | D | D | D | D | D | D | D | D | O | F | C | O | O | O | 1 | O | 1 | O | O | O | O | 012 |
| TEST 5' 9: | P | 1 | O | O | 1 | O | 1 | O | 1 | O | 1 | O | 1 | O | 1 | O | 1 | O | O | F | C | O | O | 1 | 1 | O | 1 | O | O | O | O | 013 |
| TEST A' 9: | P | 1 | O | 1 | O | 1 | O | 1 | O | 1 | O | 1 | O | 1 | O | 1 | O | O | O | F | C | O | O | O | O | 1 | 1 | O | O | O | O | 014 |

A B = 0 0 IF NO MAJOR FAULTS
A B = 1 1 IF MAJOR FAULT EXISTS (DATA IS BAD)
C = 0 WHEN 429 DATA RATE IS 100KPBS; C = 1 WHEN 429 DATA RATE IS 12.5 KBPS
D = DATA BIT
F = 1 IF THE DISCRETE INTERFACE OUTPUT HAS ANY MAJOR FAULT (429 DATA MAY STILL BE GOOD)
P = ARINC 429 PARITY BIT
THE 12 WORDS ARE TRANSMITTED IN ORDER SHOWN FROM TOP TO BOTTOM

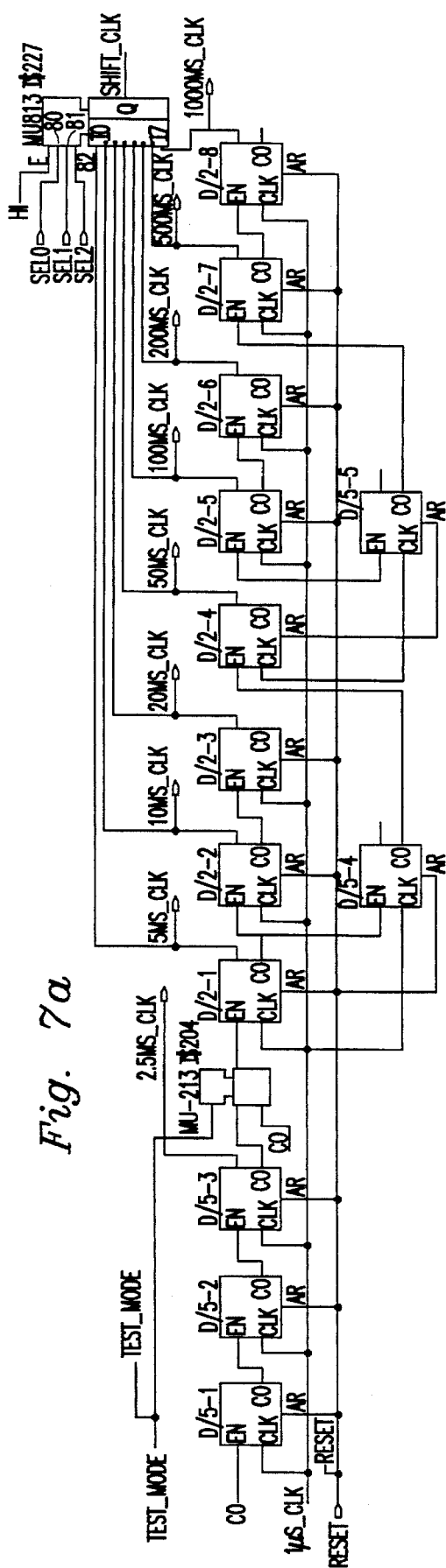
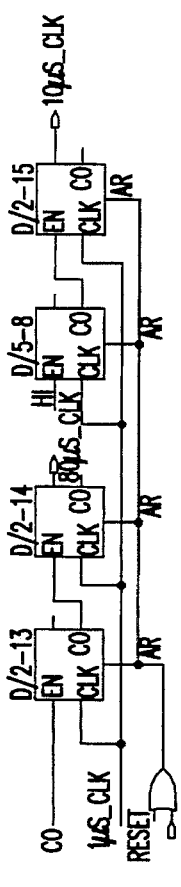
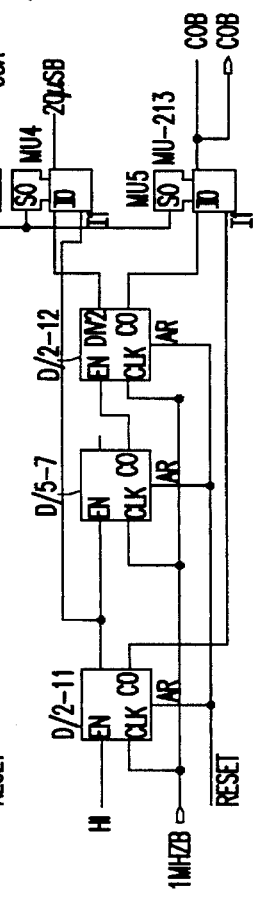
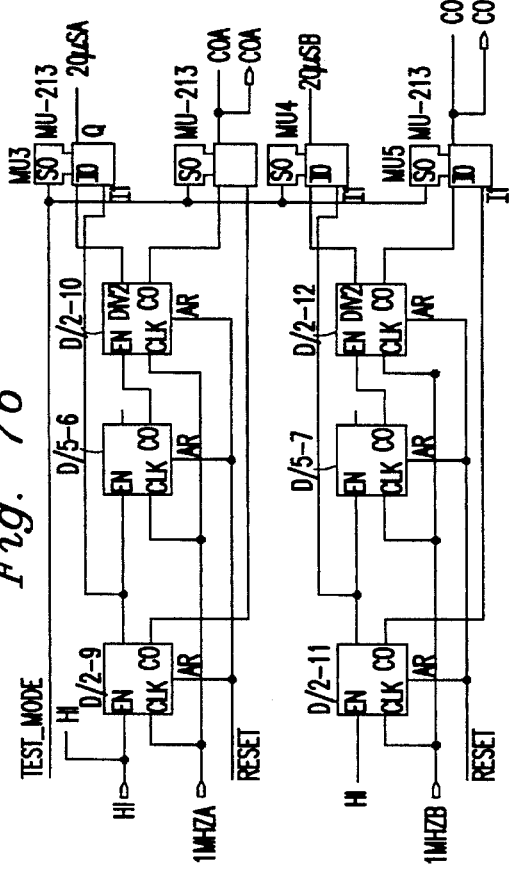
Fig. 7a
Fig. 7b
Fig. 7c

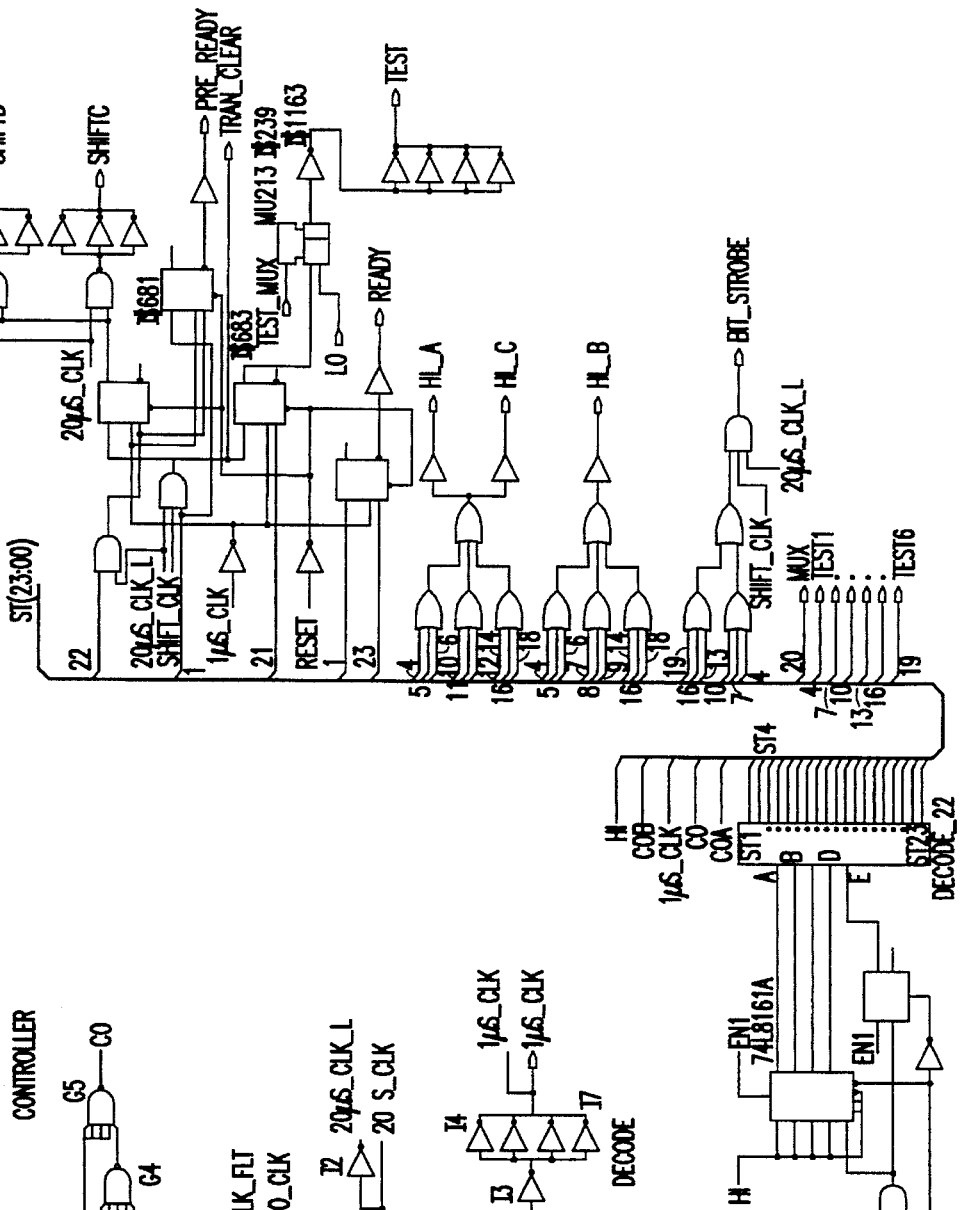
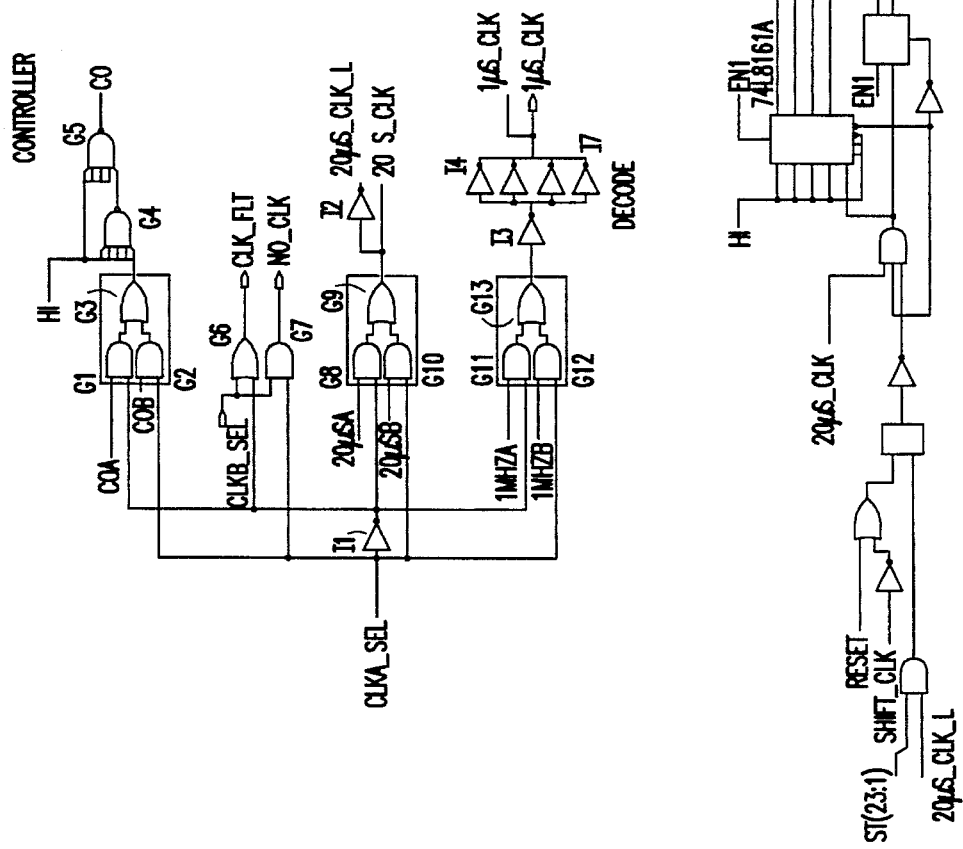
Fig. 7e
Fig. 7d

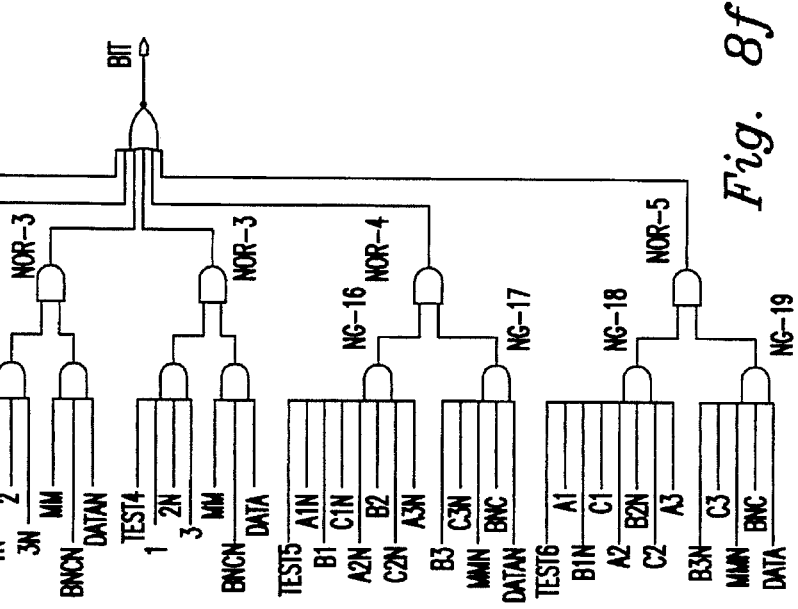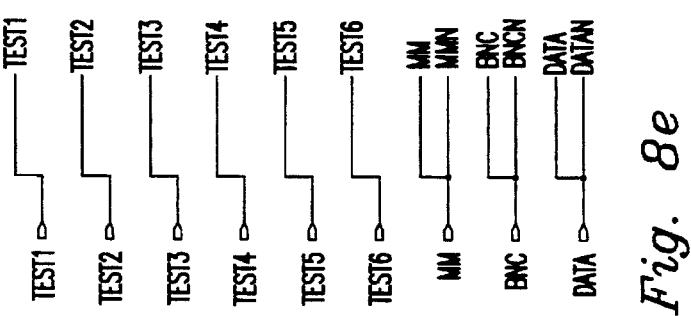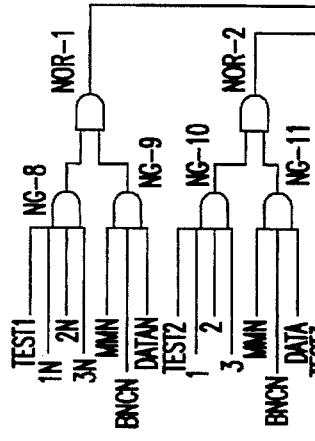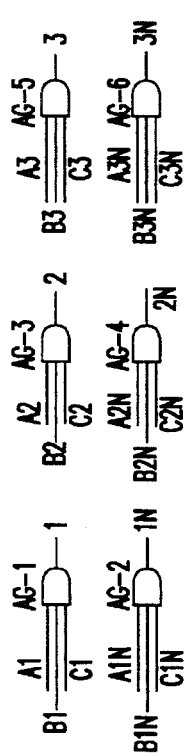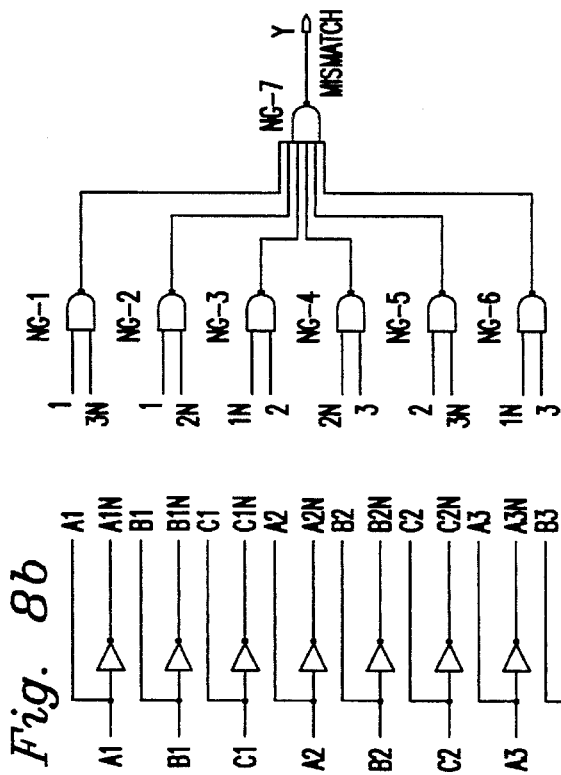

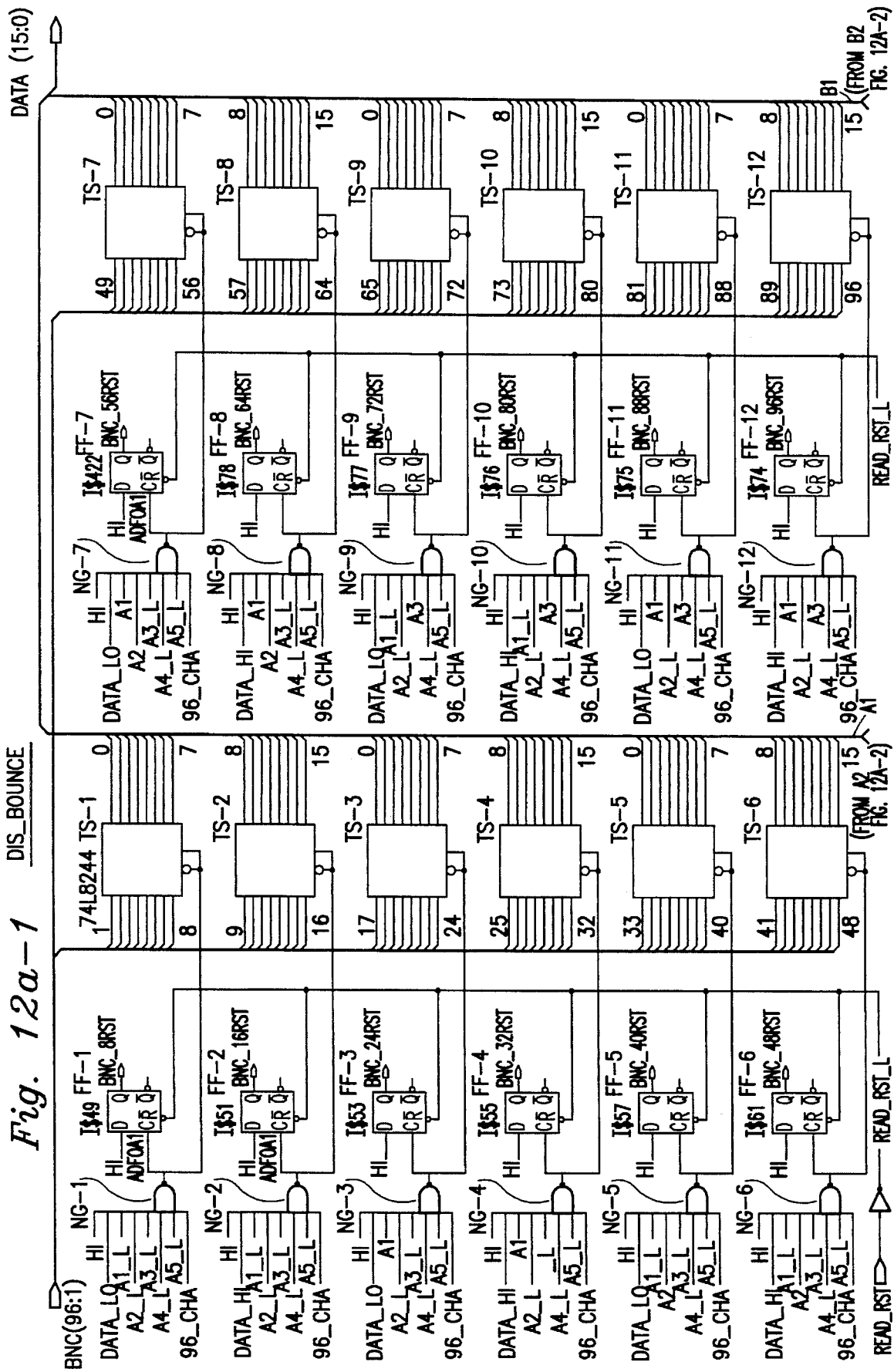

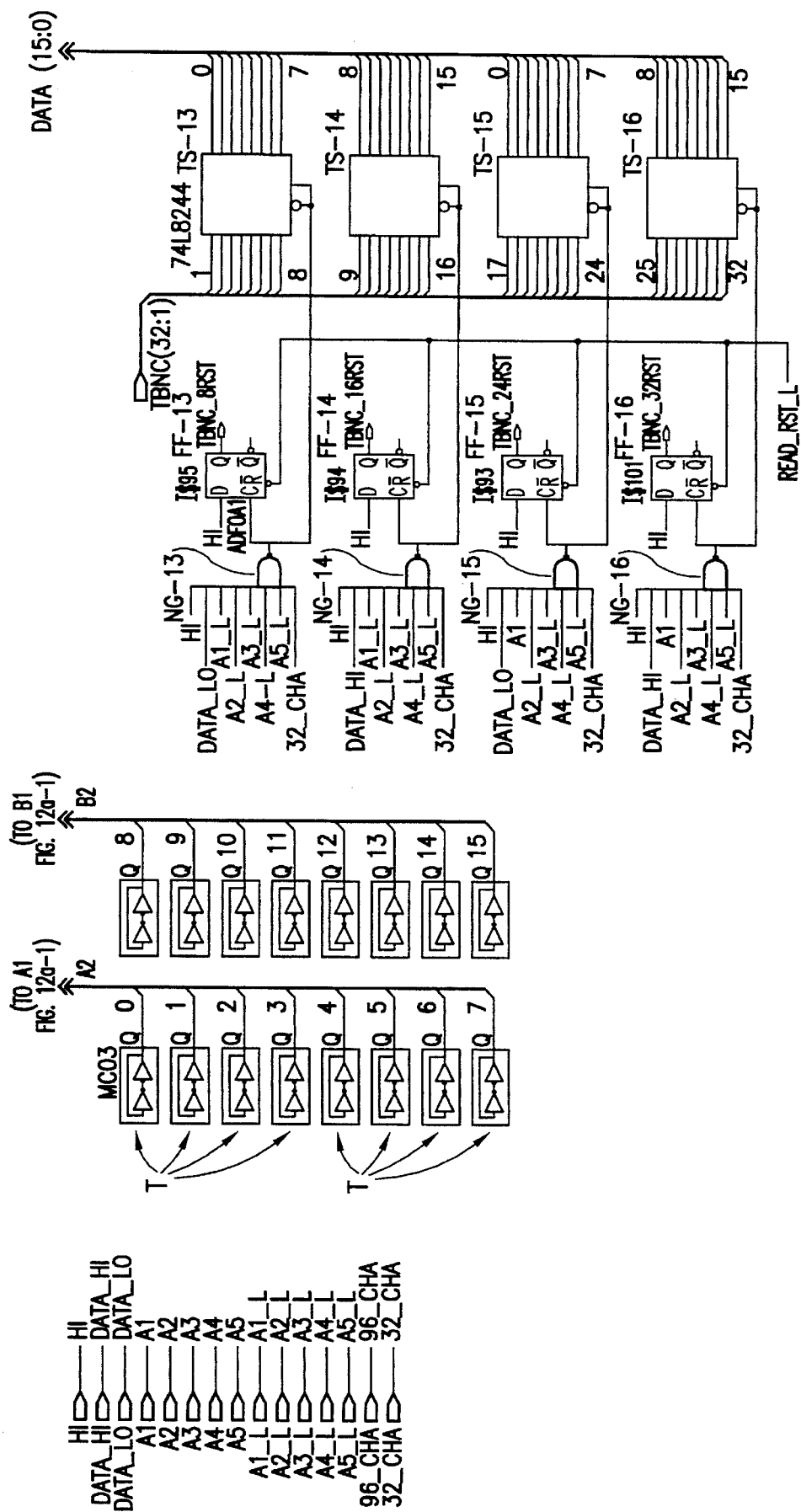
Fig. 12a-2    DIS_BOUNCE

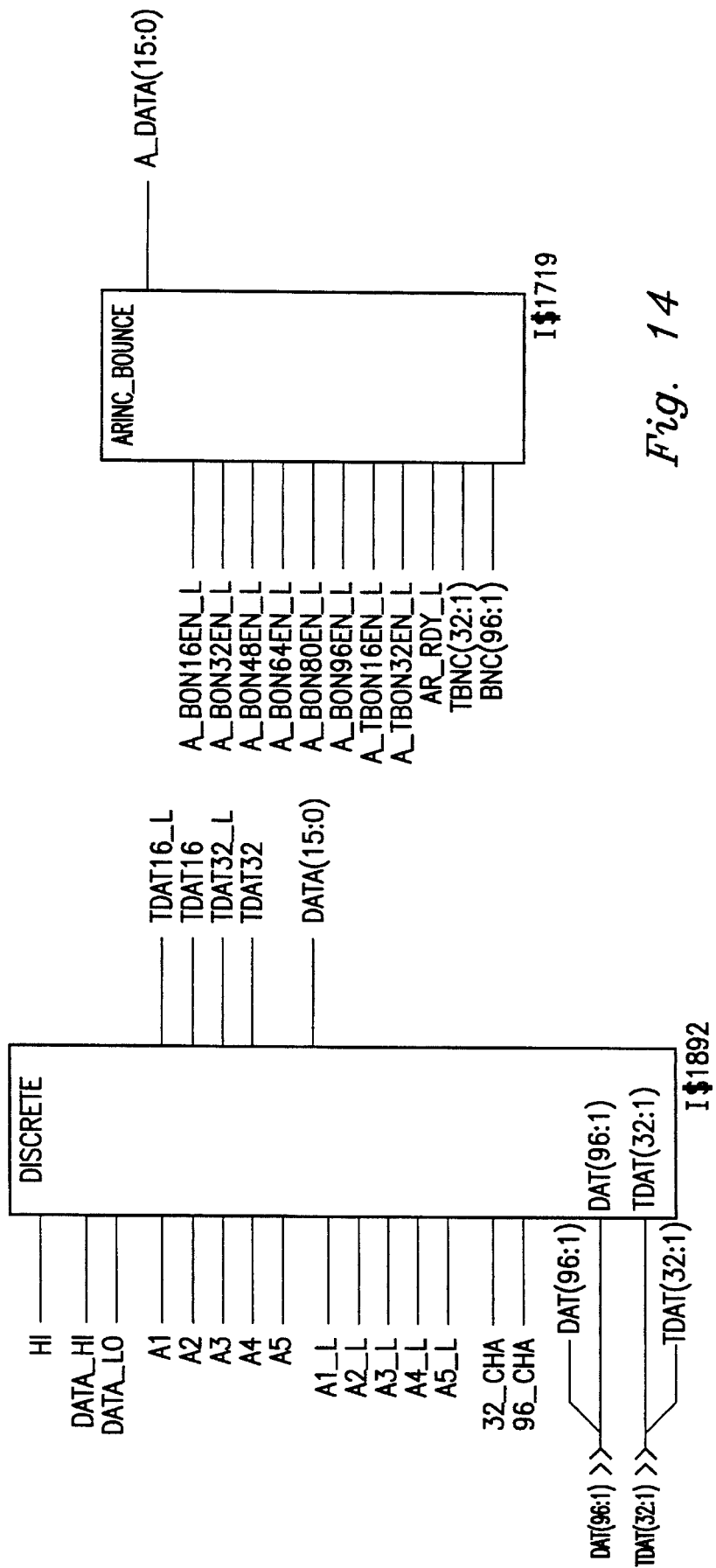

ARINC-BOUNCE

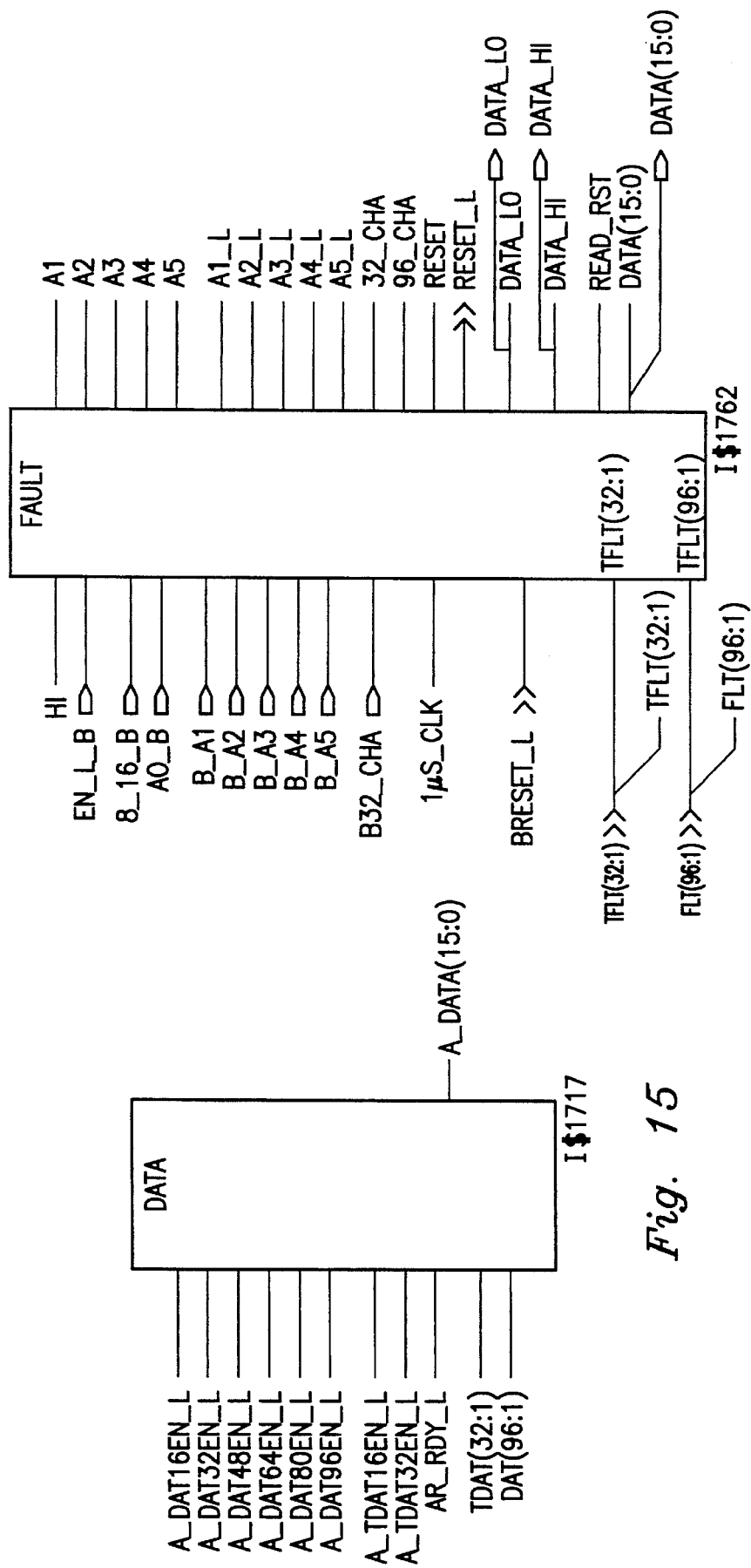

DIS-MISMATCH

A1 ▷—— A1
A2 ▷—— A2
A3 ▷—— A3
A4 ▷—— A4
A5 ▷—— A5
A1_L ▷—— A1_L
A2_L ▷—— A2_L
A3_L ▷—— A3_L
A4_L ▷—— A4_L
A5_L ▷—— A5_L
DATA_HI ▷—— DATA_HI
DATA_LO ▷—— DATA_LO
32_CHA ▷—— 32_CHA
96_CHA ▷—— 96_CHA
HI ▷—— HI
NO_CLK ▷—— NO_CLK
ARINC_FLT ▷—— ARINC_FLT
DISC_FLT ▷—— DISC_FLT
BIT_FLT ▷—— BIT_FLT
DISTRN_FLT ▷—— DISTRN_FLT
ARINC_READY ▷—— ARINC_READY

Fig. 21

| ARINC 429 BITS: | PAR 32 | 98M 31 | MSB 30 | MSB 29 | 16 BIT DATA 28 | 27 | 26 | 25 | 24 | 23 | 22 | 21 | 20 | 19 | 18 | 17 | 16 | 15 | SDI 14 | 13 | FC 12 | 11 | 10 | 9 | MSB 8 | LABEL (REVERSED OCTAL) 7 | 6 | LSD 5 | 4 | 3 | 2 | MSDB 1 | |
|---|---|---|---|---|---|---|---|---|---|---|---|---|---|---|---|---|---|---|---|---|---|---|---|---|---|---|---|---|---|---|---|---|---|
| TRIPLE BOUNCE 16: | P | A | B | D | D | D | D | D | D | D | D | D | D | D | D | D | D | D | D | O | F | C | 0 | 0 | 1 | 0 | 0 | 0 | 0 | 0 | 0 | 0 | 1 | 001 |
| TRIPLE BOUNCE 32: | P | A | B | D | D | D | D | D | D | D | D | D | D | D | D | D | D | D | D | O | F | C | 0 | 0 | 0 | 1 | 0 | 0 | 0 | 0 | 0 | 1 | 0 | 002 |
| MISMATCH 16: | P | A | B | D | D | D | D | D | D | D | D | D | D | D | D | D | D | D | D | O | F | C | 0 | 0 | 1 | 1 | 0 | 0 | 0 | 0 | 0 | 1 | 1 | 003 |
| MISMATCH 32: | P | A | B | D | D | D | D | D | D | D | D | D | D | D | D | D | D | D | D | O | F | C | 0 | 0 | 0 | 0 | 1 | 0 | 0 | 0 | 1 | 0 | 0 | 004 |
| BIT 16: | P | A | B | D | D | D | D | D | D | D | D | D | D | D | D | D | D | D | D | O | F | C | 0 | 0 | 1 | 0 | 1 | 0 | 0 | 0 | 1 | 0 | 1 | 005 |
| BIT 32: | P | A | B | D | D | D | D | D | D | D | D | D | D | D | D | D | D | D | D | O | F | C | 0 | 0 | 0 | 1 | 1 | 0 | 0 | 0 | 1 | 1 | 0 | 006 |
| TRIPLE FAULT 16: | P | A | B | D | D | D | D | D | D | D | D | D | D | D | D | D | D | D | D | O | F | C | 0 | 0 | 1 | 1 | 1 | 0 | 0 | 0 | 1 | 1 | 1 | 007 |
| TRIPLE FAULT 32: | P | A | B | D | D | D | D | D | D | D | D | D | D | D | D | D | D | D | D | O | F | C | 0 | 0 | 0 | 0 | 0 | 1 | 0 | 0 | 0 | 0 | 0 | 010 |
| TRIPLE DATA 16: | P | A | B | D | D | D | D | D | D | D | D | D | D | D | D | D | D | D | D | O | F | C | 0 | 0 | 1 | 0 | 0 | 1 | 0 | 0 | 0 | 0 | 1 | 011 |
| TRIPLE DATA 32: | P | A | B | D | D | D | D | D | D | D | D | D | D | D | D | D | D | D | D | O | F | C | 0 | 0 | 0 | 1 | 0 | 1 | 0 | 0 | 0 | 1 | 0 | 012 |
| TEST 5' 9: | P | 1 | 0 | 0 | 1 | 0 | 1 | 0 | 1 | 0 | 1 | 0 | 1 | 0 | 1 | 0 | 1 | 0 | 1 | 0 | F | C | 0 | 0 | 1 | 1 | 0 | 1 | 0 | 0 | 0 | 1 | 1 | 013 |
| TEST A' 9: | P | 1 | 0 | 1 | 0 | 1 | 0 | 1 | 0 | 1 | 0 | 1 | 0 | 1 | 0 | 1 | 0 | 1 | 0 | 0 | F | C | 0 | 0 | 0 | 0 | 1 | 1 | 0 | 0 | 1 | 0 | 0 | 014 |

A B = 0 0 IF NO MAJOR FAULTS
A B = 1 1 IF MAJOR FAULT EXISTS (DATA IS BAD)
C = 0 WHEN 429 DATA RATE IS 100KPBS; C = 1 WHEN 429 DATA RATE IS 12.5 KBPS
D = DATA BIT
F = 1 IF THE DISCRETE INTERFACE OUTPUT HAS ANY MAJOR FAULT (429 DATA MAY STILL BE GOOD)
P = ARINC 429 PARITY BIT

THE 12 WORDS ARE TRANSMITTED IN ORDER SHOWN FROM TOP TO BOTTOM

MULTIPLE CHANNEL DISCRETE TO DIGITAL INTERFACE

FIELD OF THE INVENTION

The present invention relates to a monitoring device and more particularly to a multi-channel discrete to digital interface for monitoring a plurality of discretes at a selectable variety of monitoring rates and capable of checking data accuracy, switched states and a plurality of test conditions, consensus information being provided when operating in a redundant mode.

BACKGROUND OF THE INVENTION

A number of applications exists wherein it is desirable to provide monitoring capabilities for monitoring the states of a plurality of devices, such as, for example, the states of relays, switches and the like.

For example, some very severe restrictions exist in the avionics field in which it is desired to monitor a plurality of discretes, a discrete being defined as "a separate, complete and distinct signal". Such signals are typically binary, on or off, 28 V-based signals, typically: open/ground, 28 V/open or 28 V/ground and with a very, low band width, typically of the order of DC to 200 Hz.

Although the translation of such signals to TTL-levels, which are compatible with digital avionics may seem simple, lightning and high intensity radiated fields (HIRF) and RTCA DO-160C power complicate the ability to translate such signals to TTL-levels.

Present day, conventional systems utilize tailored circuits for an interface, each interface being typically comprised of R-C input filters, divider networks, diode isolation and a comparator. Multi-channel interface to a processor requires still additional logic and latches. It is further desirable to provide a standardized, addressable and reliable interface. The resulting designs generally lack built-in test capabilities consume considerable space, typically up to one square inch per channel and offer no chip-level redundancy.

BRIEF DESCRIPTION OF THE INVENTION

The present invention achieves all of the desired objectives set forth hereinabove as well as eliminating or significantly reducing the disadvantages of conventional tailored circuitry and is characterized by comprising a multi-channel discrete interface with universal HIRF-isolated inputs having the capability of handling 28 V/open, open/ground and 28 V/ground signals. Comparators are arranged in a triple redundant configuration and are coupled to input pads arranged about three sides of a substantially rectangular-shaped substrate to reduce the effect of a catastrophic hardware fault.

The interface, in a redundancy mode takes a consensus of input states and raises a flag when consensus fails.

The interface provides a selectable 8 bit or 16 bit tri-state output port, which is addressable for channel data, status, bounce, mismatch, built-in self-test and major fault information.

The interface design specifically addresses chip level redundancy, built-in self-test autonomy, fault isolation and tolerance. Functional integration of the interface provides significant added reliability. The interface of the present invention, which is a ceramic package integrated approach has been compared against a similarly packaged discrete component implementation and a comparison of mean-time-between-failure (MTBF) calculated in accordance with a Federal Government Standard for airborne inhabited cargo environments at 64° C. indicates an order of magnitude of improvement (i.e. 1,540,000,000 hours vs. 173,000 hours). In addition, the design of the present invention results in a ceramic package of 5.3 inches as compared with a discrete component implementation occupying 32 square inches.

The location of triple redundant comparators along three different edges of the interface chip assures that an edge failure will not be catastrophic.

A single comparator failure is reported as a mismatch or bit fault, but does not result in a hard failure.

The rate for sampling discretes can be varied to allow for debounce of relay/switch inputs. Triple sampling of a given comparator provides a consistent reading of otherwise asynchronous signals. Bounce is provided as an addressable status.

The interface utilizes registers which are 8 bit or 16 bit selectable, and data status is tri-state latched for interface to any system processor.

An ARINC-429 port for providing a serial ARINC-429 output of data and status may be provided for data-concentrator applications enabling the transfer of data to other systems utilizing a minimum of wiring and processor loading.

Passive circuitry is employed to isolate intelligence from both lightning effects and radiated fields.

Test patterns are selectable to produce alternating "1"s and "0"s to verify that all bits are operational. Errors are reported through the registers and the optional ARINC-429 port as cross checks. An error reporting scheme differentiates between soft and hard failures to allow continued operation despite failures. The built-in test, status reporting scheme and fault-tolerance/isolation significantly reduce application software requirements.

The interface may operate in either the redundant or non-redundant mode.

In the redundant mode, 32 discretes, in the preferred embodiment are led to the ceramic substrate on which the 160 lead quad-flat pack is mounted. In the redundant mode, these 32 channels are led to three groups of comparators located on three different edges of the chip structure, which design arrangement assures that an edge-failure is not catastrophic. The HIRP isolation circuits are coupled between the leads directing the 32 inputs of each of the comparator groups making up the triple redundant comparators to isolate the intelligence from lightning effects and radiated fields so as to meet the stringent requirements consistent with avionic needs. Each of the discretes is coupled through isolation circuitry to a comparator for comparison with a selected reference level to establish a "state" of the device, i.e. "on" or "off"; binary "0" or binary "1" and so forth.

OBJECTS OF THE INVENTION

It is, therefore, one object of the present invention to provide a multiple channel discrete interface for monitoring signal states such as 28 V/open, open/GnD and 28 V/Gnd.

Still another object of the present invention is to provide a multiple channel discrete interface employing comparators in a triple redundant configuration for taking consensus on input states and raising a flag when consensus fails.

Still another object of the present invention is to provide a multiple channel discrete interface for monitoring a plurality of signals and which is capable of meeting the stringent requirements encountered in avionic applications.

Still another object of the present invention is to provide a novel multiple channel discrete interface for monitoring a plurality of signals and being capable of selectively providing results of comparison of data in a redundant mode, bounce data in a redundant or non-redundant mode and which is further provided with a plurality of self-test protocols.

Still another object of the present invention is to provide an interface of the type described hereinabove and which is capable of presenting the results of comparison self-test protocols and the like at a set of output terminals for parallel transfer as well as providing said data results presented to a transmission line in serial fashion.

The above, as well as other objects of the present invention will become apparent when reading the accompanying description and drawings.

BRIEF DESCRIPTION OF THE FIGURES

FIGS. 6–20 show all of the circuits embodied in the control circuitry of FIG. 4b. More specifically:

FIG. 6 shows a simplified block diagram of the TRANS circuit.

FIG. 6c shows the manner in which FIGS. 6a and 6b are arranged.

FIG. 6d-1 and 6d-2, taken together show a detailed diagram of the ARINC-DEC decoder circuit shown in simplified block diagram form in FIG. 6a.

FIG. 7 is a simplified block diagram of the CONTROLLER circuit.

FIGS. 7a–7e show detailed circuit diagrams of the circuits employed in the CONTROLLER circuit of FIG. 7.

FIGS. 8-1, 8-2, 9-1, 9-2, 10-1 and 10-2, taken together show the MATRIX circuits employed in the control circuitry of FIG. 4b, said MATRIX circuits being shown in simplified block diagram form.

FIGS. 8a-1 and 8a-2, taken together comprise a detailed schematic of a typical MATRIX circuit shown in FIGS. 8–10.

FIGS. 8b–8f show the detailed circuitry of the MISMATCH-BIT circuit shown in simplified block diagram form in FIG. 8a.

FIG. 8g is a detailed logic diagram of the VOTE circuits shown in simplified block diagram form in FIG. 8a.

FIG. 8h is a logical diagram of the BOUNCE circuits shown in simplified block diagram form in FIG. 8a.

FIG. 11 shows the LOGIC-2 circuit in simplified block diagram form.

FIG. 12 shows the DIS-BOUNCE circuit in simplified block diagram form.

FIGS. 12a-1 and 12a-2, taken together, show the detailed schematic of the DIS-BOUNCE circuit of FIG. 12.

FIG. 13 shows the DISCRETE circuit in simplified block diagram form.

FIG. 14 shows the ARINC-BOUNCE circuit in simplified block diagram form.

FIG. 15 shows a simplified block diagram of the DATA circuit.

FIG. 16 shows a simplified block diagram of the FAULT circuit.

FIG. 17 shows a simplified block diagram of the FAULT-DATA circuit.

FIG. 18 shows the BIT-TEST circuit in simplified block diagram form.

FIG. 19 shows the DIS-MISMATCH circuit in simplified block diagram form.

FIG. 20 shows the STA-FLT circuit in simplified block diagram form.

FIGS. 20*a*-1 and 20*a*-2 taken together and 20*b* and 20*c* show the detailed circuitry employed in the STA-FLT circuit of FIG. 20.

FIG. 21 is a table showing the format of the words generated by the ARINC-429 transmitter of FIG. 6 when operating in the redundant mode.

DETAILED DESCRIPTION OF THE INVENTION AND PREFERRED EMBODIMENTS THEREOF

Figure 1:
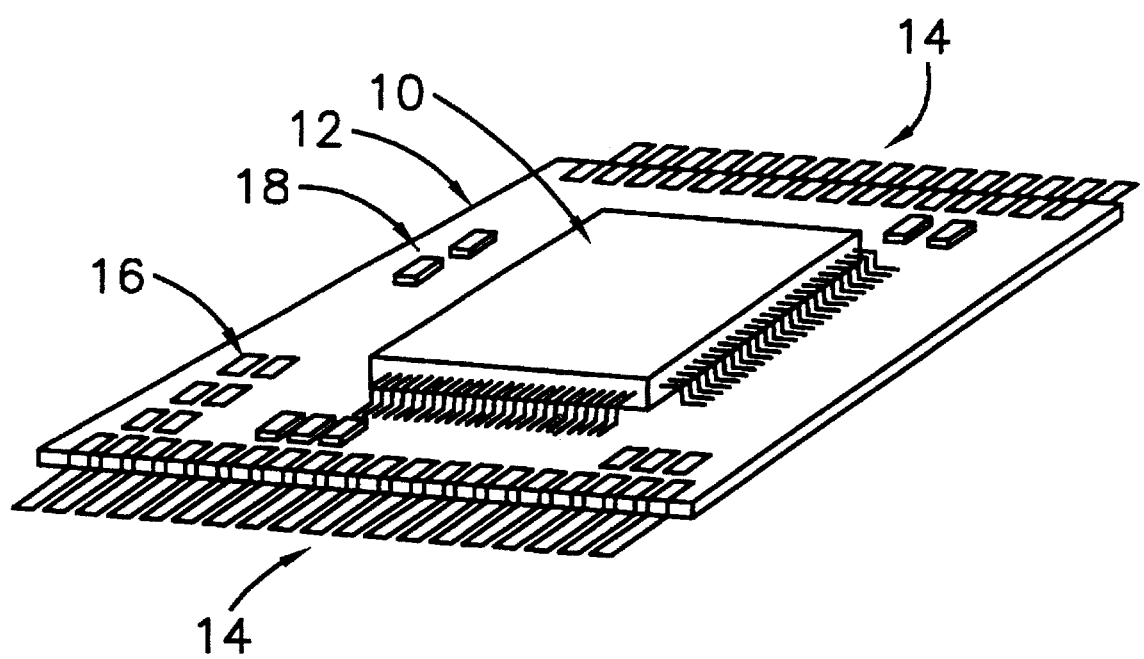
FIG. 1 is a simplified perspective view of an interface embodying the principles of the present invention shown mounted upon a substrate.

FIG. 1 shows a simplified perspective view of a 32 channel discrete to digital interface 10 mounted upon a ceramic substrate 12 provided with a plurality of edge clips 14 for surface mounting and having further mounted thereon a plurality of passive elements such as resistors 16 and capacitors 18. Interface 10 is a 160 lead quad flat pack type. In one preferred embodiment, the ceramic substrate has the size of the order of 2.3 inches by 2.3 inches. Interface 10 has a chip size of approximately 0.35 by 0.35 inches.

The interface, in one preferred embodiment, contains of the order of 100 comparators and analog switches and over 14,000 gates.

Figure 2A:
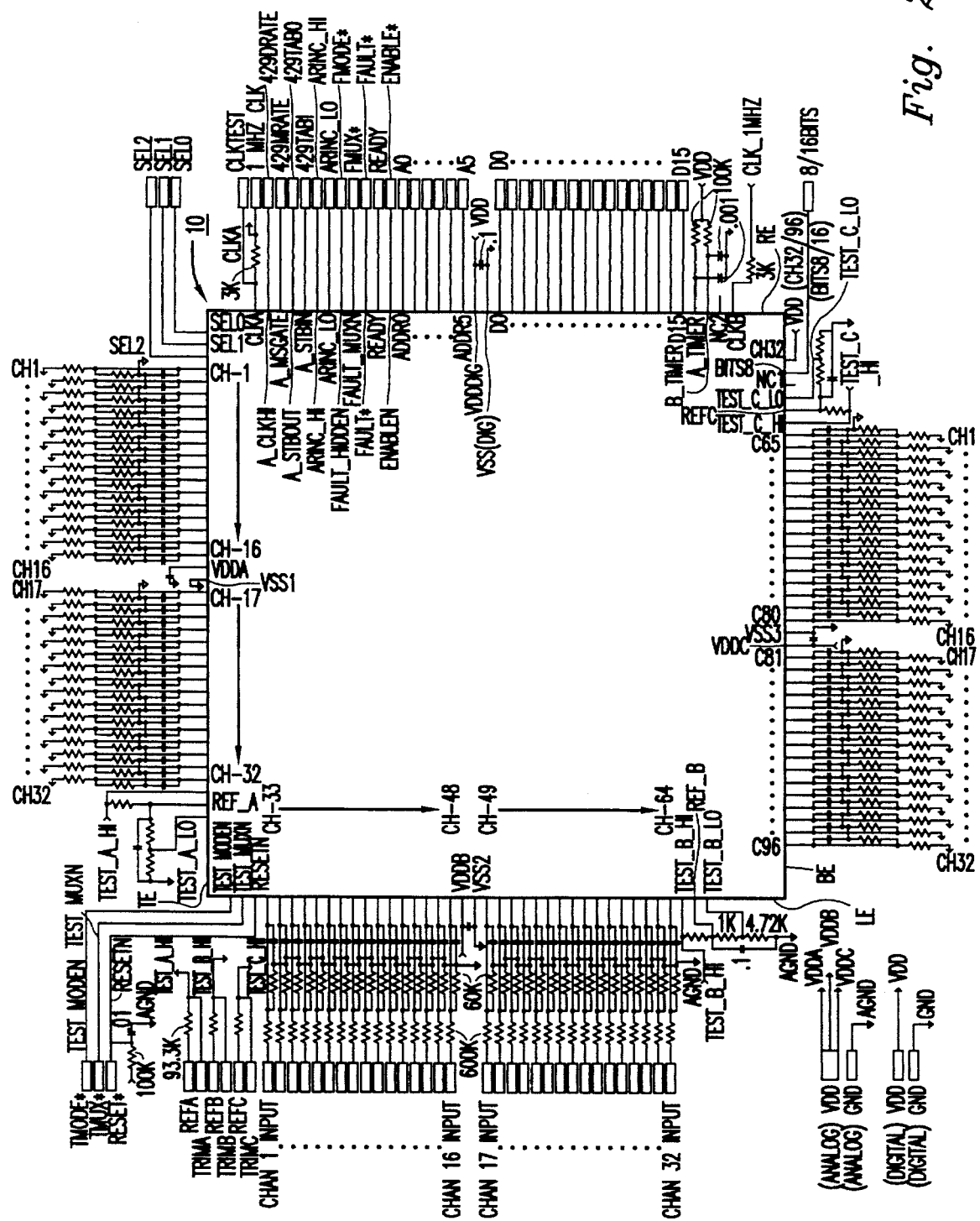
FIG. 2a is a schematic diagram showing the passive circuitry utilized to connect discretes to the input terminals of an interface and further shows the output terminals of the interface.
Figure 2B:
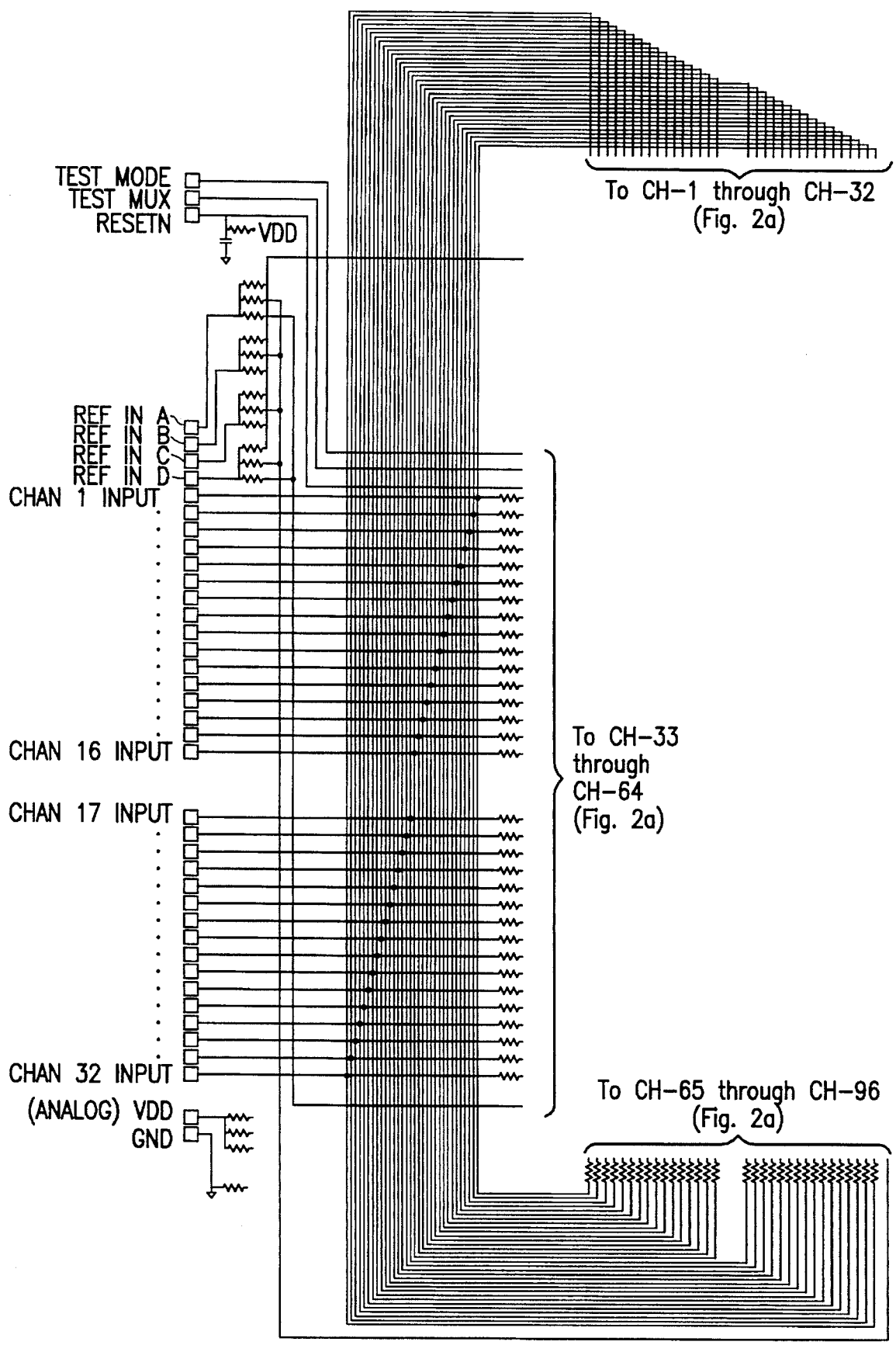
FIG. 2b shows a wiring pattern utilized for operating the interface of FIG. 1 in the redundant mode.

FIG. 2*a* shows the 160 terminals arranged around the sides of the interface 10. FIG. 2*b* shows the manner in which the 32 input channels to be monitored are electrically coupled to these terminals. FIG. 2*b* shows one manner in which, for operation in a redundant mode, 32 input channels (discretes) have each of their input lines coupled to one of the switches, relays, etc., being monitored. These inputs, in turn, are coupled to three groups of terminals provided as part of the interface and arranged on three adjacent sides of the interface, the electrical connections being made through resistors and capacitors, as shown, to prevent a catastrophic hardware fault, such as a fracture along one side of the substrate, from preventing continued use of the interface and to provide protection against power surges, lightning and high-intensity radiated fields. Employing the wiring pattern of FIG. 2*b*, for example, and making reference to FIGS. 2*a* and 2*b*, channels 1 through 32 in FIG. 2*b* are directly electrically connected to channels CH-1 through CH-32 arranged from right to left along the top edge TE of interface 10; are electrically connected to channels CH-33 through CH-64 arranged along the left-hand edge LE of interface 10; and are directly electrically connected to channels 65 through 96 extending from right to left along the bottom edge BE of interface 10. Thus, the wiring arrangement shown in FIG. 2*b* provides direct electrical connection of 32 inputs simultaneously to three arrays of 32 channels per array with electrical protection being obtained through the resistors and capacitors as shown in FIG. 2*a*. The resistor/capacitor networks are substantially identical to one another.

The terminals along the right-hand edge RE of interface 10 include one megahertz clock terminals CLKA and CLKB at the upper and lower ends of the right-hand edge RE, address terminals A-0 through A-5, data terminals D-0 through D-15, timers including the A timer and B timer, as well as other terminals to be more fully described and which are arranged along the top, left and bottom edges TE, LE and BE as will be more fully set forth herein when considering the functions provided by these terminals in greater detail.

Figure 3:
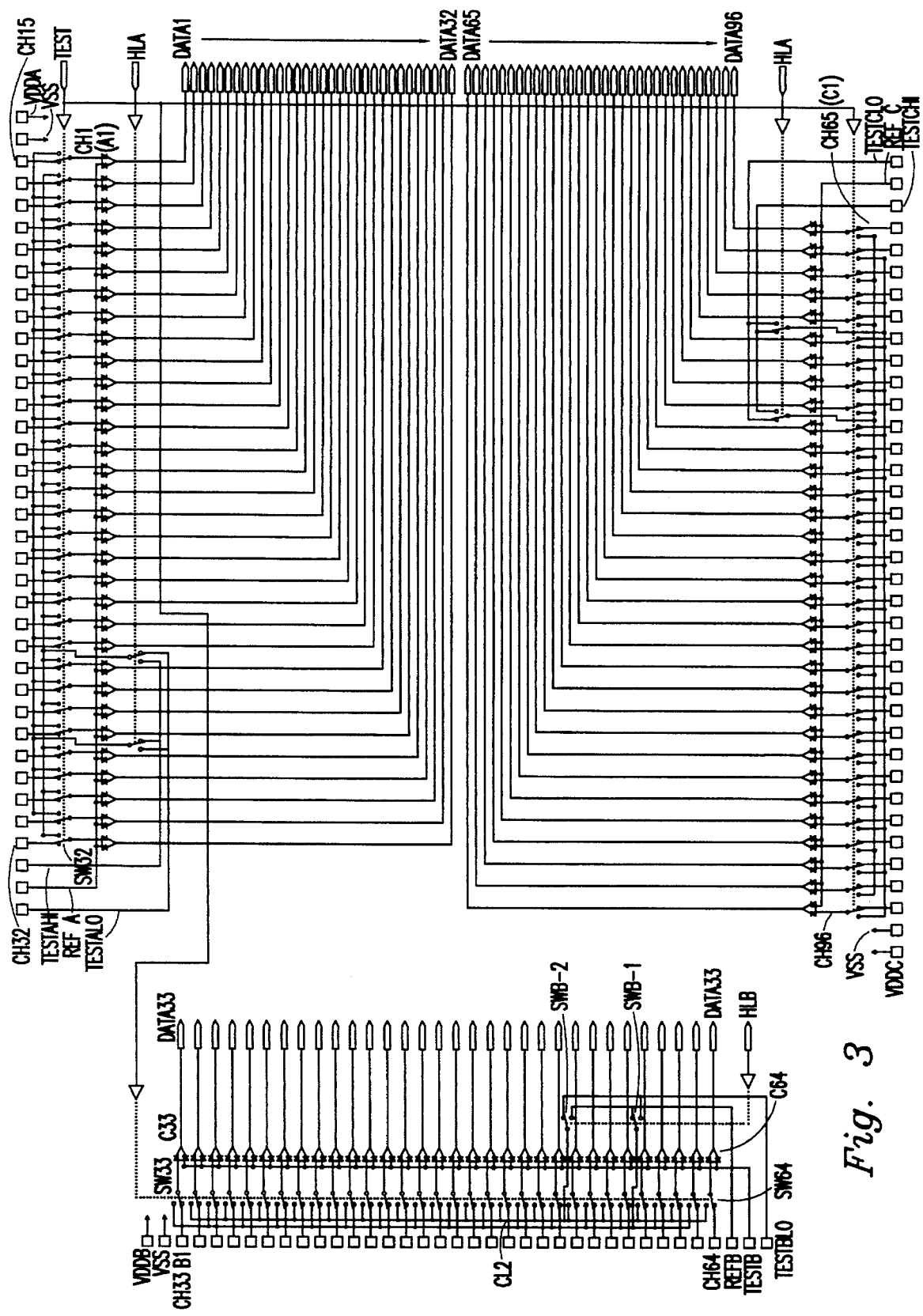
FIG. 3 shows the arrays of comparators employed for converting analog information from the discretes into binary form.

FIG. 3 shows the manner in which each of the channel groups is compared against a predetermined threshold for purposes of converting the analog input into a digital input for evaluation.

Since each of the channel groups CH-1 through CH-32, CH-33 through CH-64 and CH-65 through CH-96 are substantially identical in design and function, and since each of the inputs or discretes within each channel are substantially identical, the operation of one of the discretes in one of the channel groups will be described, for purposes of simplicity.

Considering the B channels, B-1 through B-32 which equate respectively to channels 33–64, and are arranged along the left-hand edge LE of the interface 10, the analog input of discrete B-32 (channel CH-64) is applied through a solid-state switch SW-64 to one input of a comparator C-64. All of the switches SW-33 through SW-64 are operated under control of a common input identified as the test input arranged in the upper right-hand portion of FIG. 3. The switches SW-33 through SW-64 are normally in the position shown in FIG. 3 in the absence of a test signal for coupling each of the discretes to an associated input of one of the comparators C-33 through C-64. The other input of each of the comparators C-33 through C-64 is coupled in common to a reference REF-B as was mentioned hereinabove. The high-intensity radiation field-isolated inputs (hereinafter HIRF-isolated inputs), which are adapted to handle 28 V/open, open/ground and 28 V/ground signals for 28 volts supply tracking REF-B, are connected to a 28 V supply (not shown for purposes of simplicity). Comparator C-64 determines whether the discrete input CH-64 is above or below the threshold level applied to comparator C-64, providing a binary output identified as data 64.

In the test mode, the input of comparator C-64 coupled to the channel 64 discrete is decoupled from its associated discrete and is coupled to a common line CL-2 which, in turn, is coupled to a high level test input (TEST-B-HIGH) or to a low level test output (TEST-B-LOW) under control of a high level B input HLB for operating the switches SWB-1 and SWB-2 for selecting one of the low and high levels to be coupled to common line CL thus permitting a test mode for testing the integrity of the comparators C-33 through C-64. The results of these tests appear at the data output terminals DATA-33 through DATA-64. The terminals DATA-33 through DATA-64 also provide the results of the comparator test when inputs from the discretes are compared against the reference level REF-B. There are two common lines CL-1 and CL-2 permitting the same or alternating binary states to be coupled to inputs of adjacent comparators C-33 to C-64.

As was mentioned hereinabove, the test mode and the discrete comparison mode for the channels 1–32 and 65–96 are identical and the results of either the test mode or the comparison of each discrete against a test level appear at the outputs DATA-1 through DATA-32 of channels 1–32 and DATA-65 through DATA-96 of the channels CH-65 through CH-96, respectively, regardless of operation in either the redundant or non-redundant mode.

Figure 3A:
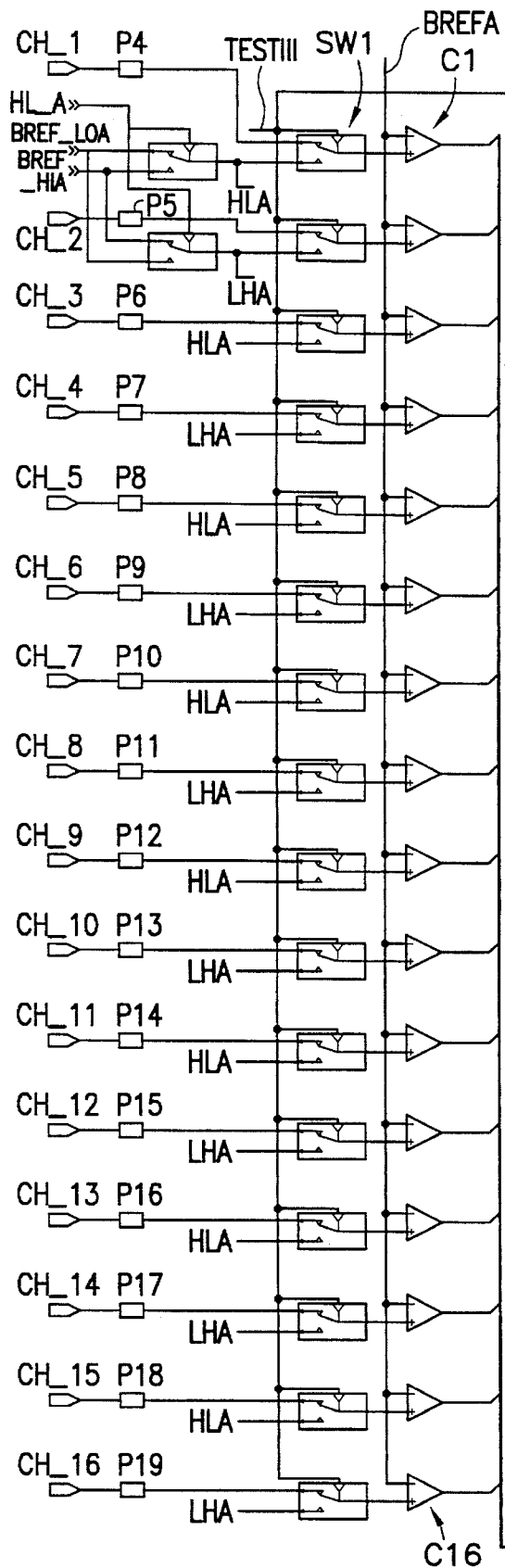
FIG. 3a shows some of the input pads and comparators of FIG. 3 in greater detail.
Figure 3A:
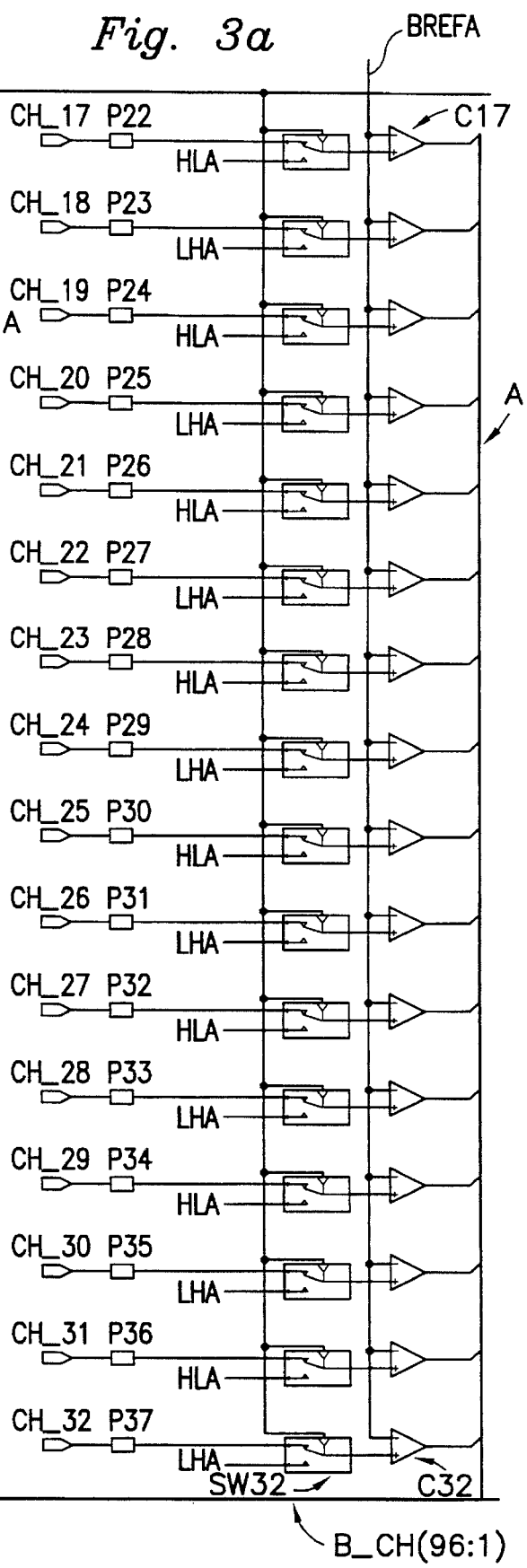

FIG. 3*a* shows the comparators and test circuitry for channels 1–32 in greater detail. As shown in FIG. 3*a*, each of the discretes is coupled to a "pin pad" P-4 through P-19 and P-22 through P-37. Each of these pads, in turn, are connected to a B terminal of a solid-state switch SW-1 through SW-32. The test input for each switch selectively couples one input of comparator C-1 to either the upper terminal for coupling the analog input level of a discrete or a lower terminal for coupling the test level thereto which will be either a high level input derived from HLA or a low input derived from input LHA. All of the outputs of comparators C-1 through C-32 are delivered to a bus A for coupling to internal circuitry. The detailed arrangement of the channels CH-33 through CH-64 and CH-65 through CH-96 are substantially identical to the arrangement for channels CH-1 through CH-32 shown in greater detail in FIG. 3a and a description has been omitted for purposes of brevity.

Figure 4A:
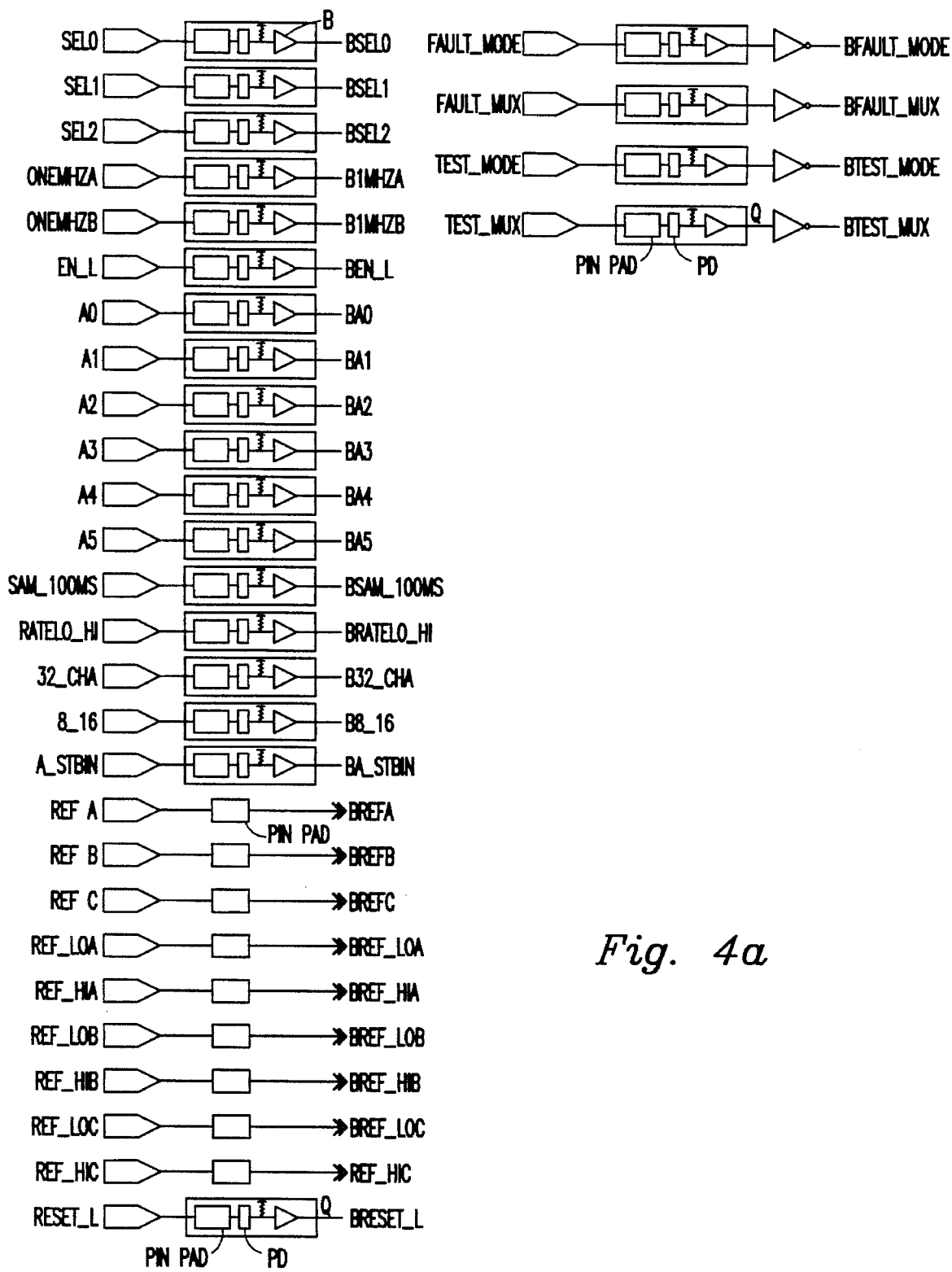
FIG. 4a is a circuit diagram showing the input pads of the interface for receiving control signals from the outside world.

FIG. 4a shows the specific pad arrangements for a plurality of inputs in addition to the data inputs of the three channels groups CH-1 through CH-32, CH-33 through CH-64, and CH-65 through CH-96. Three inputs identified as SEL-0 through SEL-2 are binary inputs generated external to interface 10 and utilized to select the sampling rate at which discretes are examined by the interface 10. The SEL-0 through SEL-2 inputs provide eight different binary combinations for utilization in selecting the sample rates which, in the preferred embodiment, include 5 msec, 10 msec, 20 msec, 50 msec, 100 msec, 200 msec, 500 msec and 1000 msec, which sample rates are developed within the interface as will be more fully described hereinbelow.

The interface 10 is provided with two one MHz inputs, namely, ONE MHz A and ONE MHz B. As will be described hereinbelow in greater detail, the "A" ONE MHz source is normally used as the clock pulse source for the interface. In the event of any failure, the system automatically switches over to the ONE MHz B clock pulse source.

The address channels A-0 through A-5 are utilized to provide for the selection of the desired 8 or 16 bit data bus information to transfer to other busses, registers, etc., as will be more fully described. The Enable line controls the tri-state drivers of the 8 or 16 bit data bus outputs. As will be more fully described the tri-state data bus drivers are enabled when the signal is at logic zero and are tri-stated (i.e. held at a high impedance) when the signal is at logic one. The 8–16 input provides a binary zero to select the 16 bit data bus output while a binary one selects the 8 bit data bus output.

The 100 millisecond sample rate signal selects the message rate of an optional ARINC-429 transmitter which is utilized in avionics applications for transmitting data at a message rate which is typically selectable at either a fixed 100 millisecond rate or at a selected sampling rate of the input discrete, a logic one selecting the input sampling rate as the message rate and a logic zero selecting the fixed 100 millisecond message rate. The rate RATELO-HIGH input selects the data rate for the ARINC transmission. A logic zero selects the high speed data rate of 100 kilohertz while a logic one selects the low speed data rate of 12.5 kilohertz. The A-STBIN (strobe in) pin may be provided when the interface is being used as a remote ARINC-429 serial port and is not connected to a local microprocessor.

All of the above inputs are coupled to a pin pad, a second pad PD and a buffer B as shown. Some of the remaining inputs as will be described in greater detail hereinbelow, require only a pin pad.

The manner in which these control signals are utilized will be described in greater detail hereinbelow.

Figure 4B:
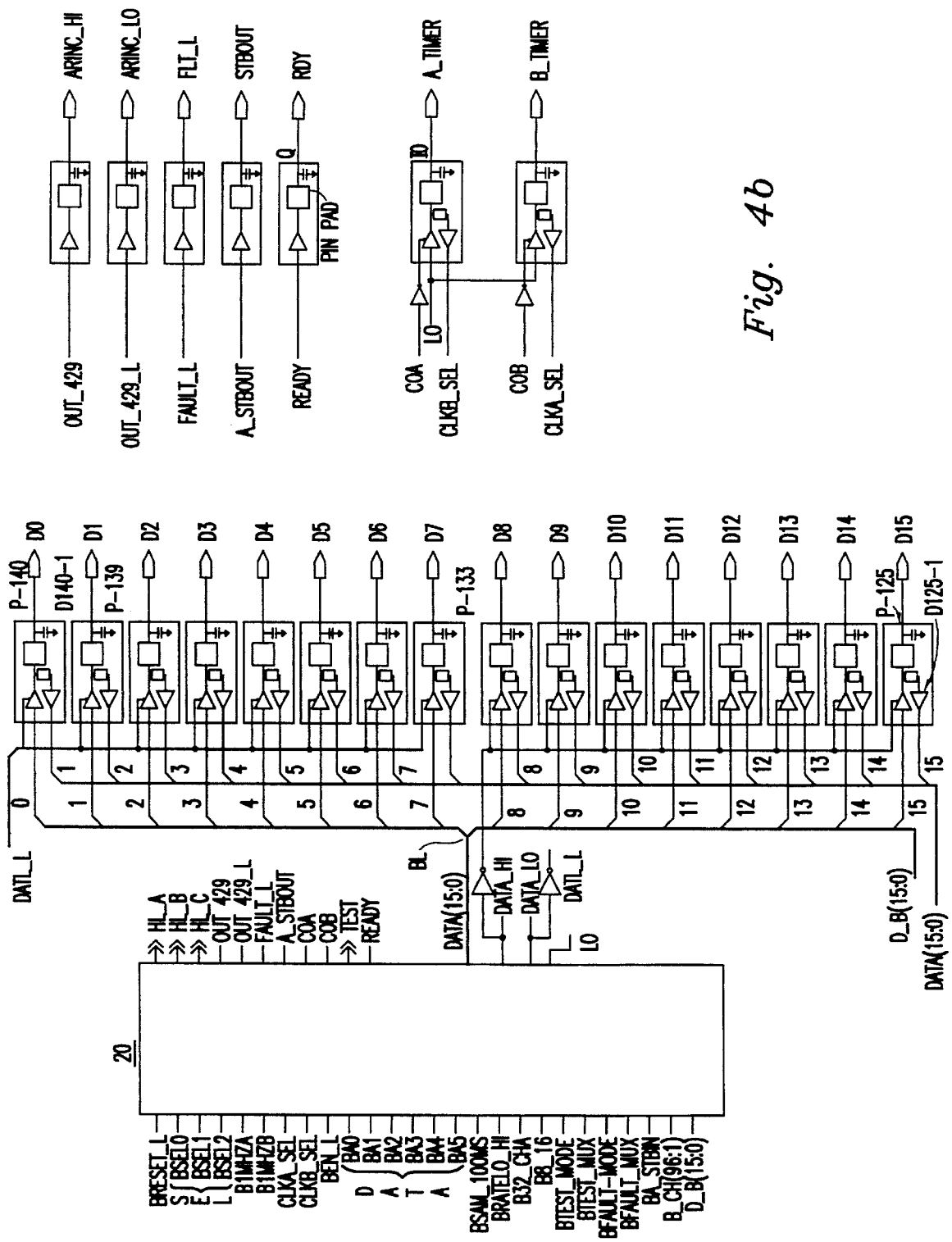
FIG. 4b is a circuit diagram showing the control circuitry in simplified block diagram form and the details of the output pad assemblies coupled thereto through the output data bus.

FIG. 4b shows circuitry 20 in simplified block diagram form for controlling operations on the data applied to circuitry 20 by bus B-CH(96:1), when operating in the non-redundant mode, circuitry 20 being operated in accordance with the control inputs applied thereto such as, for example, the select inputs BSEL0 through BSEL-2, data inputs BA-0 through BA-5, reset, test, fault, transmission rate, etc., which signals are introduced into the interface through the pads shown in FIG. 3b, for application to circuitry 20. The principal data output of circuitry 20 comprises the data outputs D-0 through D-15 applied to the outside world through bus B-2, each of the data outputs being coupled to an associated pad P-125 through P-140 reading from bottom to top along the right-hand portion of FIG. 4b. Each of the pad assemblies P-125 through P-140 comprise an amplifier A-1 for isolating the data bit coupled thereto from the output under control of a common data low signal DATL-L, which signal is applied through a pin pad P-140 coupled to external circuitry. The output of controlled amplifier A-140, in addition to being coupled to pad D-140, is coupled to a buffer E-140 through a second pad D-140-1. Each of the pad assemblies P-125 through P-139 are substantially identical in design and function to pad assembly P-140. The outputs from the amplifiers D-140-1 through D-125-1 are coupled to bus D-B (15:0). Data appearing on the bus DATA(15:0) is coupled to the outside world. Data on bus D-B(15:0) are utilized by additional circuits for built-in test purposes to be more fully described hereinbelow.

Other outputs of the circuitry 20 are coupled through pad assemblies 123, 124, P-150, P-151, P-154, P-155 and P-157 shown in the upper right-hand portion of FIG. 4. These outputs will be described in greater detail hereinbelow.

Figure 5A:
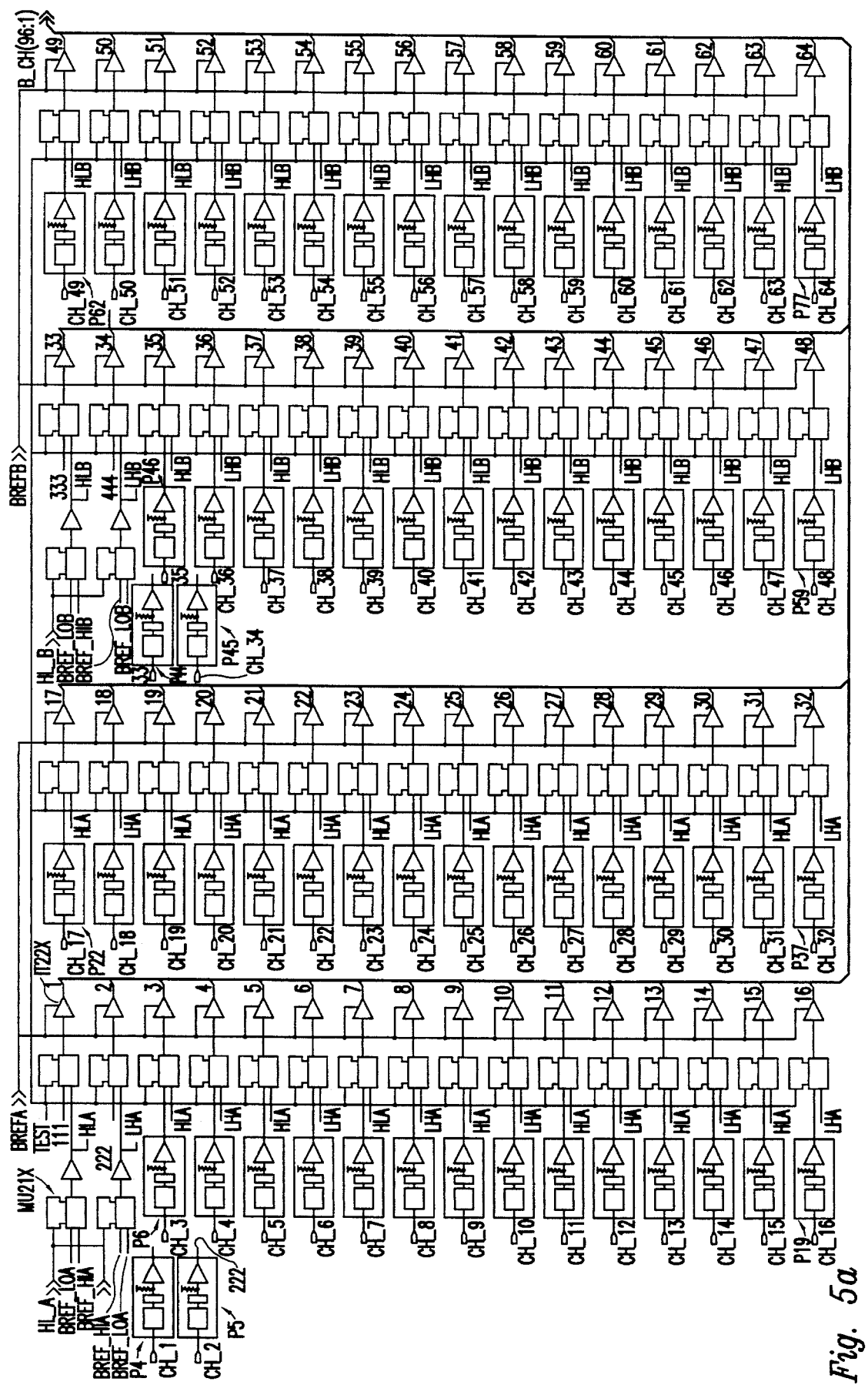
FIGS. 5a and 5b show detailed schematic diagrams of the input pads employed in the interface for operation in the non-redundant mode.
Figure 5B:
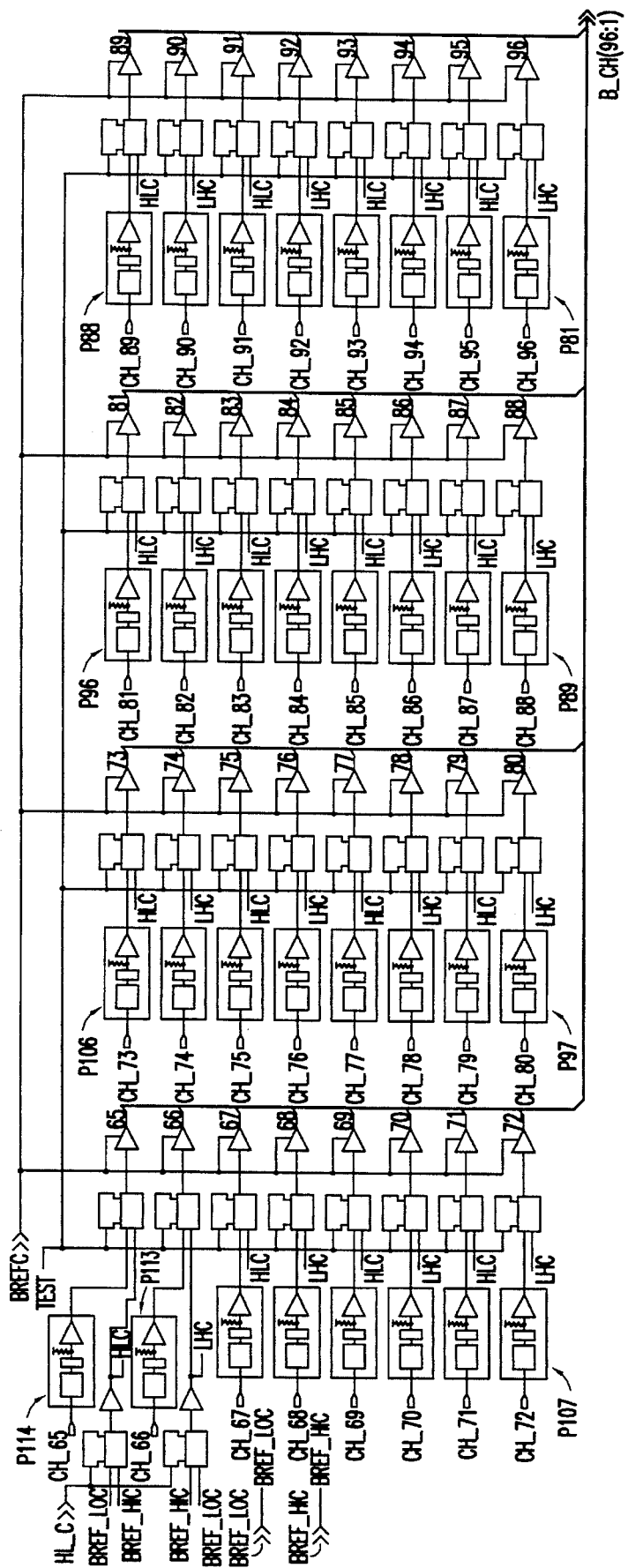

FIGS. 5a and 5b show the input arrangement utilized when operating interface 10 in the non-redundant mode. Briefly, in the redundant mode, 32 discretes are respectively coupled to three arrays of input terminals, namely, channels 1–32, channels 33–64 and channels 65–96, as was described hereinabove. In the non-redundant mode, up to 96 discretes, i.e. channels, can be monitored in a multiplexed fashion, 32 channels at a time. As shown in FIGS. 5a and 5b, the outputs from discretes represented by CH-1 through CH-96 are coupled through pad assemblies similar to those described hereinabove and identified in FIGS. 5a and 5b as pad assemblies P-4 through P-19, P-22 through P-37, P-44 through P-59 and P-62 through P-77, P-81 through P-96 and P-99 through P-114, channels CH-65 through CH-96 (FIG. 5b) being coupled to pads P-114 through P-99 and P-96 through P-81, respectively and channels CH-1 through CH-64 (FIG. 5a) being coupled to pads P-4 through P-19, P-22 through P-37, P-44 through P-59 and P-62 through P-77, respectively, each of these pad assemblies being substantially identical in design and function to the pad assemblies described hereinabove with regard to FIG. 3a. For this reason, a detailed description of these pads will be omitted herein for simplicity.

The outputs of the pads P-4 through P-114 are coupled to one input of a multiplexer MU21X, the other output being coupled to a voltage reference level which is either a high voltage reference level (HLC) or a low voltage reference level (LHC) with the reference levels HLC and LHC alternating from one multiplexer to the next. This arrangement is utilized when it is desired to perform a test to assure that the circuitry of the interface 10 is operating properly, as will be more fully described.

Each multiplexer has a select input S-0 to which a test signal TEST is applied. When the signal TEST is high, i.e. in the test mode, the levels HLA and LHA, applied to alternating multiplexers, are passed to the output of the multiplexer for coupling to the input of a buffer IT22X for coupling to one line of the bus BCH(96:1).

When not performing a test mode, TEST is low, coupling the associated channel input CH-1 through CH-96 to the input of the buffer IT22X through the multiplexer.

Since the analyzing circuitry is capable of handling a maximum of 32 inputs at a time, the channels are coupled through the bus B-CH(96:1) 32 channels at a time by the timing signals BREFA for enabling channels CH-1 through CH-32 to be coupled to the bus; a timing signal BREFB for enabling channels 33 through 64 to be coupled to the bus; and BREFC for enabling channels 65 through 96 to be coupled to the bus. The timing control signals BREFA through BREFC are coupled to control inputs of the buffers IT22X, as shown. Thus, the circuitry shown in FIGS. 5a and 5b enables the monitoring of 96 discretes in a non-redundant mode, examining 32 channels at a time in a multiplexed fashion and further enables the analyzing circuitry to be tested which tests are likewise performed in a multiplexed manner, 32 channels at a time. The multiplexers MA and MB shown in the upper right-hand portion of FIG. 5a are utilized to invert the signals HLA and LHA to perform tests in which, during a first mode, all odd numbered multiplexers have a high level signal applied thereto and all even numbered multiplexers have a low level signal applied thereto and in a second test mode wherein these levels are reversed.

The details of the test mode will be set forth hereinbelow.

FIGS. 6 through 20 show simplified block diagrams of all of the circuit arrangements which make up the main circuit arrangement 20 shown in FIG. 4b.

Figure 6:
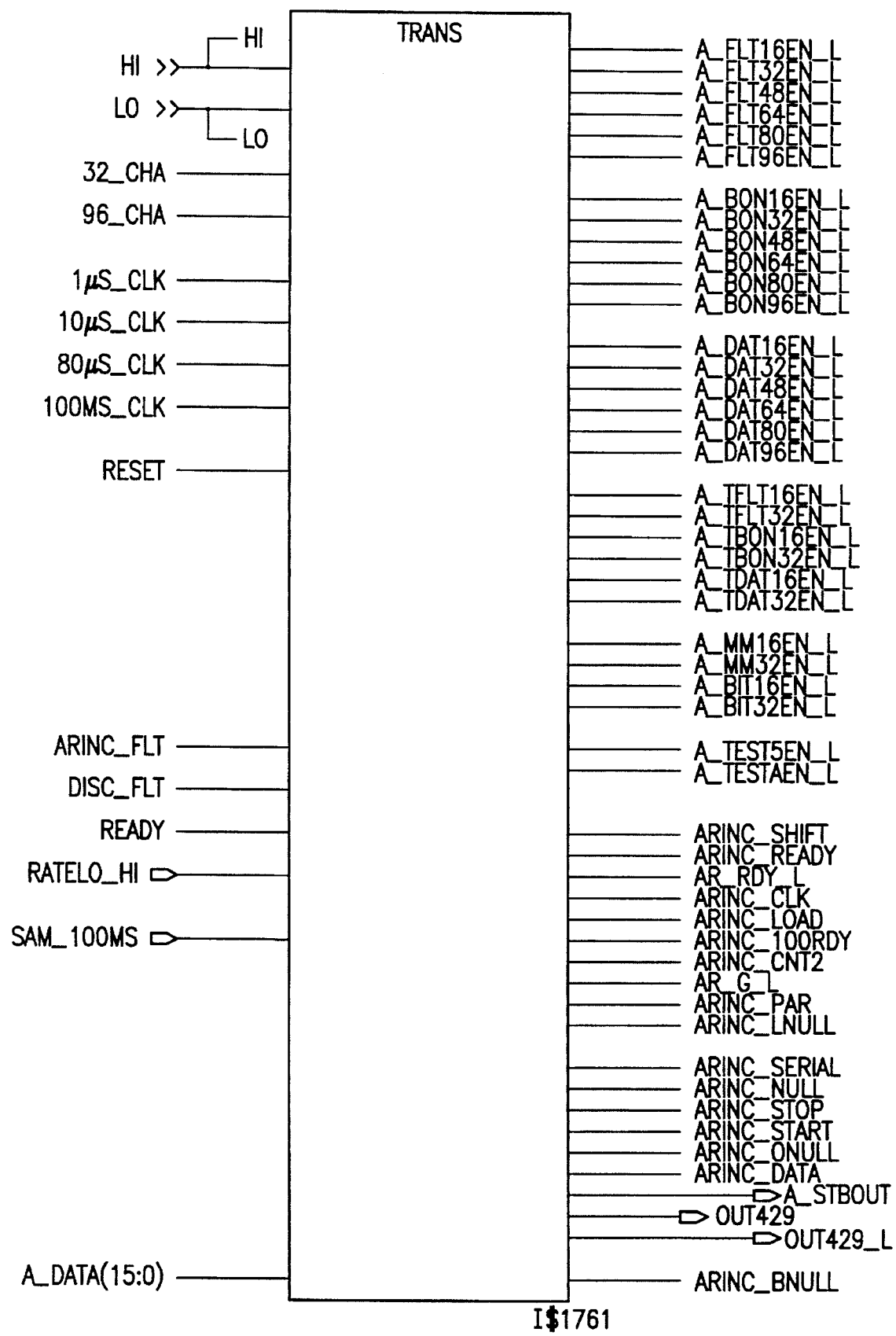

FIG. 6 shows the transmission circuit TRANS in simplified block diagram form, which circuit is utilized to develop the signals for transferring data from registers within interface 10 to the outside world, as will be more fully described, and to provide timing signals for transmitting data and other information through an ARINC-429 transmitter which will likewise be more fully described hereinbelow.

Figure 6A:
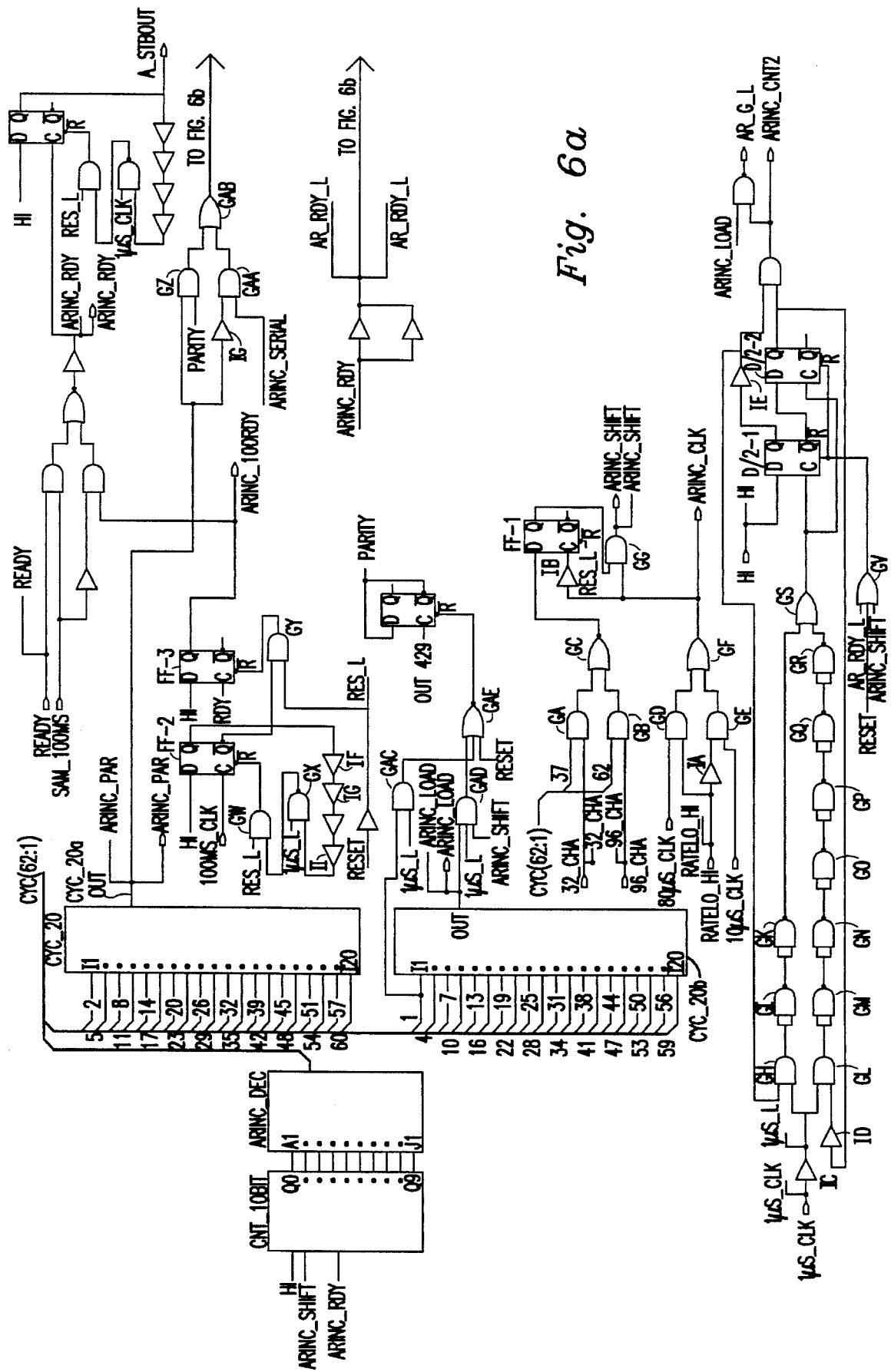
FIGS. 6a and 6b show the detailed circuitry of the TRANS circuit of FIG. 6.
Figure 6B:
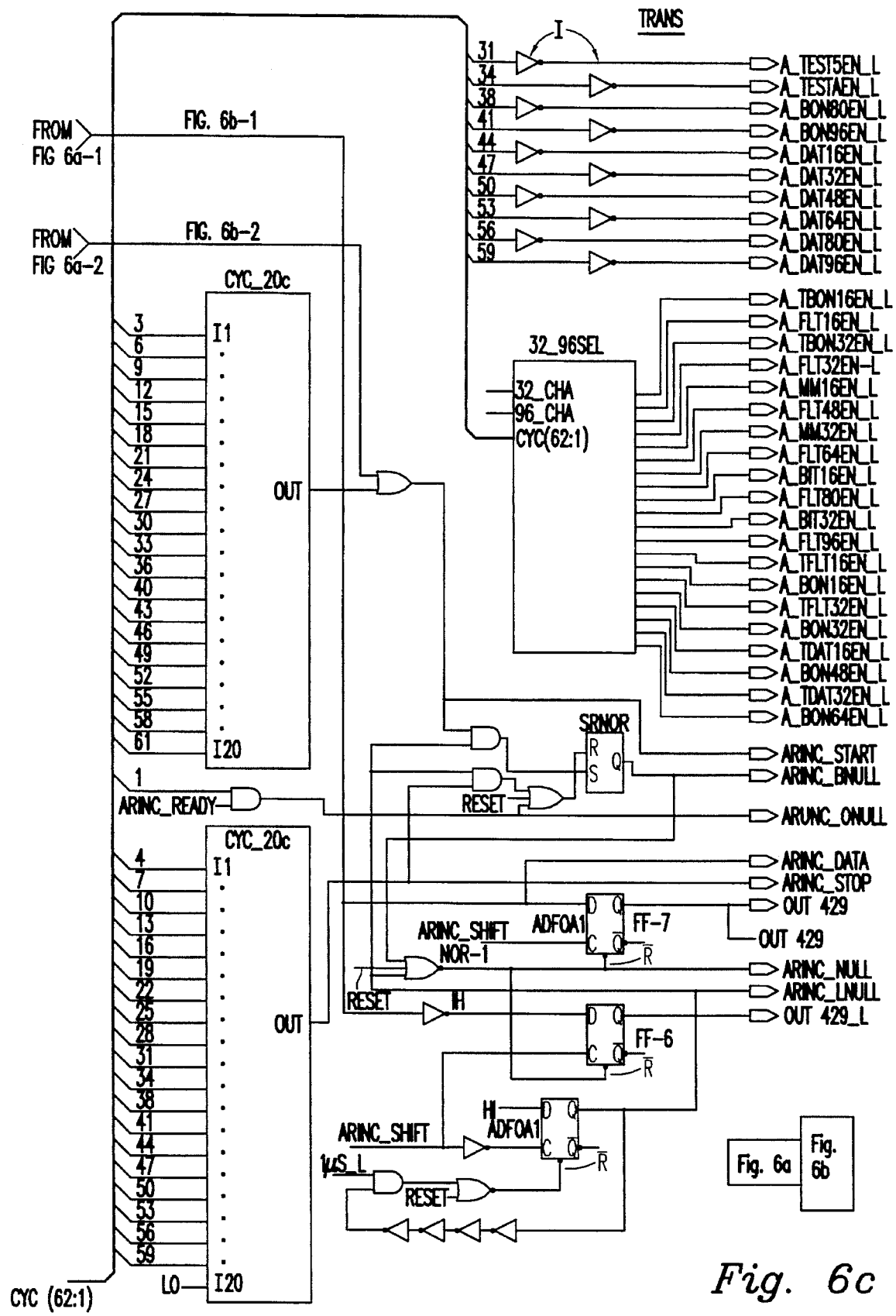

FIGS. 6a and 6b show the TRANS circuit of FIG. 6 in greater detail. FIG. 6c shows the manner in which FIGS. 6a and 6b are connected.

As shown in FIG. 6a, a 10 bit binary counter CTR-1 applies its ten binary outputs Q-0 through Q-9 to the inputs A-1 through J-1 of a decoder ARINC-DEC which decodes selected outputs of CTR-1 for application as sequence signals to a pair of gating circuits CYC-20A and CYC-20B which deliver the outputs of ARINC-DEC to their respective common outputs, OUT. The outputs of ARINC-DEC are also transferred by bus CYC(62:1) to additional CYC circuits CYC-C and CYC-D shown in FIG. 6b.

Figures 1, 6D:
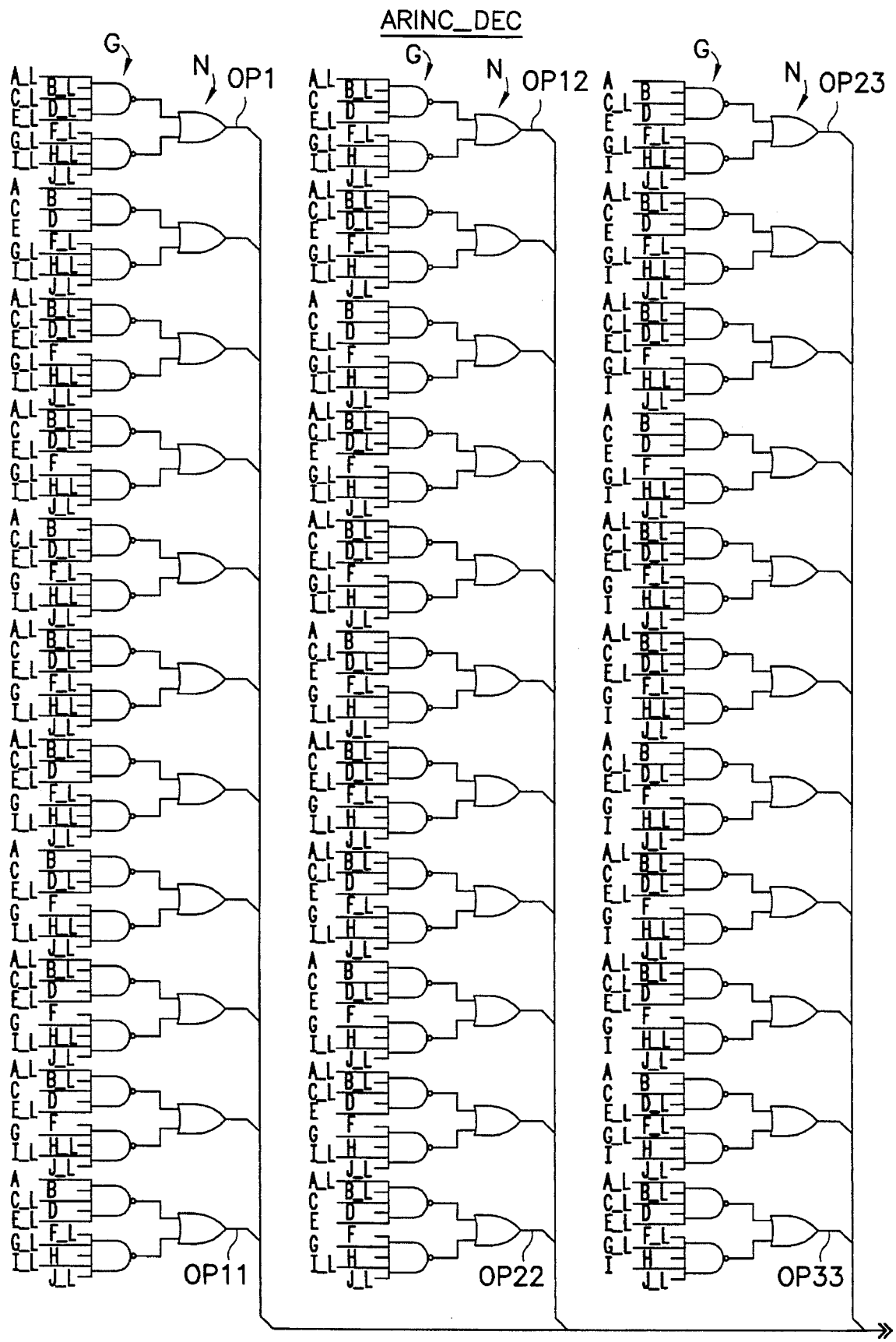
Figures 2, 6D:
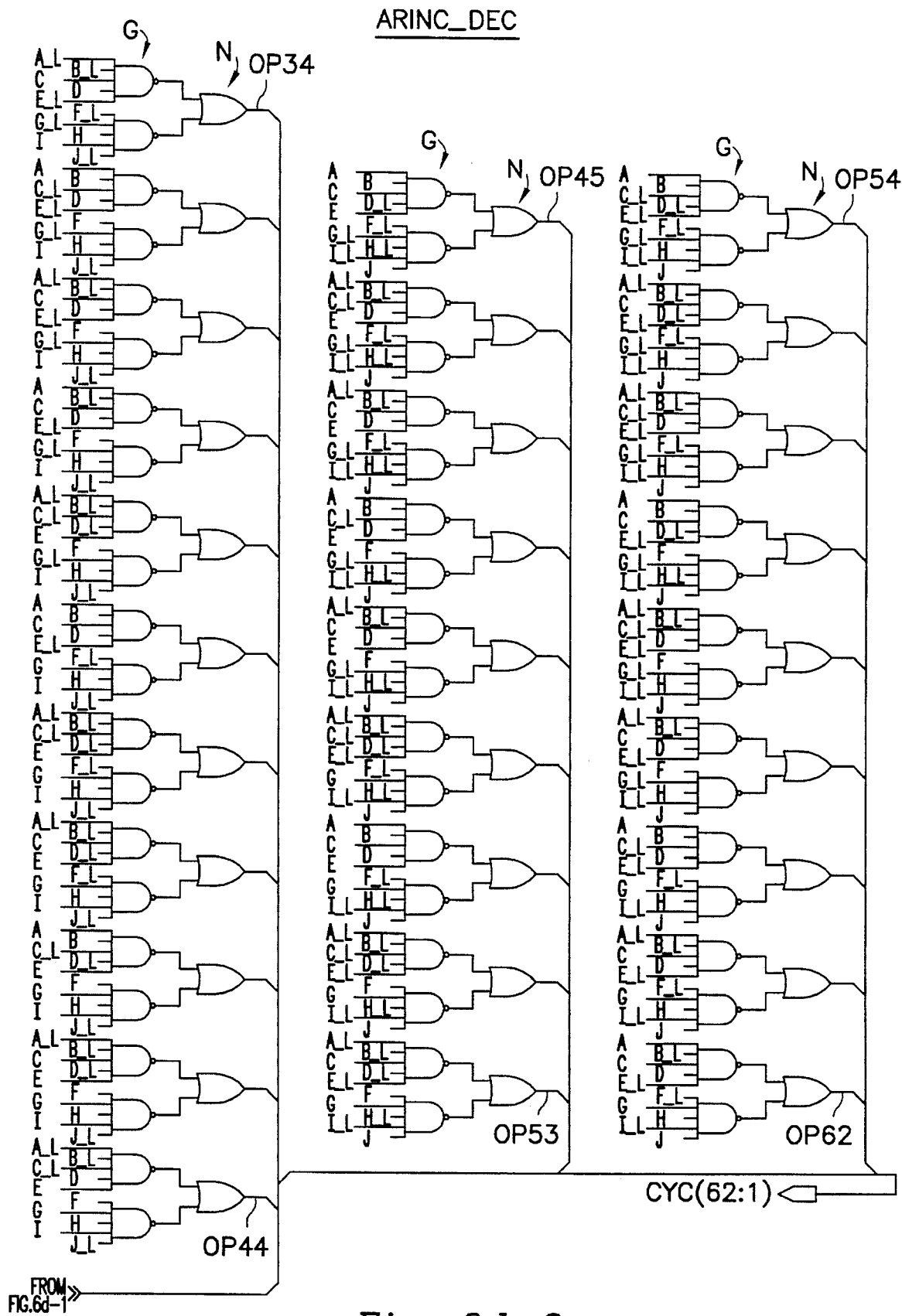

FIGS. 6d-1 and 6d-2, taken together, show the ARINC-DEC circuit in greater detail. As can be seen from FIGS. 6a and 6d, the outputs Q-0 through Q-9 of counter CTR-1 are coupled to respective inputs A-1 through J-1 of the ARINC-DEC decode circuit. Selected ones of these outputs are coupled to an array of five-input NAND gates G, which gates are arranged in pairs, each pair of five-input NAND gates having its output coupled to an associated input of a two-input NOR gate N. Noting the upper left-handmost pair of gates, G' and G", these gates respectively receive inputs A-L, B-L, C-L, D-L and E-L (gate G') and F-L, G-L, H-L, I-L and J-L (gate G"). Thus, when all ten inputs A-L through J-L are high, an output is provided. This represents a first decoded signal which is applied to an associated line of bus CYC(62:1). Of the possible 1,024 combinations generated by counter CTR-1, 62 of these decoded conditions are outputted during a cycle and at predetermined intervals by the decoder. Selected ones of these decoded signals are applied to the gating circuits CYC-20A and CYC-20B. Each of the outputs at the NOR gate NOR' shown in FIG. 6d are identified as outputs OP-1 through OP-62, as shown. Forty of these designations are coupled to respective inputs I-1 through I-20 of the gating circuit CYC-20A and CYC-20B.

Figure 6E:
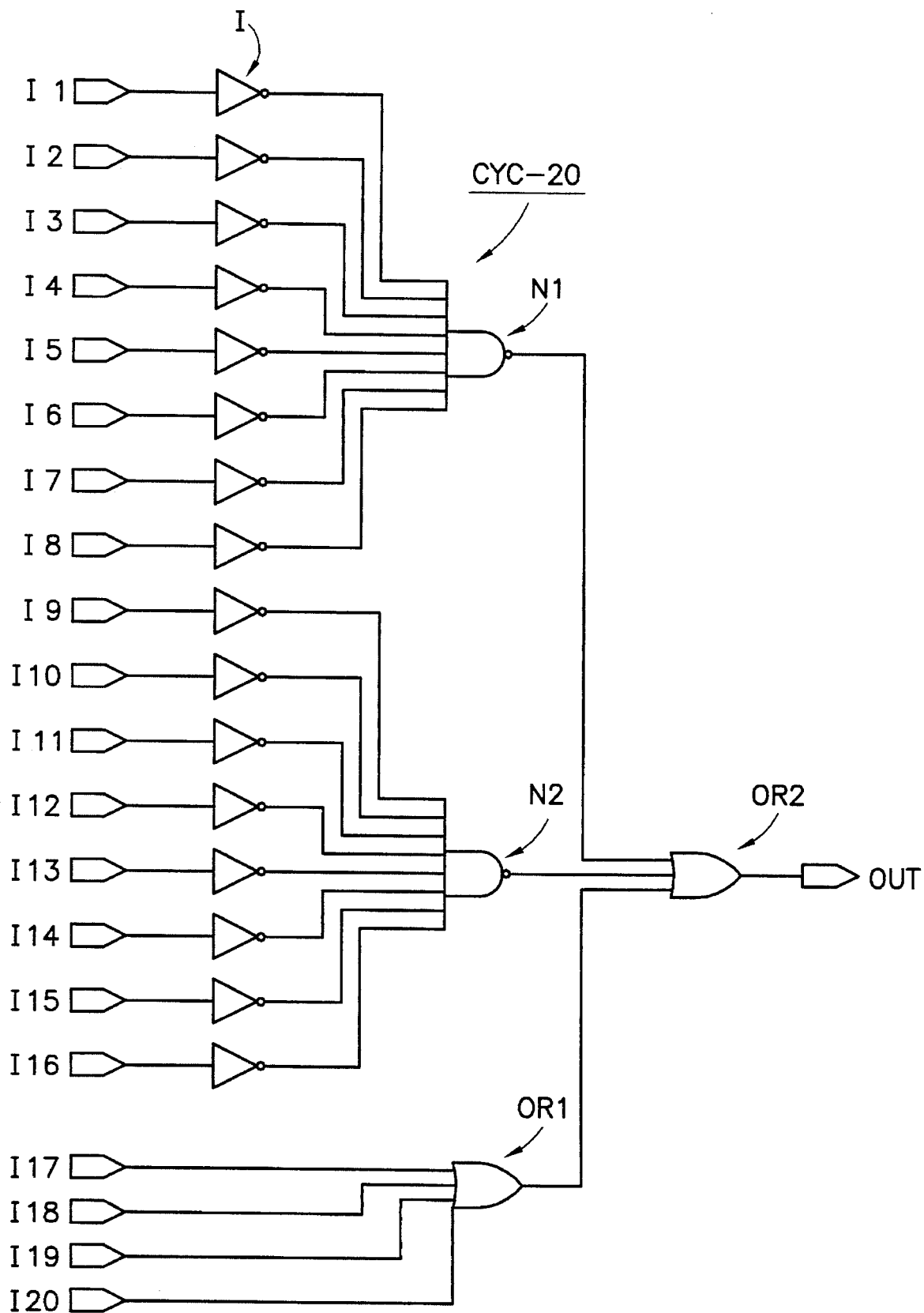
FIG. 6e shows a detailed schematic of the CYC-20 circuit shown in simplified block diagram form in FIGS. 6a and 6b.

FIG. 6e shows a detailed schematic of each of the gating circuits CYC-20A through CYC-20D. Since all of these gating circuits are substantially identical in design and function, only one will be described herein for purposes of simplicity.

Each of the inputs I-1 through I-16 of the CYC-20 circuit are coupled to an associated 8 input NAND gate N1 through inverters I. The remaining inputs I-17 through I-20 are coupled to associated inputs of an OR gate OR-1. The outputs of the N-1, N-2, and OR-1 gates are coupled to associated inputs of OR gate OR-2, the function of the gating circuits being to selectively and sequentially deliver any one of the signals applied to inputs I-1 through I-20 to a common output OUT.

Figure 6F:
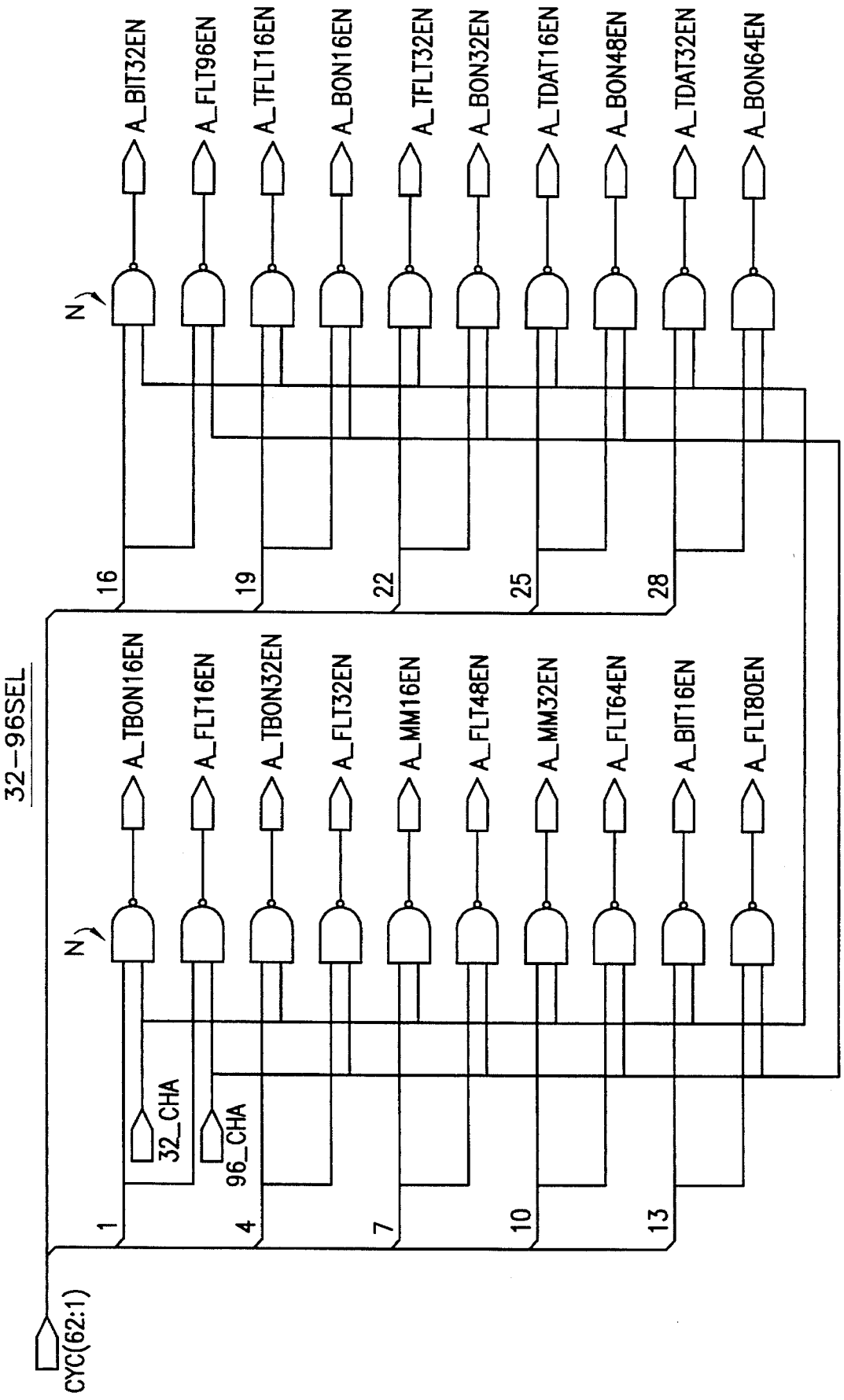
FIG. 6f shows a detailed schematic of the 32-96 SEL circuit shown in simplified block diagram form in FIG. 6b.

In addition to application of the outputs of the decoder ARINC-DEC to gating circuits CYC-20A and CYC-20B these outputs are further coupled through bus CYC(62:1) to gating circuits CYC-20C and CYC-20D, as well as being applied through an array of inverters I to a plurality of output terminals A-TEST-5EN-L through A-DAT-96EN-L shown in the upper right-hand portion of FIG. 6b and further to a gating circuit 32-96SEL shown in greater detail in FIG. 6f. The output signals of the circuit 32-96SEL and the output signals from the array of inverters I arranged above circuit 32-96SEL are utilized for enabling the transfer of data within interface 10 as will be more fully described. The circuits CYC-20C and CYC-20D are substantially identical in design and function to circuit CYC-20A and CYC-20B and a detailed description will be omitted for purposes of brevity, it being understood that the timing of signals coupled to the inputs of CYC-20C and CYC-20D is the same as those applied to the inputs of CYC-20A and CYC-20B.

The circuit 32-96SEL shown in FIG. 6f receives ten selected inputs from bus CYC(62:1), which signals are developed by the ARINC-DEC decoder circuit shown in FIG. 6a and shown in greater detail in FIG. 6d. These outputs are selectively gated with signals from 32-CHA and 96-CHA applied from the outside world to interface 10 to respectively control redundant mode and non-redundant mode operation for selecting outputs for controlling registers and busses (to be more fully described) respectively used for processing 16 bit and 32 bit registers which signals are utilized in a manner to be more fully described.

Figure 6G:
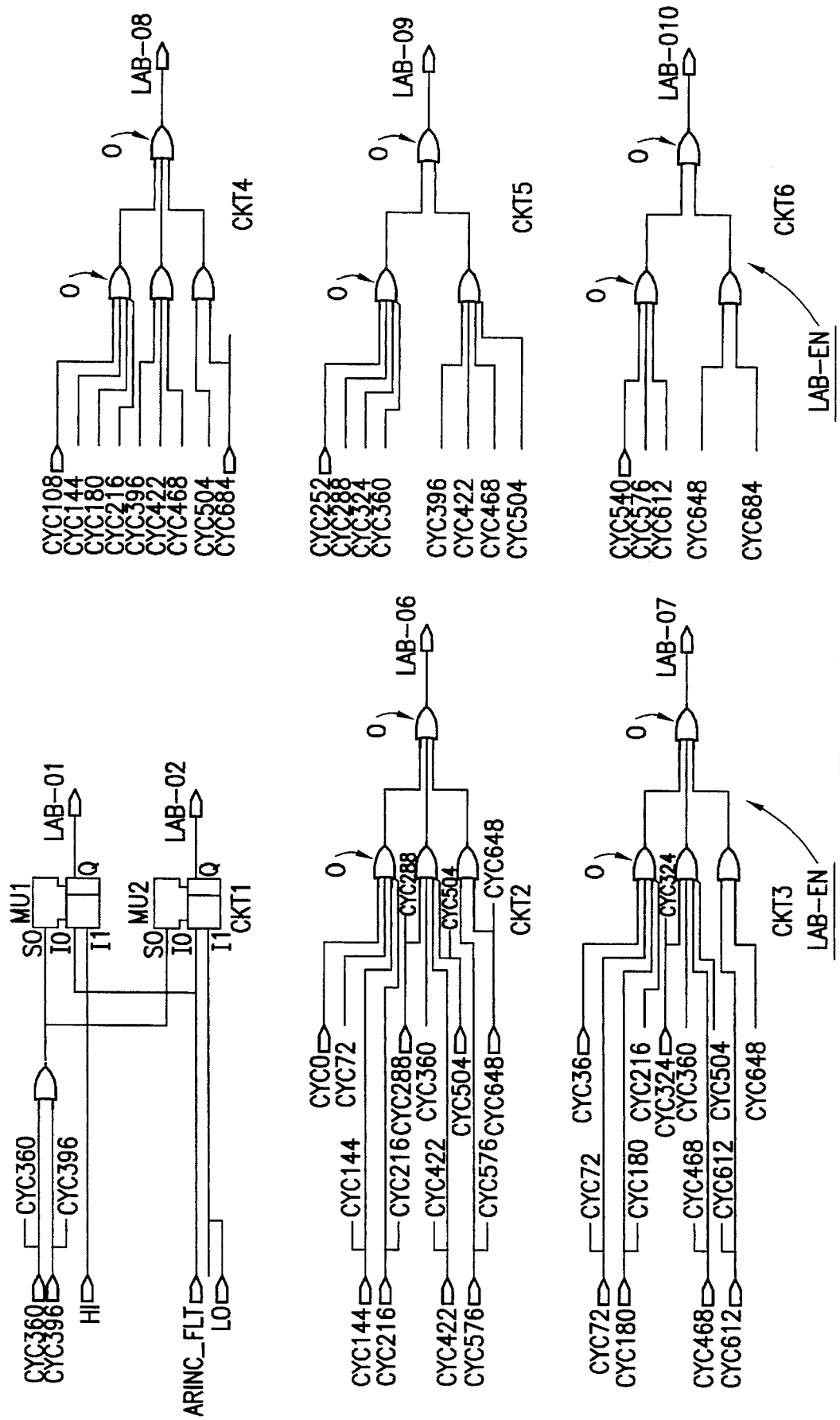
FIG. 6g shows a detailed circuit diagram of the LAB-EN circuit shown in simplified block diagram form in FIG. 6h.
Figure 6H:
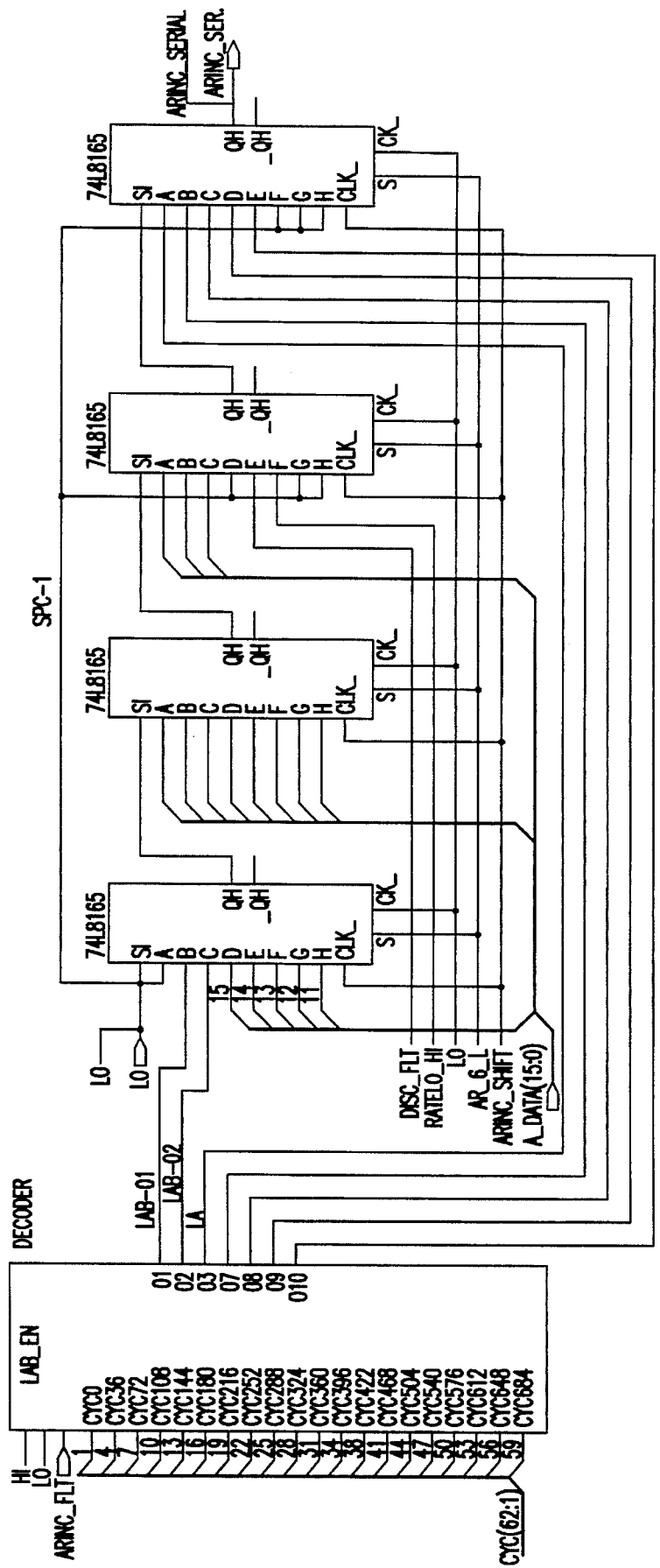
FIG. 6h shows the simplified block diagram of the LAB-EN circuit and the parallel to serial converter employed in the TRANS circuit of FIG. 6.

FIG. 6h, forming part of the TRANS circuit, includes a decoder LAB-EN which receives selected inputs from the decoder ARINC-DEC through bus CYC(62:1). FIG. 6g shows the gating circuits making up the circuit LAB-EN in greater detail.

The six circuits CKT-1 through CKT-6 which make up LAB-EN yield seven different outputs LAB-01, LAB-02 and LAB-06 through LAB-010, respectively. These outputs are selectively coupled to a first-stage register REG-1 and a last-stage register REG-4 of a parallel to serial converter circuit PSC-1 made up of registers REG-1 through REG-4. The data transferred by the parallel to serial converter PSC-1 is transferred out at a rate which is synchronous with the ARINC transmission system. Each register stage REG-1 to REG-4 is capable of receiving 8 bits in parallel (see inputs A through H arranged from top to bottom along the left-hand edge of each register as shown by register REG-4 in FIG. 6a).

A 16-line data bus A-DATA (15:0), see FIG. 4b, obtained from the output bus DATA(15:0) respectively couples data bits on bus lines 15 through 11 to inputs D through H of register stage REG-1. Data bits on lines 10 through 3 are respectively coupled to inputs A through H of register stage REG-2 and data bits on lines 2 through 0 are respectively coupled to inputs A through C of register stage REG-3. Each output LAB-01 through LAB-010 couples a sequencing signal through the OR gates O as shown for transfer into selected inputs of the registers REG-1 and REG-4. Outputs LAB-01 an LAB-02 are coupled to inputs B and C of register stage REG-1 in outputs LAB-06 through LAB-010 are respectively applied to inputs A through E of register stage REG-4.

Data is shifted out under control of the shift pulse ARINC-SHIFT derived from gates GA through GG inverters IA and IB and flip-flop FF-1 of FIG. 6a, to provide the clock pulse ARINC-CLK which selects either the 80 microsecond input 80-US-CLK or the 10 microsecond input 10-US-CLK according to whether the clock rate should be low or high determined by the rate-low/high signal applied to input RATELO-HI. The ARINC-CLK clock signal from the output of gate GF is utilized to develop the ARINC-SHIFT signal (see output of gate GG) which is further determined in accordance with whether the system is operating in a redundant mode (input signal 32-CHA) or a non-redundant mode (input signal 96-CHA) which signals are utilized to control gates GA through GC, inverter IB and flip-flop FF-1 to control the pulse length of the signal ARINC-G-L shown in FIG. 6a and derived from gates GH-GV, inverters IC and IE and divide-by-two circuits D/2-1 and D/2-2 which generate the signals AR-G-L (at the output of gate GV) and ARINC-CNT-2 (at the output of gate GT). Inverter IC receives the one microsecond clock signal from a system clock provided to interface 10 by the outside world. The gates GH–GK and GL–GR connected in tandem, lengthen the clock pulse applied thereto. The one microsecond clock is divided down to provide the signals AR-G-L and ARINC-CNT-2 which is a pulse of 4 microsecond pulse length for controlling a test register to be more fully described.

The normal transmission rate of the ARINC-429 transmitter is derived from the gates GW, GX, GY, inverters IF through II and flip-flops FF-2 and FF-3 to develop the 100 millisecond clock rate signal appearing at output ARINC-100 RDY (see Q output of FF-3 in FIG. 6a).

The output ARINC-SERIAL of parallel-to-serial converter PSC-1 shown in FIG. 6h is coupled to one input of gate GAA shown in FIG. 6a. When the timing signal for transmitting the parity bit is developed by the output OUT of CYC-20A, the parity bit is transferred by gates GZ and GAB to inverter IH in FIG. 6b. When the parity timing signal is absent, gate GAA couples an output bit from the output of parallel-to-serial converter PSC-1 through gates GAA and GAB (FIG. 6a) and inverter IH (FIG. 6b) through flip-flop FF-7 which is clocked by the signal ARINC-SHIFT appearing at the output of gate GG of FIG. 6a. The inverted state of the output at gate GAB is also clocked into FF-6 by ARINC-SHIFT. The parity bit is generated by one bit logical summing of each data bit and also is applied to the output lines OUT-429-L and OUT-429 shown in FIG. 6b. The line OUT-429 is applied to the clock input of flip-flop FF-5 shown in FIG. 6a, to provide a parity bit at the D output of FF-5 which output is coupled to the D input of FF-5 to obtain logical summing. The parity bit output, as was set forth hereinabove, is coupled to one input of gate GZ. The transfer timing of the parity bit is controlled by the output OUT of CYC-20A. The resetting of the parity bit flip-flop FF-5 is controlled by the output OUT of CYC-20B. The output signal from gate GAE, derived from gates GAC and GAD, is utilized to reset the parity flip-flop FF-5.

Figure 7:
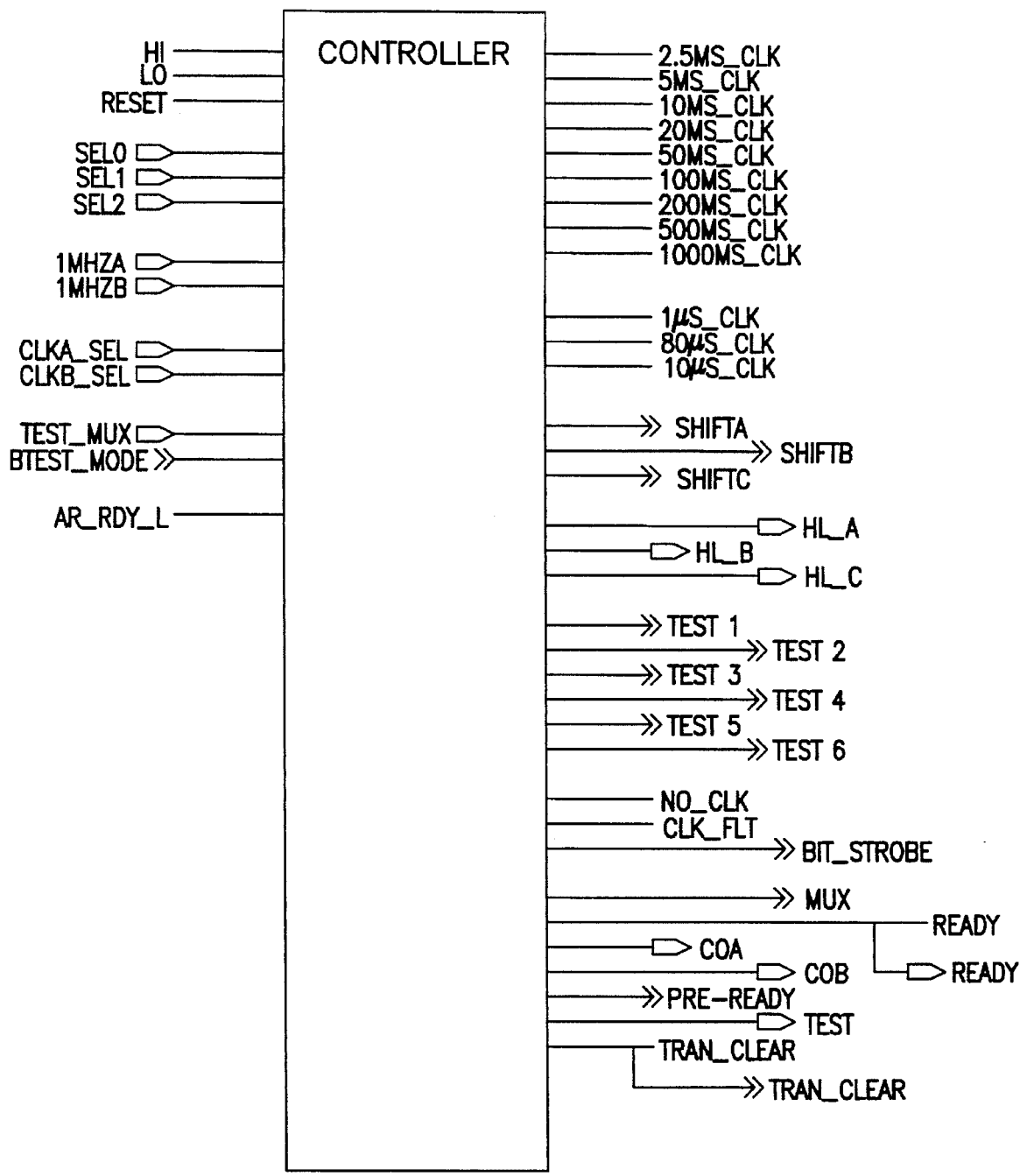

The controller circuitry CONTROLLER shown in simplified block diagram form in FIG. 7 and which forms a part of the circuitry 20 of FIG. 4b, generates a plurality of sampling rates, selects the desired sampling rate of the interface 10 by the inputs SEL-0 through SEL-2 derived from the outside world and also controls the time in which each one of the six different self-tests, TEST-1 through TEST-6, are performed.

FIGS. 7a through 7f comprise the detailed circuitry making up the circuitry CONTROLLER of FIG. 7. FIG. 7a is comprised of a multi-stage divider containing a plurality of divide-by-five circuits D/5-1 through D/5-5 and a plurality of divide-by-two circuits D/2-1 through D/2-8. In addition, multiplexer circuits MU-1 and MU-2 are provided. The one microsecond clock is applied to the clock input line 1-US-CLK. The reset input AR of each of the divide-by-five and divide-by-two counters are coupled to the line receiving the reset input RESET. The three divide-by-five stages D/5-1 through D/5-3 provide a 2.5 millisecond output, 2.5 MS-CLK. The CO output is generated by the circuitry shown in FIG. 7d and derived from the signals COA and COB generated in FIG. 7b. The clock A select input CLKA-SEL (FIG. 7d) is applied to one input of gates G-2, G-7, G-9 and G-12 and to inverter I-1. The inverted input of CLKA-SEL is applied to one input of gates G-1, G-6, G-8 and G-11 after having been inverted by inverter I-1. AND gates G-1 and G-2 respectively receive outputs COA and COB from the divider circuitry of FIG. 7b, to be more fully described. The clock B input is applied to a terminal CLKB-SEL derived from the outside world which, in turn, is applied to one input of gates G-6 and G-7. Gates G-8 and G-9 respectively receive the 20 microsecond outputs 20-US-A and 20-US-B respectively, likewise derived from the divider circuitry shown in FIG. 7b.

The divider circuitry of FIG. 7b is comprised of divide-by-two circuits D/2-9 and divide-by-five circuits D/5-6 through D/5-9 and multiplexers MU-3 through MU-6. A one megahertz input is applied to the clock inputs CLK of D/2-9, D/5-6 and D/2-10 by way of the primary clock line ONE MHz-A. The divider circuit comprised of divider stages D/2-9 and D/5-6 and D/5-7 is identical to the divider circuit comprised of divider stages D/2-10, D/5-8 and D/5-9 with the clock input being the redundant clock line ONE MHz-B. The first stages of the parallel divider circuits D/2-9 and D/2-11 divide the one megahertz clock signal by two to provide a 500 KHZ output. Stages D/5-6 and D/5-7 provide 100 KHZ outputs. Stages D/2-10 and D/2-12 similarly provide 50 KHZ (20 USEC) outputs.

Multiplexer MU-3 selects between the 500 KHZ and 50 KHZ outputs depending upon the state of the test mode signal applied on line TEST-MODE. Multiplexer MU-4 selects between the 500 KHZ and 50 KHZ outputs dependent upon the state of the signal applied to the input TEST-MODE. The multiplexers MU-5 and MU-6 operate in a manner substantially identical to multiplexers MU-3 and MU-4, respectively.

FIG. 7c shows another divider circuit comprised of two divide-by-two divider stages D/2-13 and D/2-14 to divide the 20 microsecond clock input CO (see FIG. 7d) down to an 80 microsecond output appearing at the output line 80 US-CLK. The divide-by-five stage and the divide-by-two stage D/5-8 and D/2-15 are provided to divide down the one microsecond clock to a 10 microsecond clock signal appearing at the output 10 US-CLK.

The divider circuitry of FIG. 7a receives the 20 microsecond clock at the input EN of D/5-1 and, at the output of divide-by-five stage D/5-3 provides a 2.5 millisecond clock and at the respective divide-by-two stages D/2-1 through D/2-8 provides 5 millisecond, 10 millisecond, 20 millisecond, 50 millisecond, 100 millisecond, 200 millisecond, 500 millisecond and 1,000 millisecond clock outputs. These outputs are all gated into an eight-input multiplexer MU-2. The enable input EN of first divide-by-two stage D/2-1 is derived from multiplexer MU-1 which selectively couples either the output of the divide-by-five circuit D/5-3 (2.5 ms) or the signal CO (20 US) to the output of multiplexer MU-1 under control of the signal level at the input line TEST-MODE.

Multiplexer MU-2 receives the three inputs SEL-0, SEL-1 and SEL-2 which select one of the eight clock signals ranging from 5 milliseconds to 1,000 milliseconds as was described hereinabove to provide a shift clock out for shifting data in accordance with the desired data rate for controlling the interface 10 by means of a source external to the interface.

FIG. 7d provides, in addition to the CO output, a clock fault signal at output CLK-FLT if either the primary clock or the redundant clock fail. In the event that neither clock (CLKA or CLKB) is present, a signal is provided at the output terminal NO-CLK if both clocks fail.

A 20 microsecond signal is generated either by the primary clock at output 20-USA or by the redundant clock at output 20-USB (see FIG. 7b). These outputs are applied to gates G-8 and G-9 to provide a 20 microsecond output signal at output 20-US-CLK.

The one microsecond primary clock 1-MHz-A and the one microsecond redundant clock 1-MHz-B are respectively applied to gates G-11 and G-12 to provide a one microsecond clock output signal at terminal 1-US-CLK which is utilized to drive everything in the interface 10.

Figure 7F:
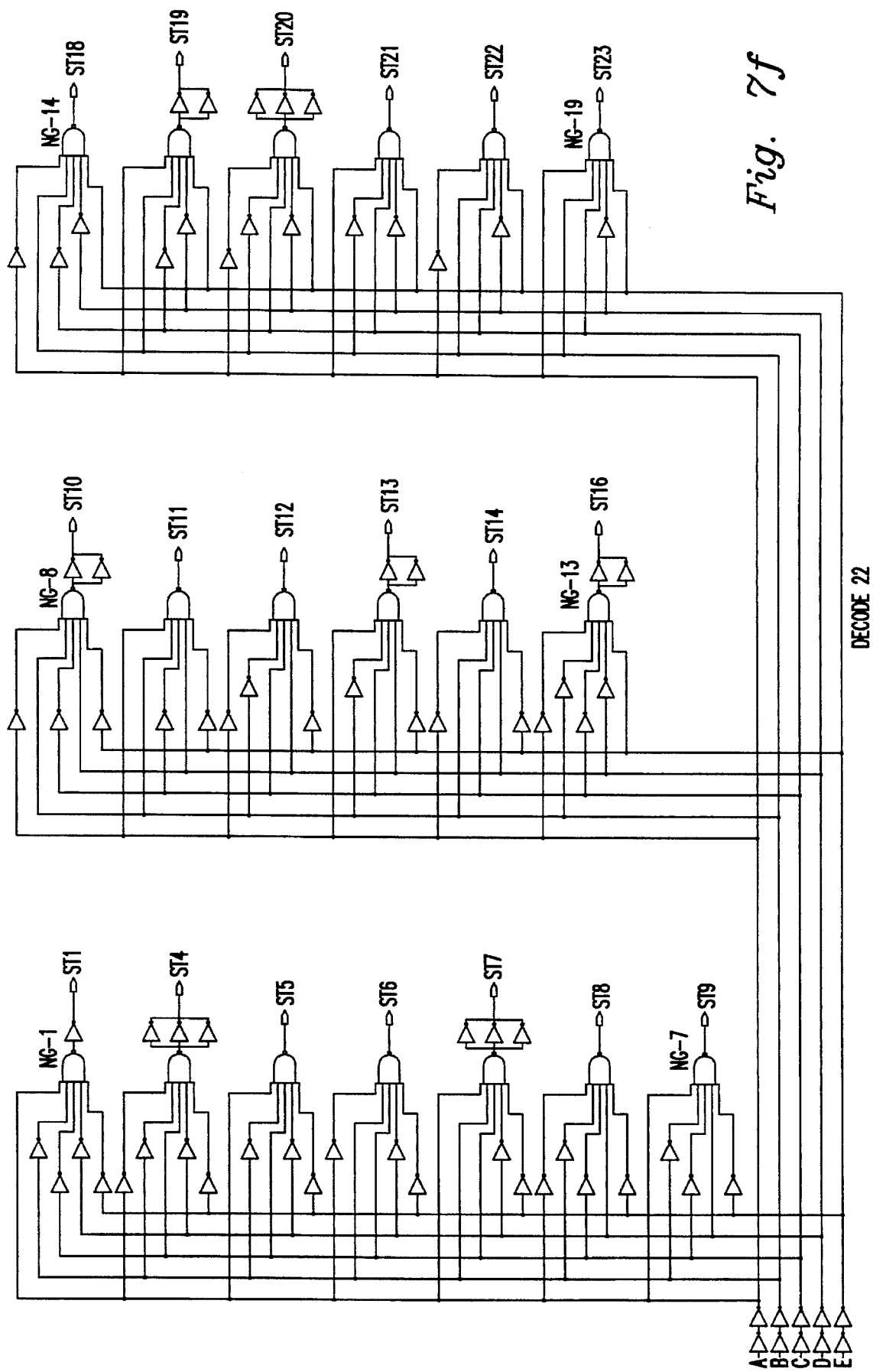
FIG. 7f is a detailed schematic of the DECODE-22 shown in simplified block diagram form in FIG. 6e.

FIG. 7e, together with FIG. 7f, provides the test mode and shifting signals. Gate G-15 in FIG. 7e looks for either a shift clock output from multiplexer MU-2 in FIG. 7a or a RESET signal. Upon the occurrence of a shift clock signal selected from the group of eight possible sampling rates (MU-2, FIG. 7a), the 20 microsecond clock causes the four-stage counter CTR-1 and divide-by-two circuit D/2-16 to develop a 5 bit binary output which outputs are respectively coupled to the five inputs A through E of the decode circuit DECODE-22 for generating a plurality (19) of strobe signals at its outputs ST-1 through ST-23. FIG. 7f shows the detailed gating circuitry of DECODE-22 employed for generating the strobe signals ST-1, ST-4, ST-5 and so forth through ST-23, input terminals A through E being shown in the lower left of Fig. F for receiving the A through E outputs of counter CTR-1 and divide-by-two circuit D/2-14 shown in FIG. 7e. For example, ST-1 is generated by inverters I-1 through I-5, and NAND gate NG-1 to provide the ST-1 signal when A, B, C, D and E are respectively in the binary states "1", "0", "0", "0", "0". The remaining states ST-4, ST-5 and so forth through ST-23 are sequentially obtained in a like manner by decoding the outputs of CTR-1 and D/2-16.

The timing strobes are fed through bus ST(23:00) to the gating circuits shown along the right-hand portion of FIG. 7e for generating the shift pulses and test pulses as shown. The gating circuits of FIG. 7f basically utilize either an AND gate or a NAND gate, as shown, together with appropriate inverters to derive the desired timing pulses. For example, ST-1 is derived from A, B-L, C-L, D-L and E-L. The remaining outputs are derived from other 5 bit binary combinations, as shown at the input of each NAND gate. The timing signals SHIFTA through SHIFTC, HL-A through HL-C, MUX, and TEST-1 through TEST-6 are utilized in a manner to be more fully described.

FIGS. 8-1, 8-2, 9-1, 9-2, 10-1 and 10-2 show the circuitry MATRIX employed for forming a 3×3 matrix of the redundant or non-redundant data for mismatch and test purposes, as will be more fully described. FIGS. 8-1, 8-2, 9-1, 9-2, 10-1 and 10-2 show 32 MATRIX circuits which are substantially identical to one another in design and function and a detailed description will be given of only one typical MATRIX circuit, for purposes of simplicity.

The purpose of each MATRIX circuit, when operating in the redundant mode, is to look at the three associated inputs (channels 1, 33, 65; 2, 34, 66; 3, 35, 67, etc.) at three successive time intervals selected by the select inputs SEL-0, SEL-1 and SEL-2 applied to the multiplexer MU-2 as shown in FIG. 7a.

In the redundant mode, input channels CH1, CH-33 and CH-65 are all connected in the same discrete. These data bits identified as DATA-A, DATA-B, and DATA-C, respectively, are applied to the associated inputs of the matrix M-1. In a similar fashion, matrix M-2 receives the bits from channels CH-2, CH-34 and CH-66 which are all connected to the same discrete. The remaining 30 MATRIX circuits M-3 through M-32 likewise receive bits from three channels which are all connected to the same discrete. For example, matrix M-32 receives bits from channels CH-32, CH-64 and CH-96.

A detailed description of one typical MATRIX circuit will now be given. As shown in FIGS. 8a-1 and 8a-2, the MATRIX circuit is comprised of three three-stage shift registers SR-1, SR-2 and SR-3, each having a multiplexer circuits MU-A and MU-B and five flip-flops FFD-1 through FFD-5. Shift register SR-1 receives data from channel 1 at input DATA-A. Similarly, shift registers 2 and 3 receive data from channels SR-2 and SR-3 at inputs DATA-B and DATA-C respectively.

Shift pulses are received from the outputs SHIFTA, SHIFTB and SHIFTC shown in the upper right-hand portion of FIG. 7e. All three shift registers operate in substantially the same fashion.

The shift registers SR-1, SR-2 and SR-3 receive redundant data, i.e. a signal from the same discrete, which, in the case of the first MATRIX circuit M-1, SR-1, SR-2 and SR-3 receive a binary level from channels 1, 33 and 65, respectively.

In order to perform a "bounce" test, the data at each of these channels is sampled at intervals selected in accordance with the shift rate, i.e. from 5 to 1,000 milliseconds. The data is shifted to the right at each sample pulse into the flip-flops FFD-1, FFD-2 and FFD-3. A vote is taken to determine the presence (or absence) of a bounce condition at each channel 1, 33 and 65 by the BOUNCE circuits B-1 through B-3, respectively. If, for example, a low, high and low state are respectively loaded into FF-1, FF-2 and FF-3, this indicates a bounce condition. Alternatively, a high, low, high condition or for that matter any condition other than all three highs and all three lows indicate the presence of a bounce condition.

A detailed description of the BOUNCE circuit will be set forth herein when describing FIG. 8i.

Each of the VOTE circuits V-1 through V-3 provide an output when at least two of the three states loaded into their associated shift registers are equal (i.e. a "majority" vote). The result of the vote appears at the data output lines DATA-OUT-A, DATA-OUT-B and DATA-OUT-C. A triple redundant vote is taken by the VOTE circuit V-4 to provide a triple redundant data output resulting from the majority vote function performed on the outputs on the outputs of VOTE circuits V-1, V-2 and V-3, at terminal TRIP-DATA. Similarly, a triple redundant bounce vote is taken of the results of BOUNCE circuits B-1, B-2 and B-3 at the VOTE circuit V-5. The results of the TRIP-BOUNCE, BOUNCE-A, BOUNCE-B and BOUNCE-C tests are transferred to, and appear at the outputs of R/S flip-flops, RS-R/S-1, R/S-2, R/S-3 and R/S-4, respectively.

The circuit MISMATCH-BIT shown in FIGS. 8a-1 and 8a-2 is shown in greater detail in FIGS. 8b through 8f.

The three storage flip-flops of the channel 1 shift register SR-1 are coupled to inputs A-1, B-1 and C-1 of the MISMATCH-BIT circuit as shown in FIGS. 8a and 8b. Similarly, the three flip-flop storage stages of shift registers SR-2 and SR-3 are coupled to inputs A-2, B-2, C-2 and A-3, B-3, C-3 of the MISMATCH-BIT circuit. Each of the bits, as shown in FIG. 8b, are provided in both inverted and non-inverted form. The channel 1 bits obtained from shift register SR-1 are coupled to inputs A-1, B-1, C-1 of the MISMATCH-BIT circuit, and specifically to the inputs of AND gates AG-1 in the non-inverted form and to the inputs of AND gate AG-2 in the inverted form. AND gates AG-3 and AG-4 similarly receive the channel 1 bits (A-2, B-2, C-2) in non-inverted and inverted form, respectively and AND gates AG-5 and AG-6 receive the non-inverted bits and inverted bits of the third channel (A-3, B-3, C-3), respectively. The outputs of the AND gates AG-1 through AG-6 are coupled to respective ones of the NAND gates NG-1 through NG-6 shown in FIG. 8d.

When all the samples A, B and C of the channels 1, 2 and 3 are equal, indicating that there is no bounce condition and that all channels agree on the output, then the outputs of the gates AG-1, AG-3 and AG-5 will all be in the same state and the outputs of gates AG-2, AG-4 and AG-6 will all be in the opposite state. For example, assuming that all three samples are binary one for all three channels, gates AG-1, AG-3 and AG-5 will provide a binary one output while gates AG-2, AG-4 and AG-6, which receive the inverted input states, will all be binary one. The results of these logic operations performed by the gates in FIG. 8c are applied to selected inputs of the NAND gates in FIG. 8d in the manner shown by the input terminals. As a result, all the outputs of the gates NG-1 through NG-6 having opposing binary states supplied at their respective inputs provide a binary one output which ultimately causes NAND gate NG-7 to generate a binary zero condition. In the event that there is at least one bounce condition or in the event that one of the three channels does not compare, at least one of the NAND gates NG-1 through NG-6 will go low causing the output of NAND gate NG-7 to go high indicating a mismatch. For example, assuming that gate AG-1 receives at its A-1, B-1 and C-1 inputs binary one, binary zero and binary one, the output of gate AG-1 will be binary zero as will the outputs of AG-2 through AG-6 thereby causing NAND gate NG-7 to generate a binary one indicating a mismatch within the matrix.

FIGS. 8e and 8f show the manner in which the nine data bits of the matrix are sequentially subjected to six tests (TEST-1 through TEST-6, see FIG. 7), FIG. 8e showing the signals utilized during the test modes, which successively follow the generation of the data bits in the 3×3 matrix. During TEST-1, all three input channels are loaded with zeros. Upon the occurrence of the TEST-1 signal, the 1-N, 2-N and 3-N outputs of gates AG-2, AG-4 and AG-6 are examined by NAND gate NG-8. NAND gate NG-9 receives inputs MMN (which is MM inverted, i.e. no mismatch), BNCN (which indicates no bounce) and DATAN (which indicates that there is no data). If all inputs are high, a high output is provided at gate NOR-1. In the event that any one of the inverted inputs applied to gates NG-8 and NG-9 during the TEST-1 signal (all inputs are low) the output of gate NOR-1 will go low causing an output at gate NOR-7 to go high indicating a bit error. TEST-2 looks for all ones in the matrix, the data signal on line DATA applied to gate NG-11 being non-inverted.

TEST-3 looks for all zeros in channel 1, all ones in channel 2 and all zeros in channel 3. In this case, the signal MM is non-inverted. TEST-4 looks for all ones in channels 1 and 3 and all zeros in channel 4, the signals MM and DATA being non-inverted at this time. TEST-5 and TEST-6 are "bounce" tests, TEST-5 looking at bits B-1, B-2 and B-3 as being high and all the remaining bits of the matrix A-1, A-2, A-3 and C-1, C-2 and C-3 as being low. TEST-6 is the reverse, this test looking for bits B-1, B-2 and B-3 as being low and all the remaining bits of the matrix, namely, A-1, A-2, A-3 and C-1, C-2 and C-3 as being high. At this time, the bounce data and data inputs are non-inverted while the MM input is inverted. Each of these tests are performed at different and successive times during the test cycle, the test signals being developed by the DECODE-22 circuit of the CONTROLLER circuit shown in FIG. 7d which generates the shift signals for the three shift registers SR-1 through SR-3 of each of the MATRIX circuits as well as the TEST and TEST-1 through TEST-6 signals, shown in FIG. 7e.

FIG. 8a further shows the manner in which the outputs of the MISMATCH-BIT circuit of FIG. 8a and shown in detail in FIGS. 8b–8f are utilized.

The result of the mismatch test appearing at the output of gate NG-7 in FIG. 8d and the TEST-1 through TEST-6 signals appearing at the output of NOR-7 in FIG. 8f are respectively applied to gate G-20 and flip-flop FFD-6 to provide fault information. The triple redundant data output TRIP-DATA from the VOTE circuit V-4 is applied to one input of gate G-21 and in its inverted it is applied to one input of gate G-22. One of these states is passed by gate G-23 and is temporarily stored in FFD-7. The gates T connected in tandem between the Q output of FFD-7 and one input of gate G-24 are utilized to increase pulse length.

The results (TRIP-DATA) of the vote of the first, second and third channels (DATAOUT-A, DATAOUT-B and DATAOUT-C) are respectively applied in non-inverted and inverted form to gates G-21 and G-22 of circuits CKT-B, CKT-C and CKT-D which are identical in design and function to circuit CKT-A each including gates G-21, G-22 and G-23. The results of these tests are respectively stored in the flip-flops FFD-8 through FFD-10. The Q output of each of the flip-flops FFD-6 through FFD-10 are coupled to the clock input C through a like series of tandem connected gates T and a gate G-24.

Figures 1, 8:
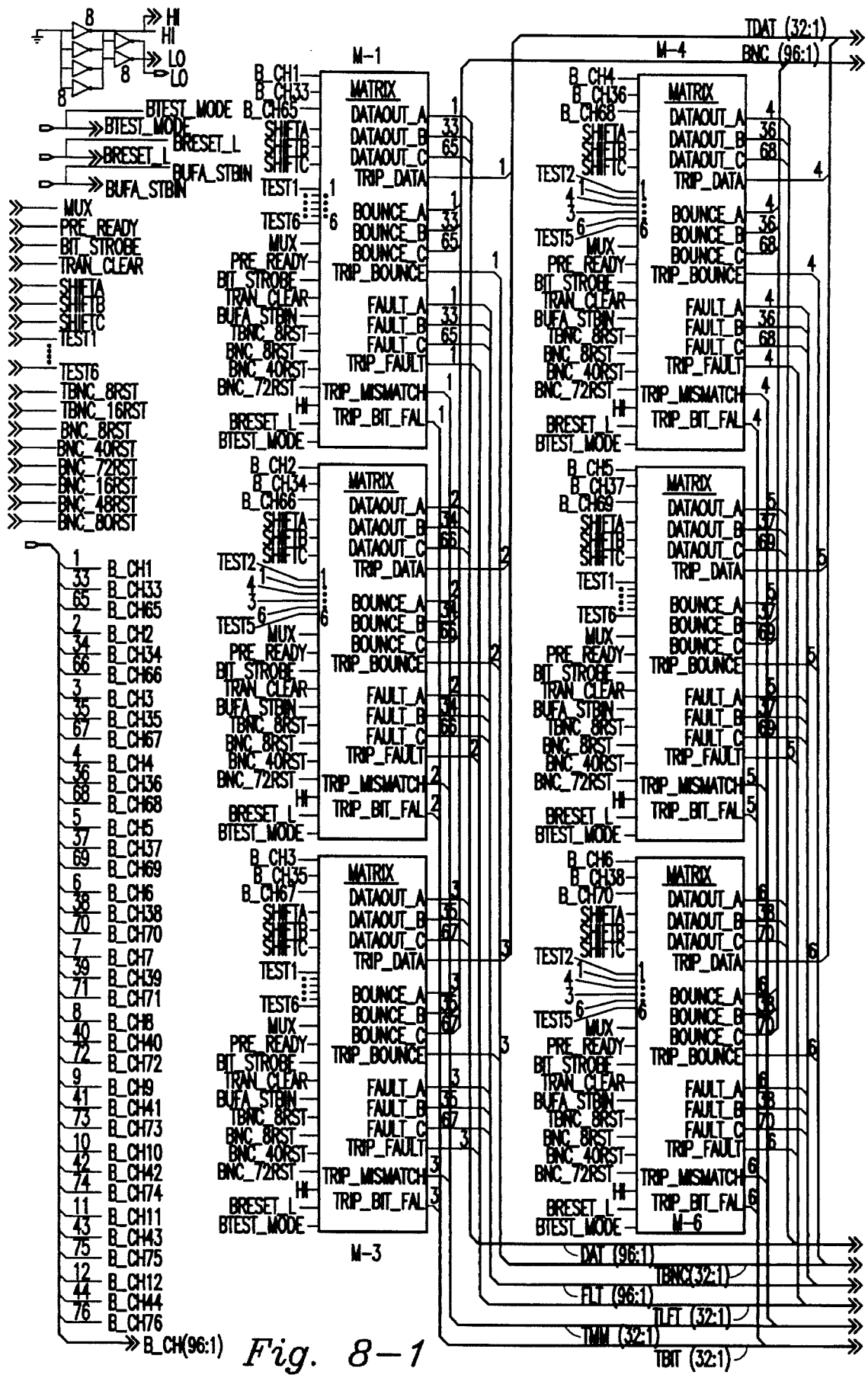
Figures 2, 8:
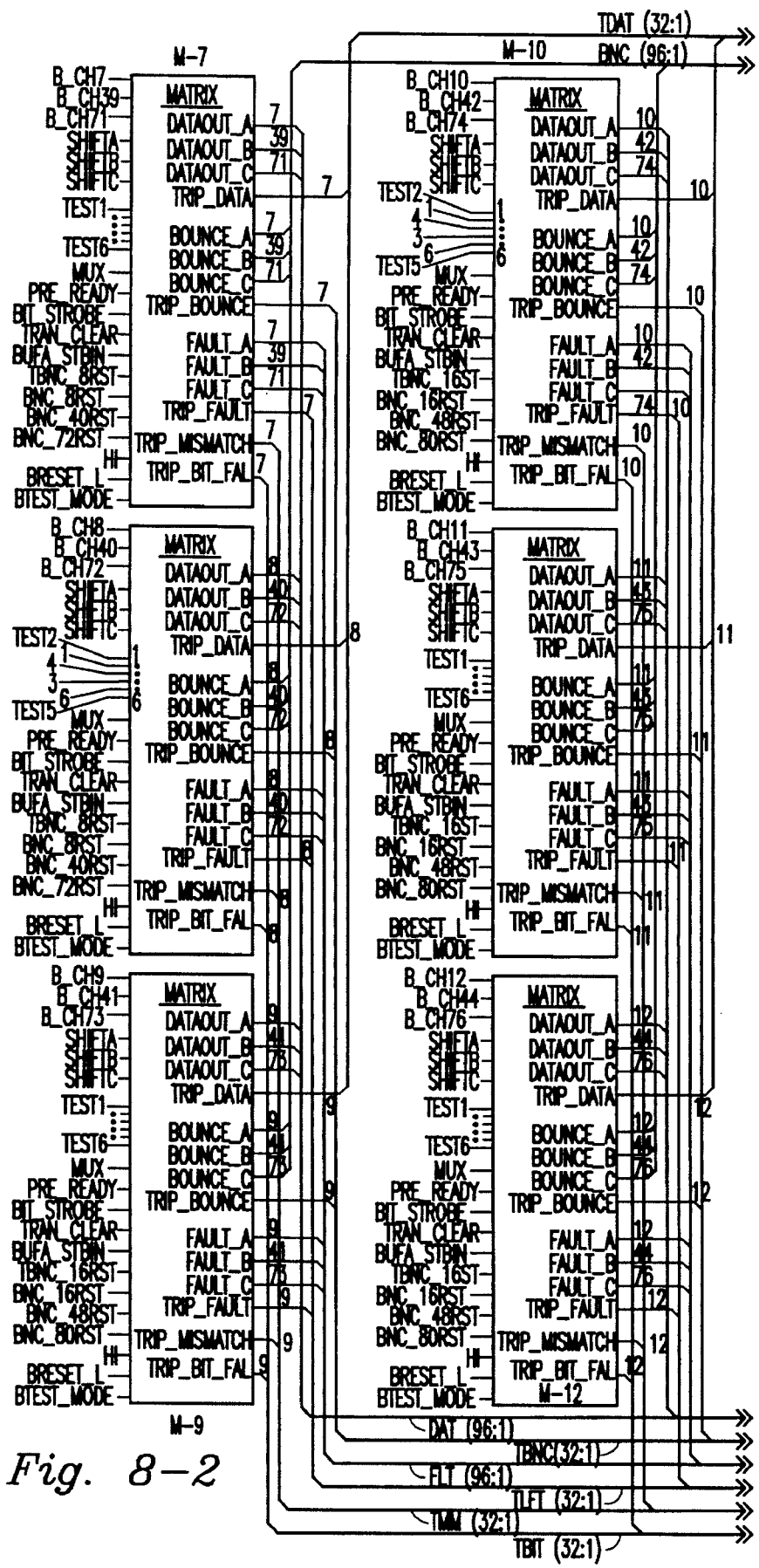
Figures 1, 8A:
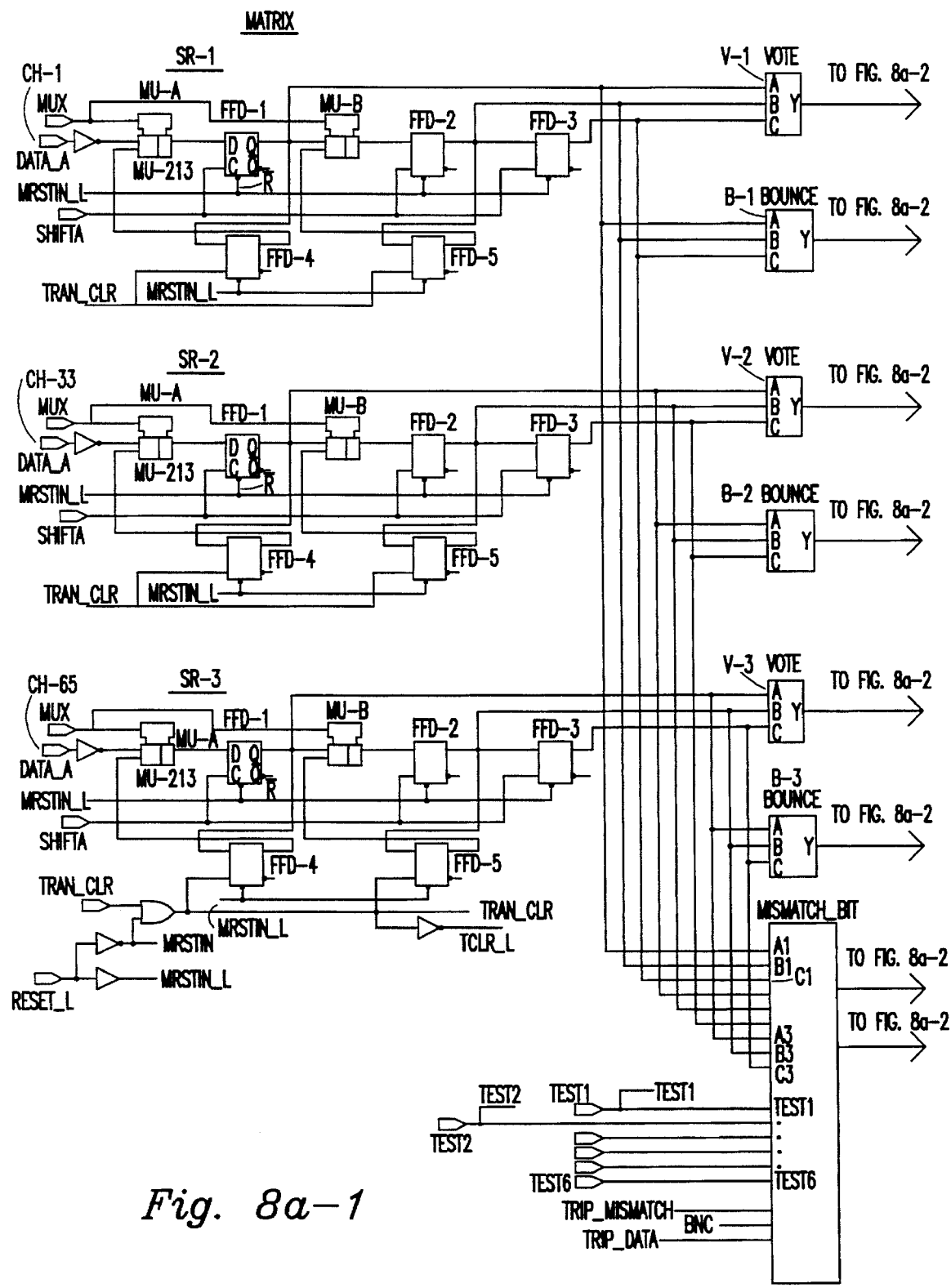
Figures 2, 8A:
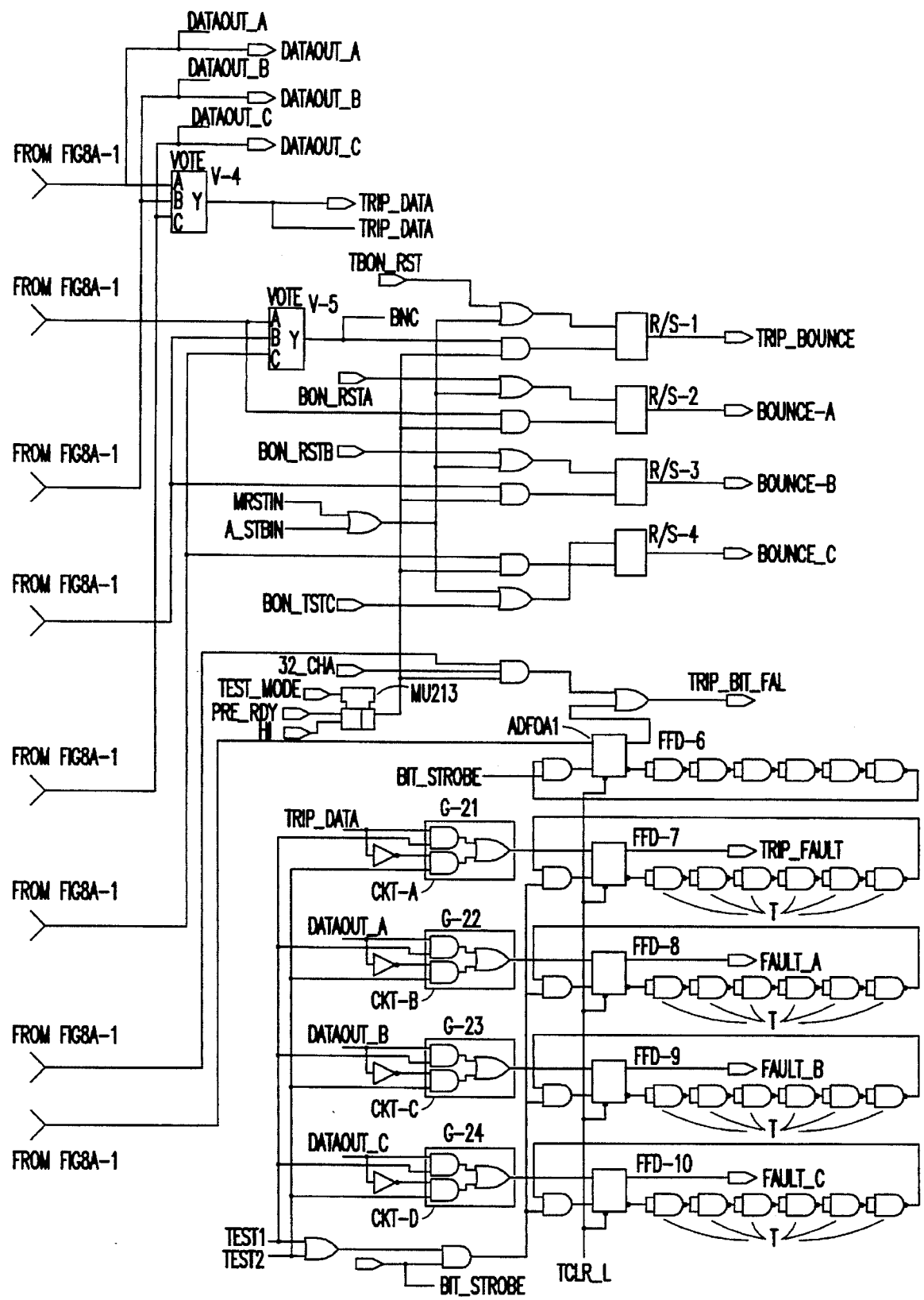
Figure 8G:
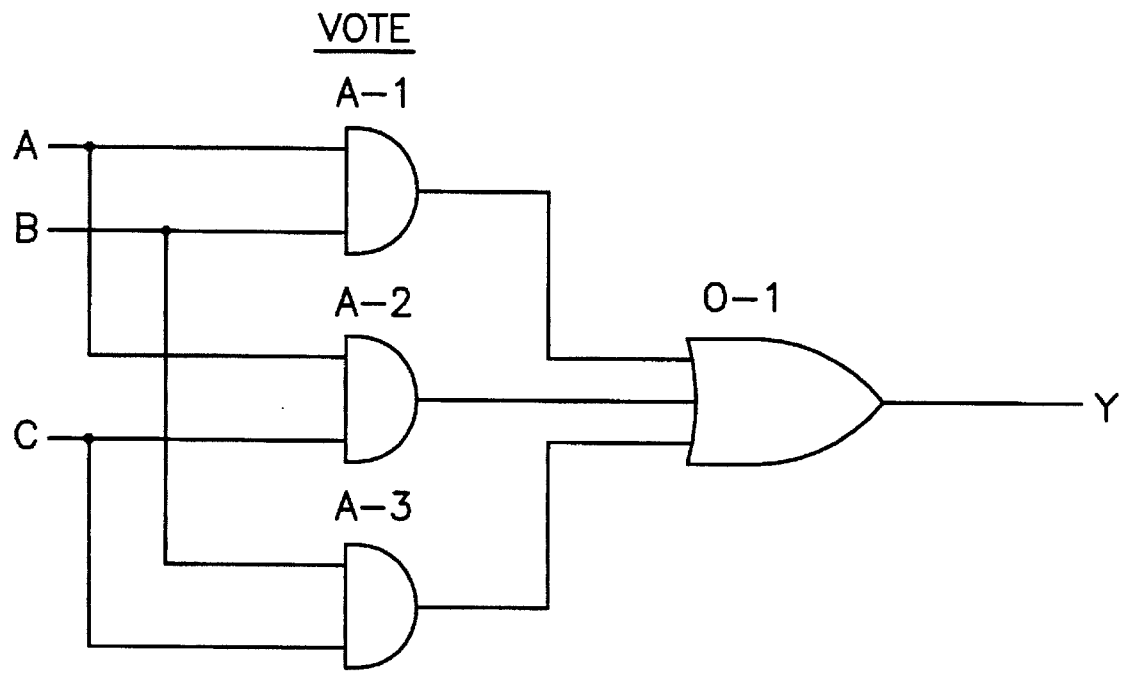

FIG. 8g shows the VOTE circuit in greater detail which is comprised of AND gates A-1 through A-3 and OR gate O-1. When any two of the three inputs A, B and C are binary one or when all three inputs are binary one, at least one of the gates A-1 through A-3 provides a high output which is coupled through OR gate O-1 to provide a VOTE output Y indicating at least a two-out-of-three vote. In the event that at least two of the three inputs A, B and C are at binary zero, the output at OR gates O-1 is low.

The BOUNCE circuit is shown in detail in FIG. 8i and is comprised of inverters I-1 through I-3, two three-input AND gates A-1 and A-2 and OR gate O-1. The inputs are Coupled in such a way as to provide a high output at A-1 if a high-low-high sequence of signals is applied to the three respective inputs of gate A-1. The inputs are connected in such a manner as to provide a high output at AND gate A-2 when a sequence low-high-low is applied to the respective inputs of gate A-2 to indicate a bounce condition.

Figure 8H:
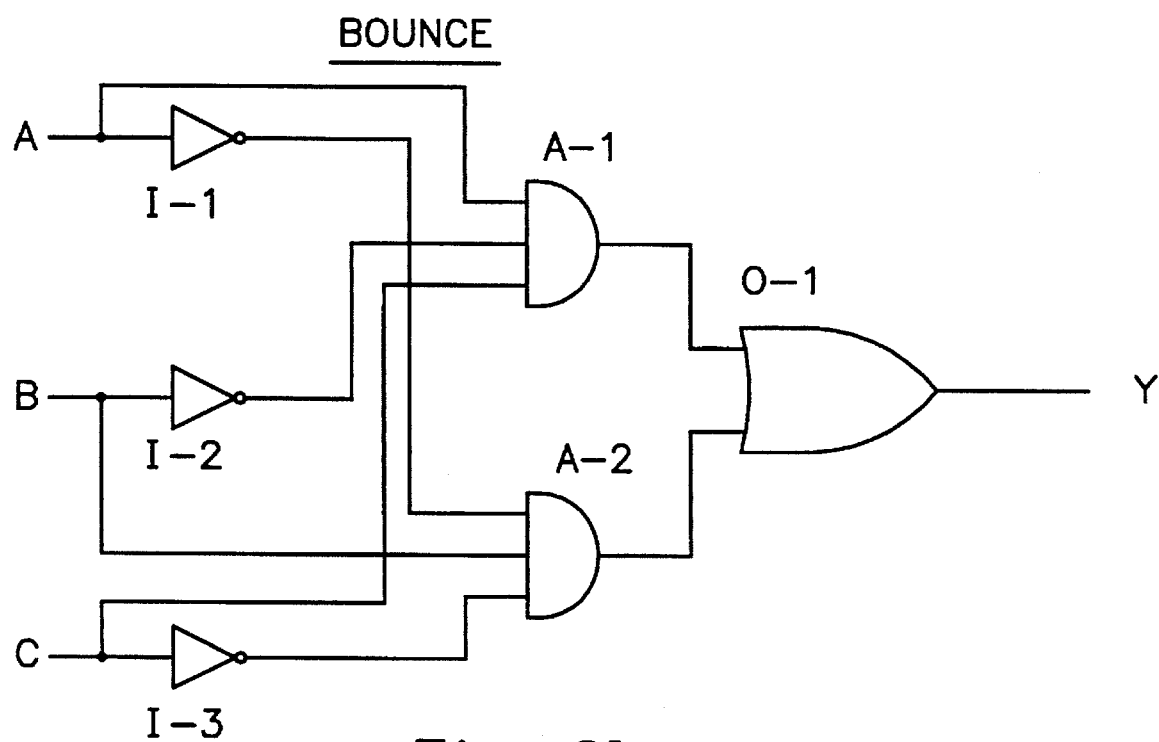

It should be understood that each MATRIX circuit M-1 through M-32 shown in FIGS. 8-1 and 10-2 includes all of the circuitry shown in FIGS. 8a-1 through 8h and, when operating in the redundant mode, all the tests set forth hereinabove are conducted for all 96 channels.

Figures 11, 12:
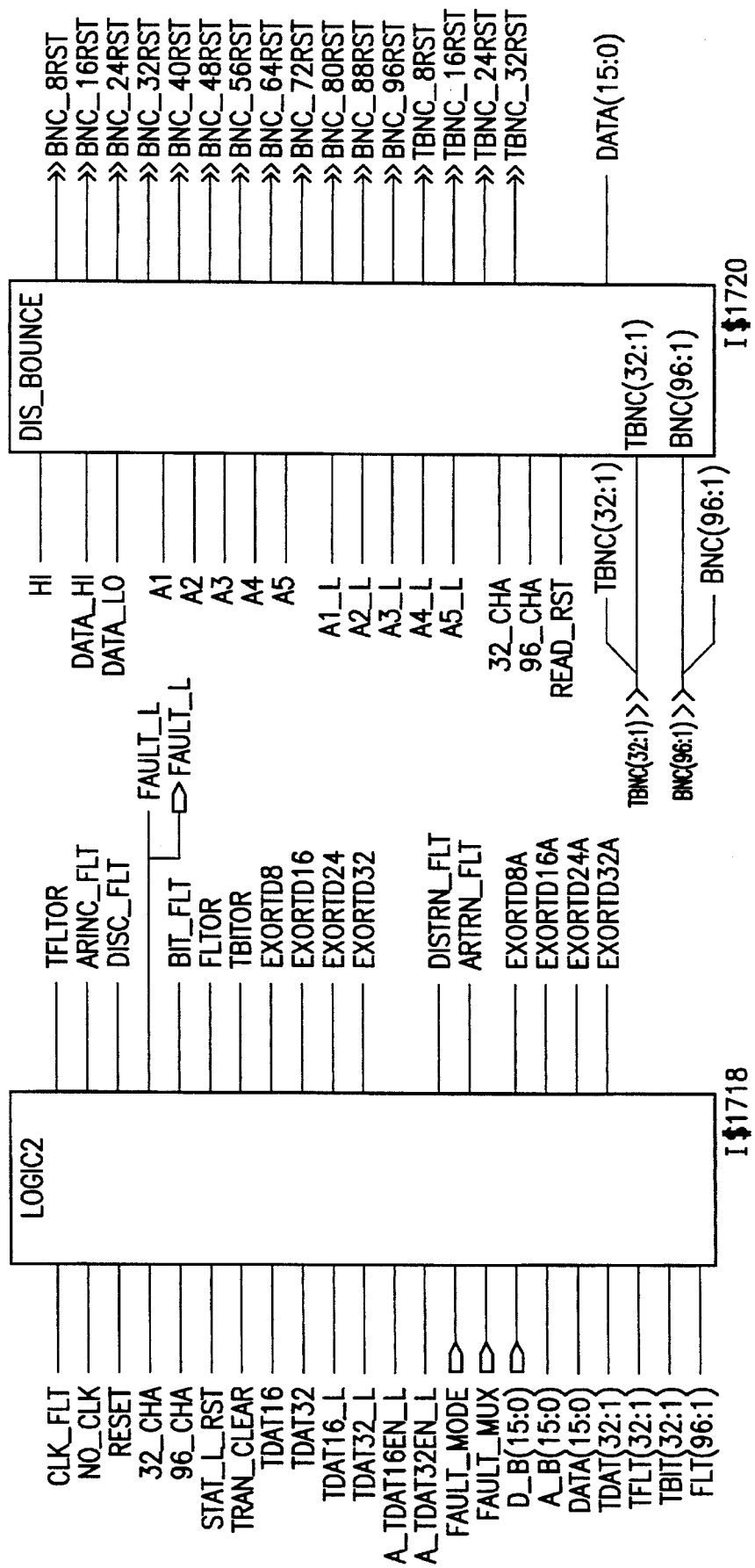

The LOGIC-2 circuit, shown in simplified block diagram form in FIG. 11, compares the data presented to the outside world by the interface 10 with data coupled to the inputs of the interface from the outside world (i.e. discretes). Noting FIG. 4b, for example, the data presented to the outside world from circuit 20 through the bus DATA(15:0) is also applied, as shown, for example, by one such line, through the output of control amplifier A-140 and buffer B-140 forming part of the pad assembly P-140 to one line of bus D-B(15:0) for test purposes. Each of the pad assemblies P-140 to P-125 is coupled to an associated line of the D-B(15:0) bus in a similar manner.

Figures 1, 10:
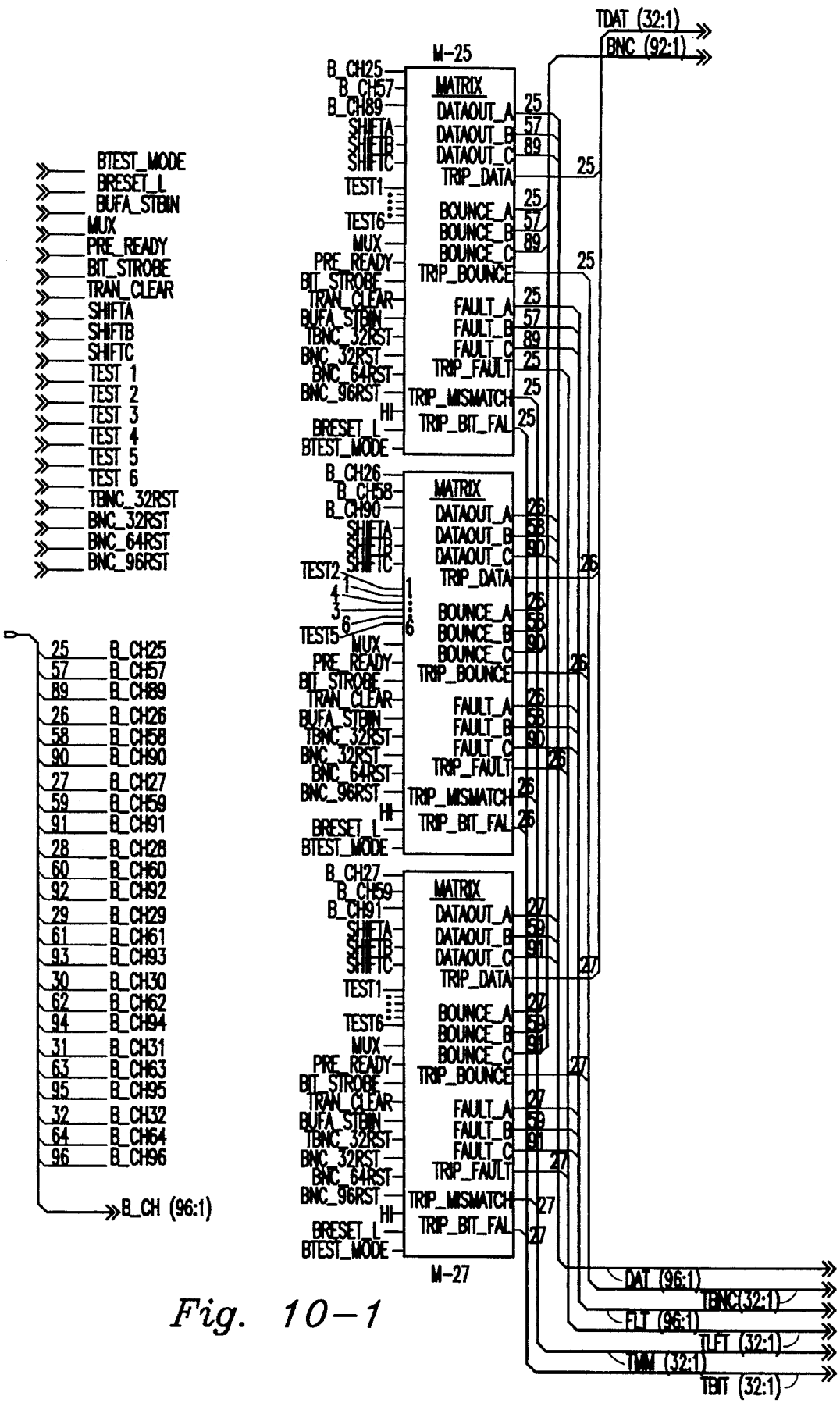
Figures 2, 10:
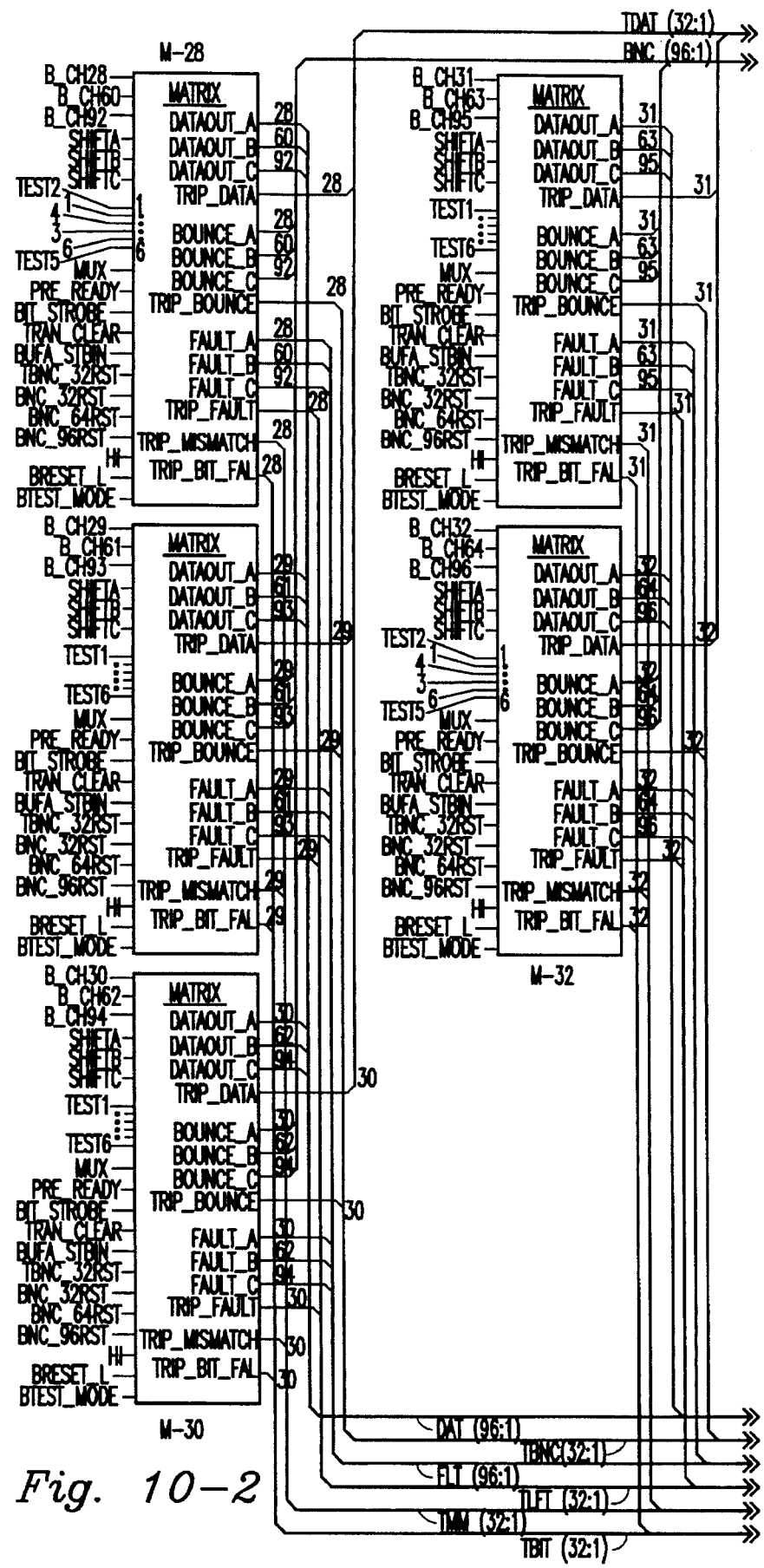
Figure 11A:
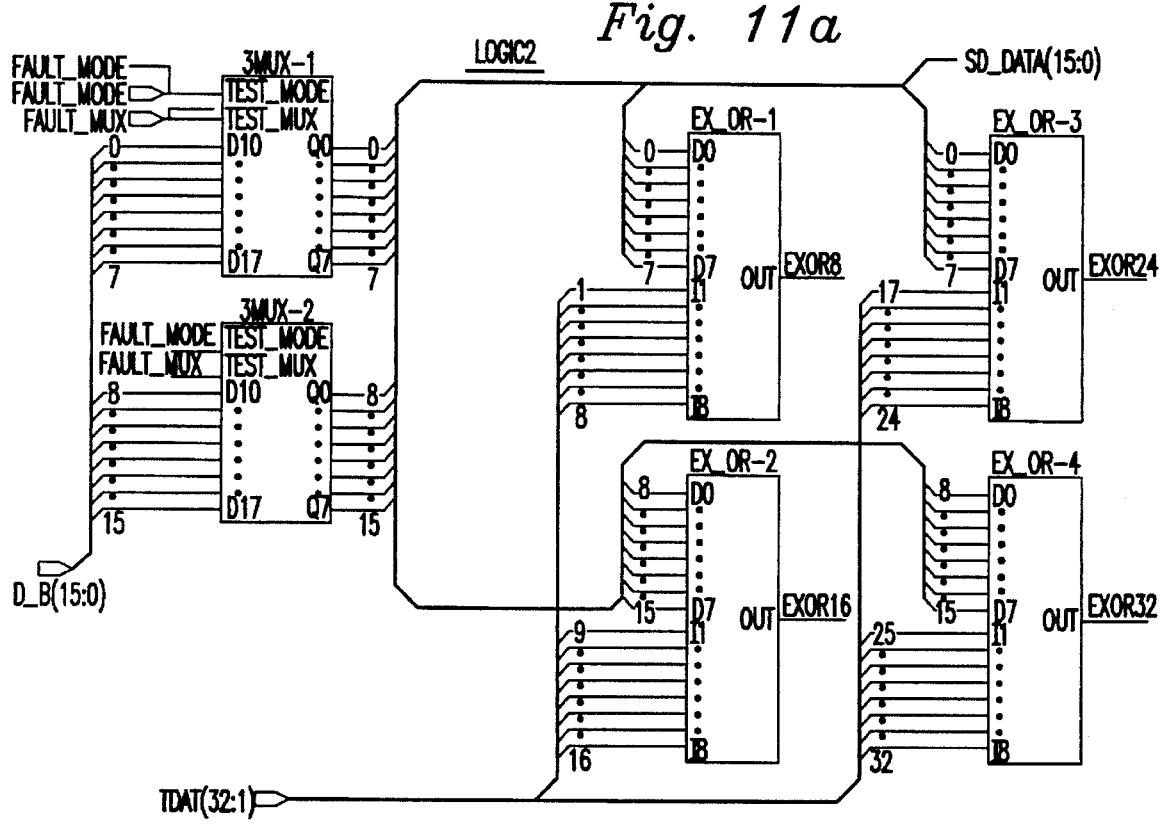
FIGS. 11a, 11b, 11c and 11d show the LOGIC-2 circuit of FIG. 11 in greater detail.
Figure 11B:
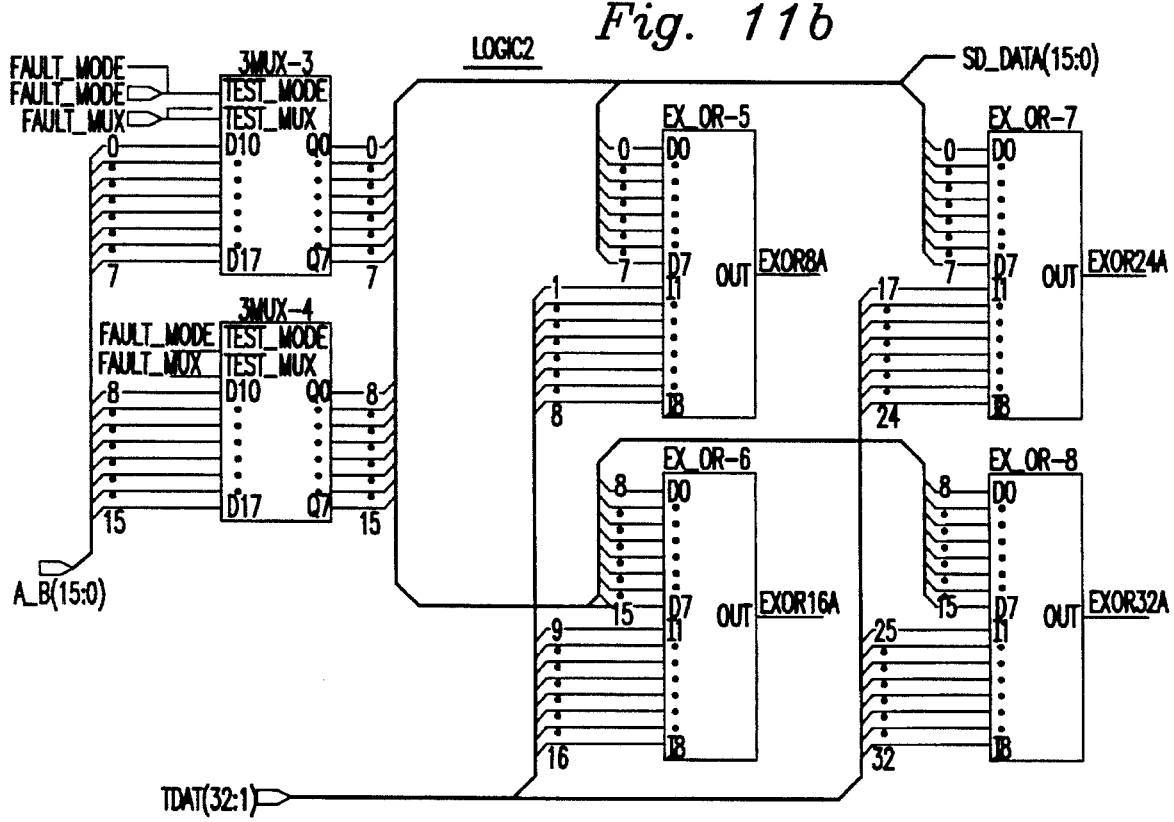
Figure 11C:
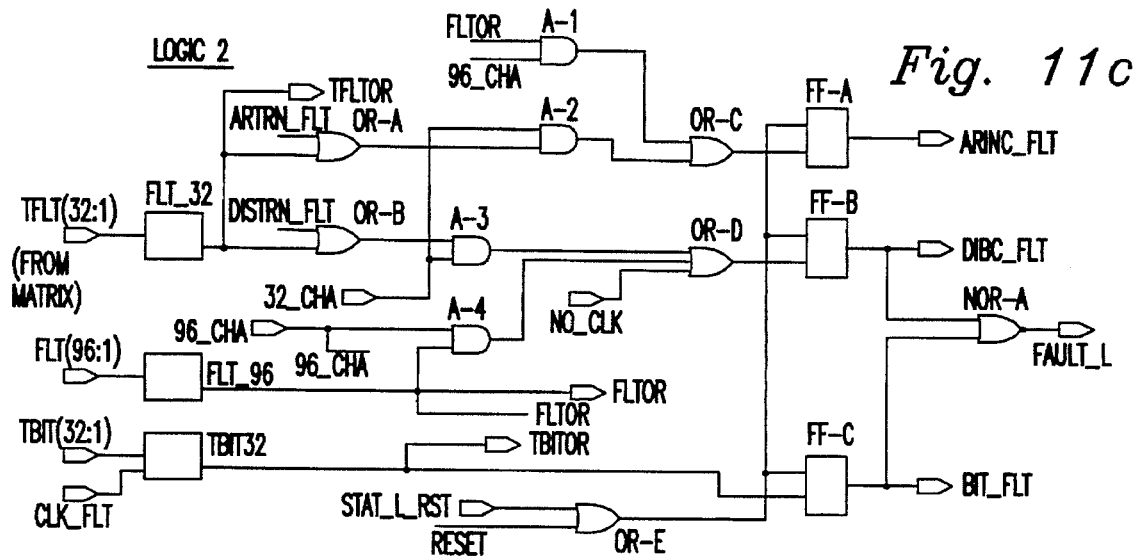
Figure 11D:
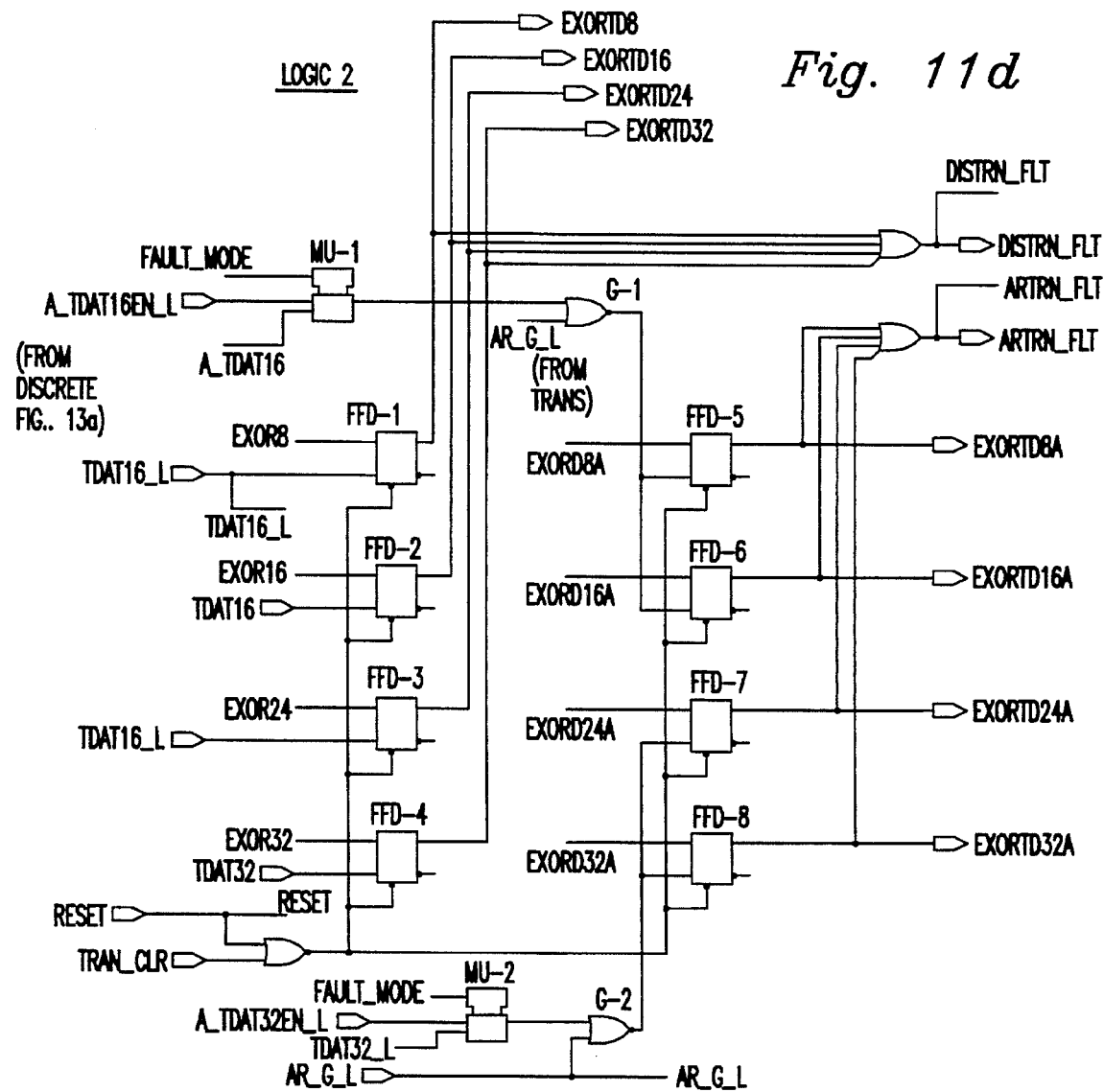
Figure 11E:
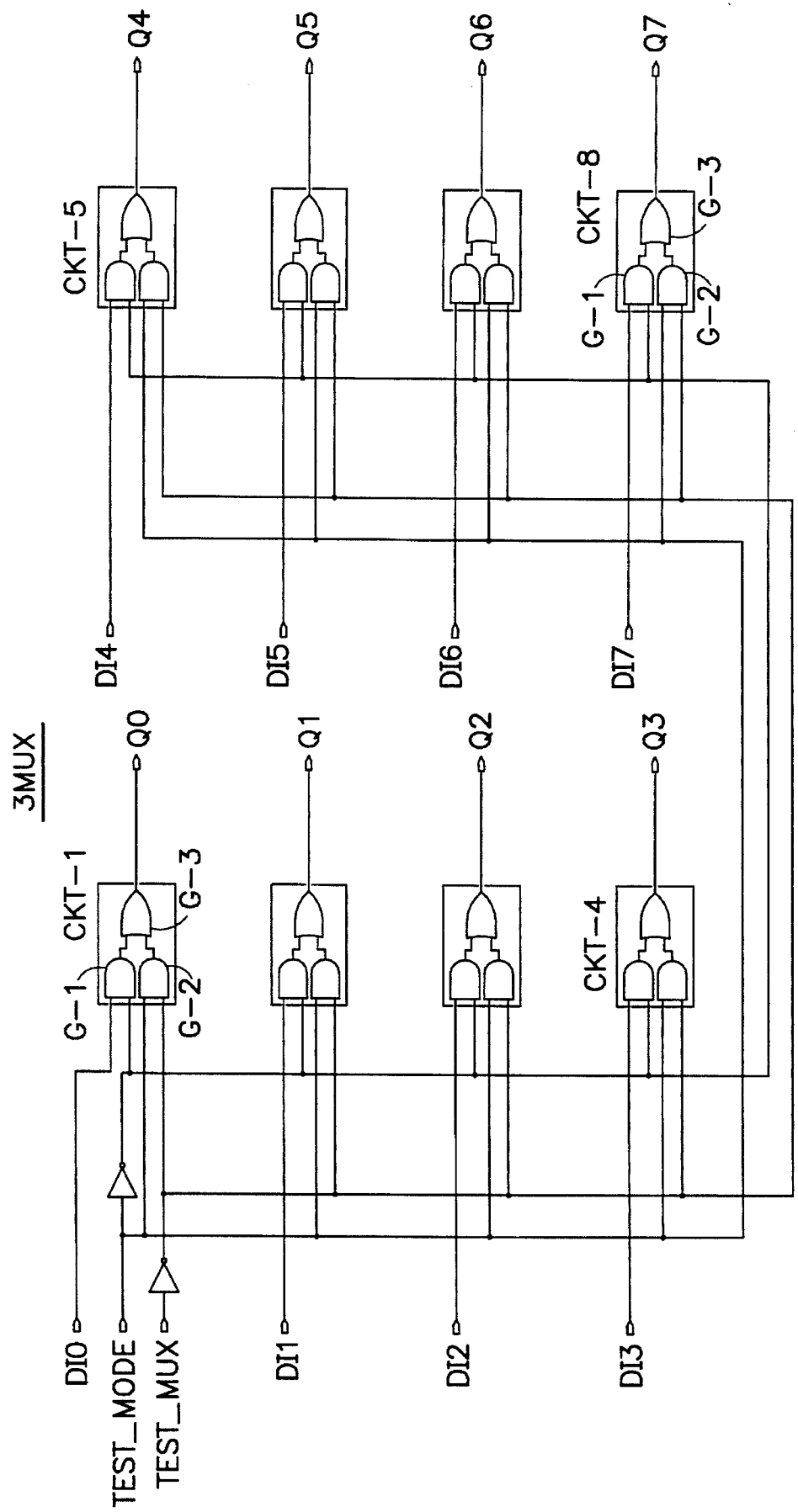
FIG. 11e shows a detailed schematic of the 3-MUX circuits shown in simplified block diagram form in FIGS. 11a and 11b.

Bus D-B(15:0) is also shown in FIG. 11a which, together with FIGS. 11b, 11c and 11d, comprise the circuitry of the LOGIC-2 circuit. Bus D-B(15:0) has its 16 lines coupled so that lines 0–7 are connected to the input terminals DI-0 through DI-7 through the 3-MUX-1 circuit while lines 8–15 are respectively coupled to inputs DI-0 through DI-7 of 3-MUX-2. The multiplexers 3-MUX-1 and 3-MUX-2 couple either data or a test multiplex state at their outputs Q-0 through Q-7 for performing a comparison test with the test data derived from the TDAT(32:1) bus whose input lines are coupled to the 32 MATRIX circuit M-1 through M-32 shown, for example, in FIGS. 8-1 to 10-2.

The multiplexers 3-MUX-1 and 3-MUX-2 couple either data or a test multiplex signal FAULT-MUX derived from the outside world as shown in FIG. 4a. This signal is utilized to select and deselect the test mode by generating the TEST signal developed as one output of the CONTROLLER circuit shown in FIG. 7.

The test multiplex signal TEST-MUX is also derived from the outside world (see FIG. 4a) and is applied in inverted form to one input of AND gate G-2 of each of the circuits CKT-1 through CKT-8. When not in the test mode, the B input of gate G-1 is high, passing the data bit applied to the other input through OR gate G-3 to the output Q-0. When in the test mode, the B input of gate G-1 is low, blocking the data from being passed to output Q-0 and coupling the test mode level (high or low) to output Q-0. Circuits CKT-2 through CKT-8 of 3-MUX-1 operate in the same manner. 3-MUX-2 operates in the same manner as 3-MUX-1.

The Q-0 through Q-7 outputs of 3-MUX-1 are simultaneously coupled to associated data inputs D-0 through D-7 of the inclusive OR gating circuits EX-OR-1 and EX-OR-3 through associates lines of 0–7 of the SD-DATA(15:0) bus. The Q-0 through Q-7 outputs of 3-MUX-2 are coupled to the data inputs D-0 through D-7 of exclusive OR gates EX-OR-3 and EX-OR-4 by means of lines 8–15 of the SD-DATA(15:0) bus.

The test data bus TDAT(32:1) has its 32 lines coupled in the following manner: lines 1–8 are coupled to the input lines I-1 through I-8 of EX-OR-1; lines 9–16 are coupled to inputs I-1 through I-8 of EX-OR-2; lines 17–24 are respectively coupled to inputs I-1 through I-8 of EX-OR-3, while lines 25–32 are respectively coupled to inputs I-1 through I-8 of EX-OR-4. Since all of these exclusive OR gates EX-OR operate in the same manner and have the same design, only one of the exclusive OR gates EX-OR will be described herein in detail for the sake of brevity.

Figure 11F:
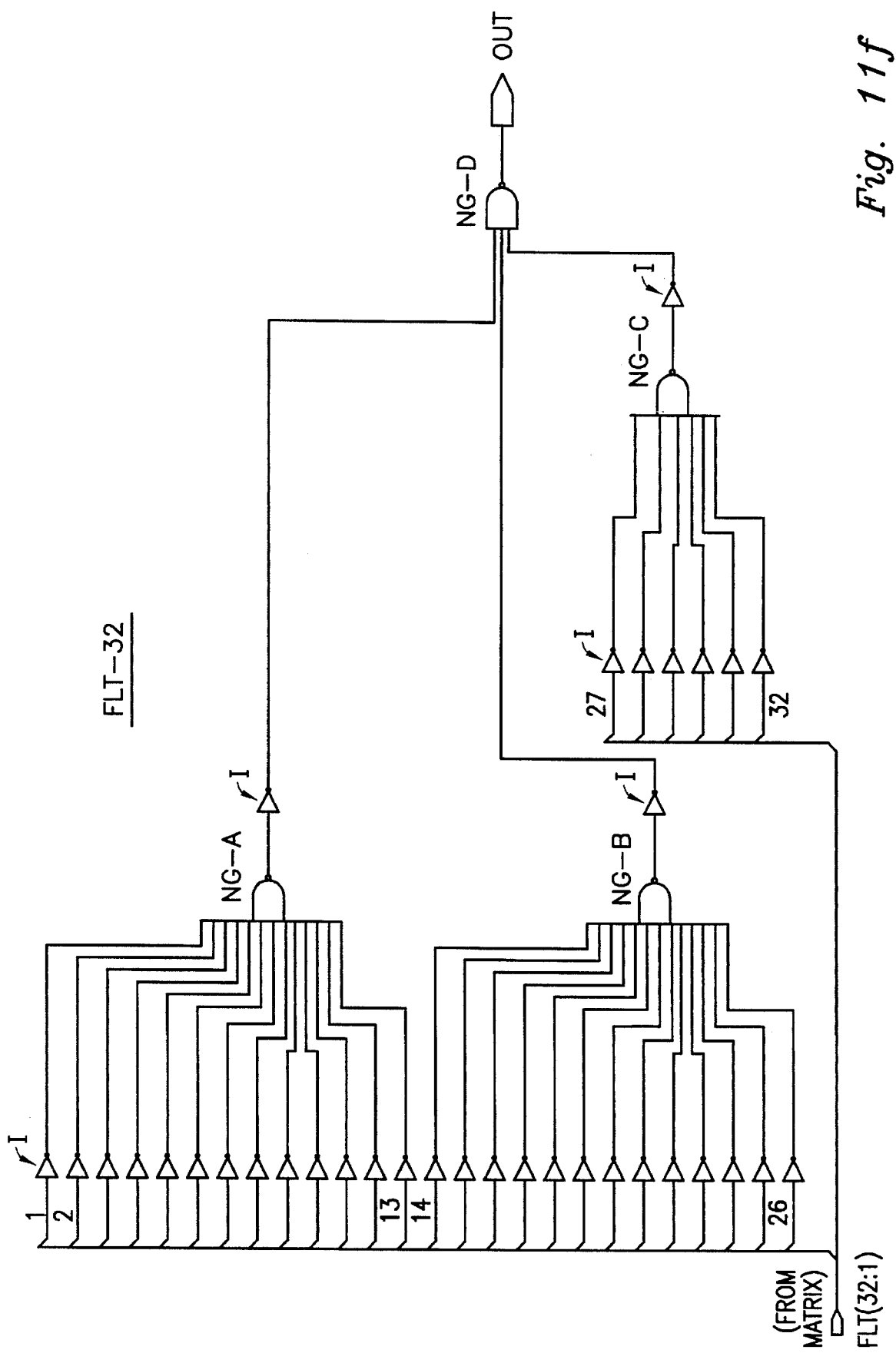
FIG. 11f is a schematic diagram showing the FLT-32 circuit of FIG. 11c shown in simplified block diagram form.
Figure 11G:
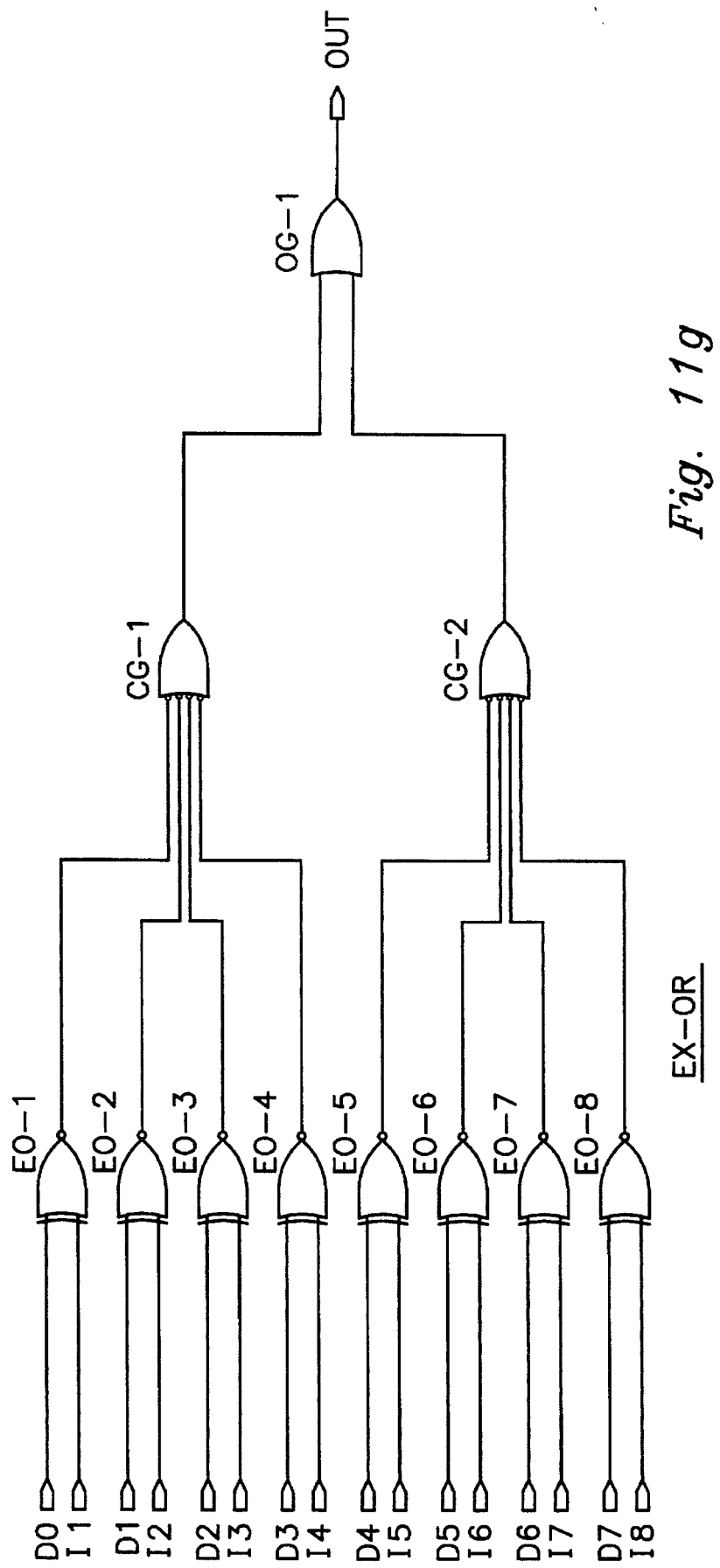
FIG. 11g shows a detailed logic circuit diagram of the EX-OR circuits shown in FIGS. 11a and 11b in simplified block diagram form.

FIG. 11g shows the circuitry employed in each of the exclusive OR gates EX-OR-1 through EX-OR-4 and is comprised of a plurality of individual exclusive OR gates EO-1 through EO-8 as well as collection gates CG-1, CG-2 and OR gate OG-1.

Each exclusive OR gate EO-1 through EO-8 compares the binary states of associated data positions, D-0 being compared with I-1, D-1 being compared with I-2, and so forth. A binary zero output is provided when the states of the bits do not compare, and a binary one output is provided when the states of the bits being compared are the same. Assuming that all of the compared bits are of the same state, the exclusive OR gates EO-1 through EO-8 provide binary one outputs which are inverted by gates CG-1 and CG-2 to provide a binary zero output. Whenever the compared states are different, the comparing gate generates a binary zero output which is inverted by the associated gate CG-1 or CG-2 to provide a high output when at least one of the pairs of bits do not agree, thus, providing an additional test of comparing the data presented at the output of interface 10 with the triple redundant data, i.e. the result of the vote of all three channels. Two successive data words are applied to the D-B(15:0) bus to perform comparisons with the bit states of the upper and lower 16 lines of the 32 lines which make up the TDAT(32:1) bus, as will be more fully described. This comparison thus provides an additional level of data integrity as well as self-checking of the interface.

Since interface 10 has the capability of providing only 16 data outputs, two successive comparisons are performed. The results of these comparisons appear at the outputs EX-OR-8, EX-OR-16, EX-OR-24 and EX-OR-32 of the exclusive-OR circuit EX-OR-1 through EX-OR-4.

FIG. 11b shows a comparison circuit substantially identical in design and function to the comparison circuit shown in FIG. 11a wherein the voting circuitry results appearing on the lines of bus TDAT(32:1) are compared with the data transmitted by the ARINC-429 transmitter, and appearing on the lines of the D-B(15:0) bus, in a manner substantially identical to that described hereinabove for the circuitry shown in FIG. 11a, the 32 bits of data of one bus being compared 16 bits at a time with the 16 bits of the other bus in the same manner as was described hereinabove.

Figure 13A:
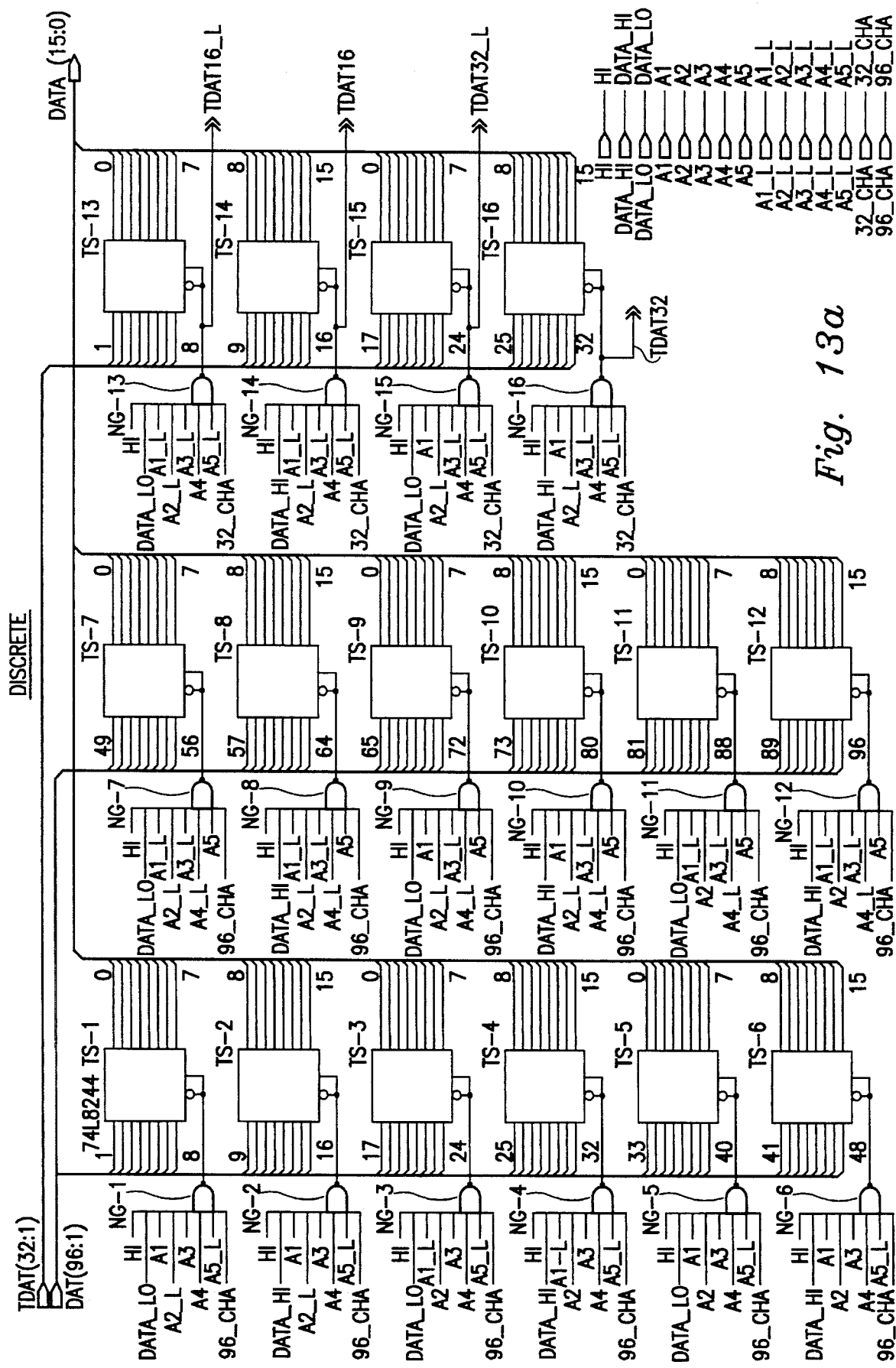
FIG. 13a shows a detailed circuit diagram of the DISCRETE circuit shown in FIG. 13.

FIG. 11d shows the manner in which the results of the exclusive OR operations are read out based upon the timing signals derived from the DISCRETE circuit shown in FIG. 13 in simplified block diagram form, the detailed circuitry being shown in FIG. 13a. The DATA(96:1) bus has its 96 lines distributed among the twelve 8 input/8 output tri-state circuits TS-1 through TS-12 which tri-state circuits respectively couple the lines of the DATA(96:1) bus to associated lines of the DATA(15:0) bus on a 16-bit-at-a-time basis. The tri-state circuits are capable of providing an output level at each output which is the same as the level of the corresponding input terminal (binary one or binary zero) and is further capable of presenting a high input impedance to the data bus DATA(15:0) responsive on a binary zero (low) and binary one (high), respectively. Each of the tri-state circuits TS-1 through TS-12 is selectively controlled by an associated NAND gate GN-1 through GN-12. Each NAND gate is an eight-input NAND gate in which the uppermost input is wired high (HI). The other inputs include data low (DATA-LOW) or data high (DATA-HI), a five-input address A-1 through A-5 (either inverted or non-inverted) and an input representing either the redundant mode (96-CHA) or the non-redundant mode (32-CHA).

In the redundant mode, only tri-states TS-1 through TS-12 are enabled when input 96-CHA is high. At this time the input 32-CHA to tri-states TS-13 through TS-16 will be low. The inputs DATA-LO and DATA-HI represent the lower and upper 8 bit groups of a 16 bit word. A pair of tri-states are enabled at any given time. For example, considering the tri-states TS-1 and TS-2, the NOR gates GN-1 and GN-2 are simultaneously enabled since they both have the same address (A-1, A-2-L, A-3, A-4 and A-5-L). Thus, the first 16 lines of the bus DAT(96:1) are passed by tri-states TS-1 and TS-2 to the DATA(15:0) bus. Each successive pair of tri-states TS-3 and TS-4, TS-5 and TS-6, and so forth, successively transfer binary information at 16 lines of the DATA(96:1) bus associated with each tri-state to the 16 lines of the DATA(15:0) bus.

In the non-redundant mode, the 32 line bus TDAT(32:1) transfers the data on these lines to the DATA(15:0) bus 16 lines at a time through the utilization of tri-states TS-13 through TS-16. Gates GN-13 and GN-14 select the lower and upper 8 bit groups of the first 16 bit word, i.e. selects lines 1–8 and 9–16 for transfer by TS-13 and TS-14 to the DATA(15:0) bus. Simultaneously therewith, gates GN-13 and GN-14 generate the timing signals TDAT-16-L and TDA-16.

Gates GN-15 and GN-16 are simultaneously high when the remaining 16 lines of the TDAT(32:1) bus are to be transferred to the DATA(15:0) bus. The outputs of gates GN-15 and GN-16 further simultaneously generate the signals TDAT-32-L and TDAT-32. When the TDA-16-L signal is high, the state of the exclusive-OR circuit EX-OR-1 (FIG. 11a) is stored in FFD-1, the output EX-OR-8 thereof being applied to the D input of FFD-1. Simultaneously therewith TDAT-16 clocks in the state of the output (EX-OR-16) of EX-OR-3 shown in FIG. 11a into FFD-2. The results of the exclusive OR operations of circuits EX-OR-3 and EX-OR-4 are clocked into FFD-3 and FFD-4 respectively under the control of signals TDAT-32-L and TDAT-32, respectively.

The results of the exclusive OR operations performed by the LOGIC-2 circuitry of FIG. 11b are clocked into FFD-5 through FFD-8 under control of one of the signals A-TDAT-16-EN-L, TDAT-16-L and A-R-G-L coupled to the clock inputs of FFD-5 and FFD-6 through multiplexer MU-1 and NOR gate G-1. The signals A-TDAT-32-EN-L, TDAT-32-L and A-R-G-L selectively control clocking in of EX-OR-24-A and EX-OR-32-A from exclusive-OR gates EX-OR-7 and EX-OR-8 of FIG. 11b.

The signals TDAT-16-L and TDAT-32-L are derived from the DISCRETE circuit shown in FIGS. 13 and 13a while the signals A-TDAT-16-EN-L, A-TDAT-32-EN-L and A-R-G-L are derived from the TRANS circuit shown in FIG. 6 and shown in greater detail in FIG. 6e which circuitry includes a plurality of NAND gates that receive only selected lines from the CYC(62:1) bus for generating a first group of signals at predetermined intervals during the non-redundant (96-CHA) mode and which generates a second group of signals at predetermined intervals when in the redundant mode (32-CHA). Among these signals are included the signals A-TDAT-16-EN and A-TDAT-32-EN which provide control signals appearing on the 25th and 28th lines of the CYC(62:1) bus.

The conditions of the flip-flops FFD-1 through FFD-4 are combined at gate G-3 to provide a condition representing a fault at any of the one of the 8 bit groups of data. The states of the flip-flops FFD-5 through FFD-8 are similarly gathered by gate G-4 to provide a fault signal ARTRN-FLT. The results of the four groups of tests are available for diagnostic purposes, as will be more fully described.

The circuitry shown in FIG. 11c forming part of the LOGIC-2 circuit provides indications of further fault conditions including ARINC-FLT (transmitter fault), DISC-FLT (discrete data fault) and BIT-FLT (bit fault).

Figures 1, 9:
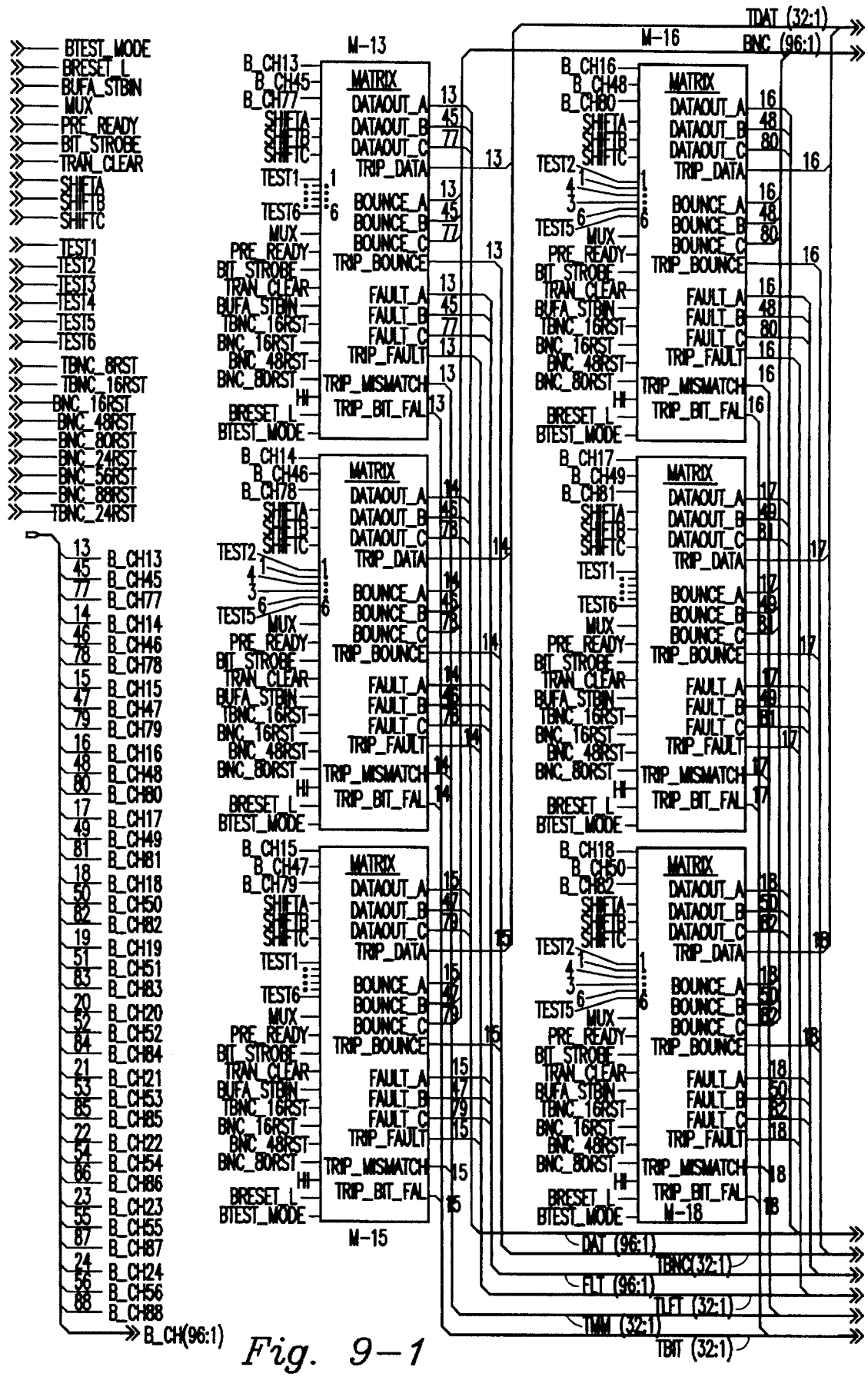
Figures 2, 9:
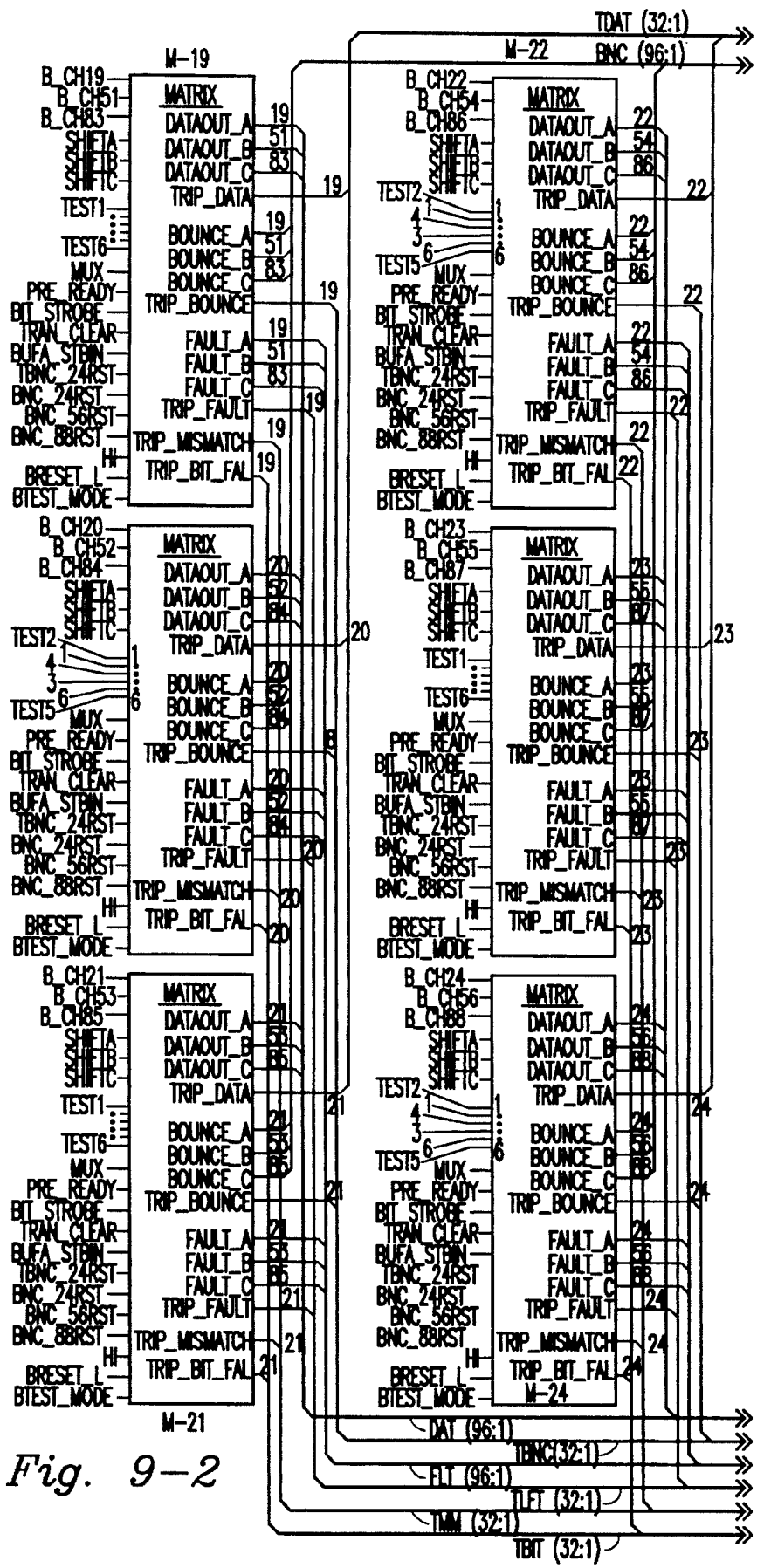

The circuit FLT-32 shown in simplified block diagram form in FIG. 11c is shown in greater detail in FIG. 11f and is comprised of a plurality of NAND gates NG-A, NG-B and NG-C each being coupled to receive a bit state from one line of the FLT(32:1) bus which derives bit data from the MATRIX circuit shown in FIGS. 8–10 and which represent the triple redundant fault test.

If any one of these 32 lines indicates a triple redundant fault, a signal appears at the output OUT of FLT-32, i.e. at the output of NOR gate NG-D to provide the signal TFLT-OR which is coupled to OR gates OR-A and OR-B in FIG. 11c.

Figure 11H:
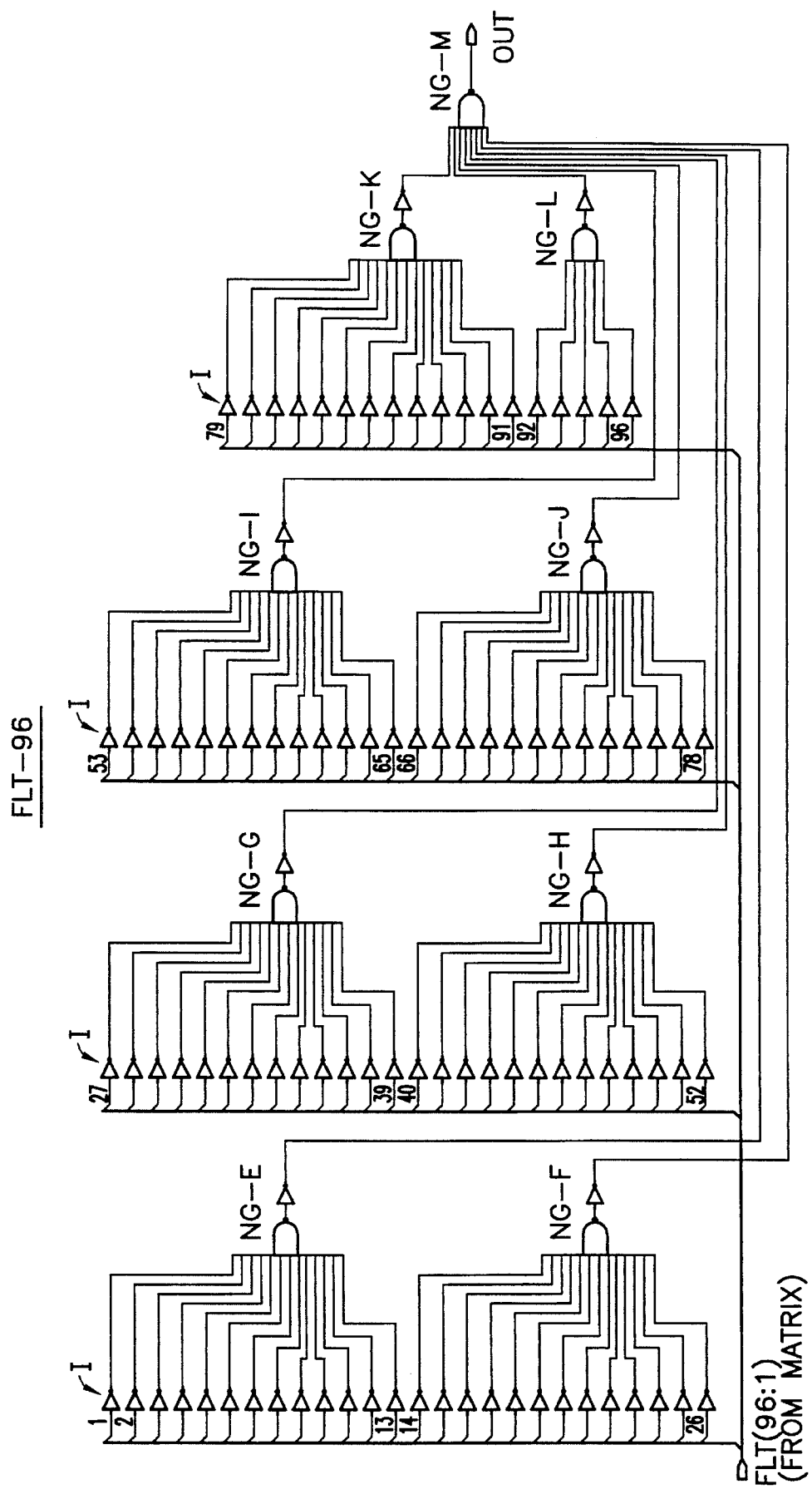
FIG. 11h shows a detailed logical circuit diagram of the FLT-96 circuit shown in simplified block diagram form in FIG. 11c.

The FLT-96 circuit shown in simplified block diagram of FIG. 11c is shown in greater detail in FIG. 11h which is substantially identical to the circuit FLT-32 shown in FIG. 11f except for the fact that the FLT-96 circuit is coupled to the 96 lines of the FLT(96:1) bus derived from the MATRIX circuit and provides the results of the voting circuits for determining a consensus for the 96 input channels receiving a binary state from an associated discrete when operating in the non-redundant mode.

The 96 lines of the FLT(96:1) bus are coupled to associated inputs of the NAND gates, NG-E through NG-L through an associated inverter circuit of the array of inverters I. The outputs of each of the NAND gates NG-E through NG-K are coupled to associated inputs of a final NAND gate NG-M through associated inverters I.

When a fault condition is present on any one of the 96 lines, an output is provided at the output of gate NG-M and is supplied to one input of gate A-4 in FIG. 11c.

Figure 11I:
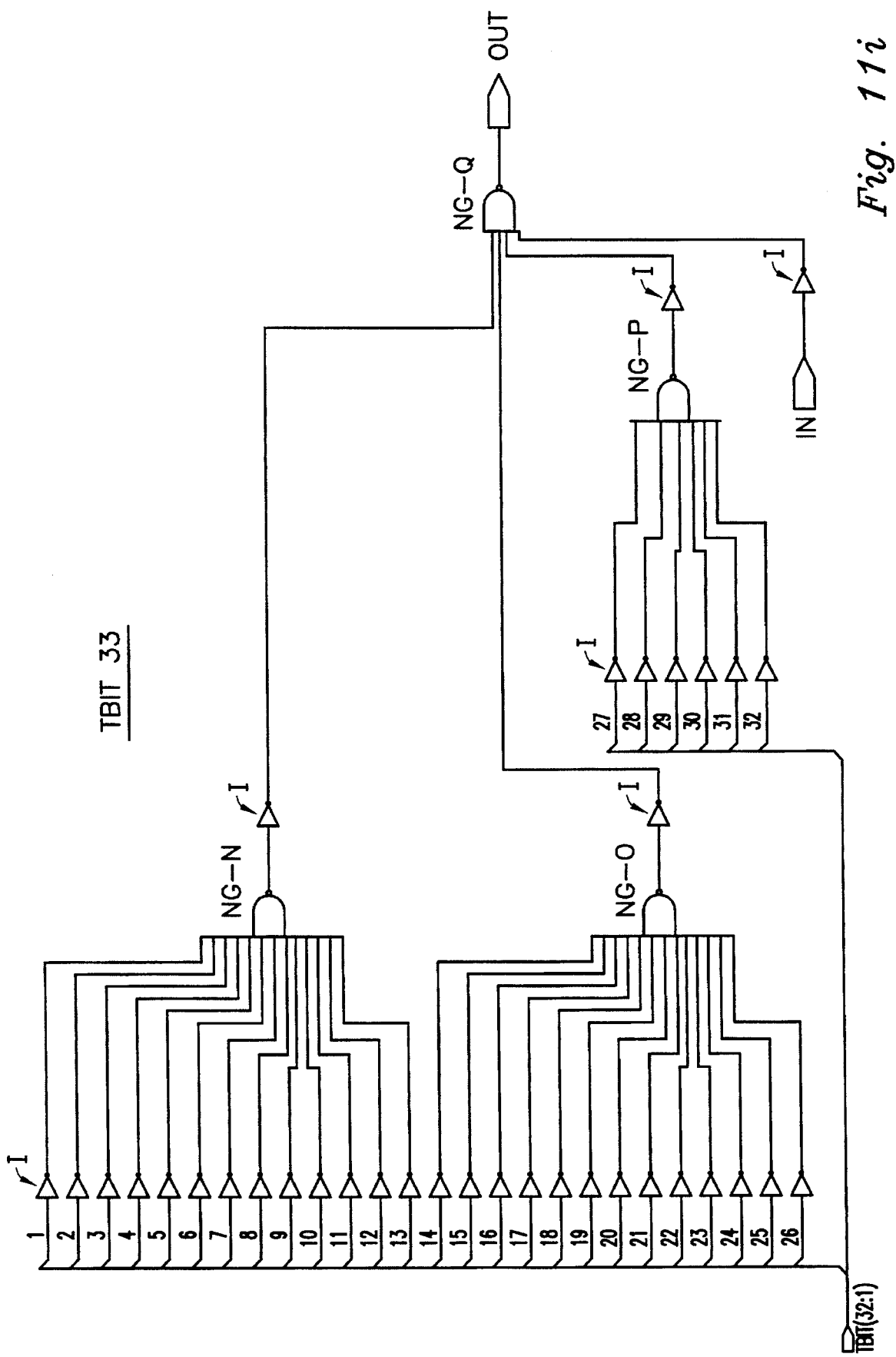
FIG. 11i is a detailed logic circuit diagram of the TBIT-33 circuit shown in simplified block diagram form in FIG. 11c.

The TBIT-33 circuit shown in simplified block diagram form in FIG. 11c is shown in greater detail in FIG. 11i and is similar in design and function to the FLT-32 and FLT-96 circuits of FIGS. 11f and 11g, respectively. NAND gates NG-N, NG-O and NG-P are coupled to associated input lines of the TBIT(32:1) bus whose bit data is derived from the triple bit failure output of each of the 32 individual MATRIX circuits shown in FIGS. 8–10.

The 32 lines of the TBIT(32:1) bus are coupled to associated inputs of gates NG-N through NG-P through inverters I. The outputs of the gates NG-N through NG-P are coupled to associated inputs of NAND gate NG-Q through inverters I. When any one of the three VOTE circuits in each of the 32 MATRIX circuits indicates a fault, the TBIT-33 circuit provides an output which is applied to the set input of flip-flop FF-C shown in FIG. 11c.

An ARINC transmission fault, which appears at the output of gate G-4 in FIG. 11d (DISTRN-FLT) or a fault which is due to a lack of comparison of output data from the interface with discrete input data (obtained through the circuitry of FIG. 11a) develops a signal at gate G-3 (DISTRN-FLT) which is applied to one input of gate OR-B. During 32 channel operation (32-CHA is high) one of the three aforementioned states ARTRN-FLT, DISTRN-FLT or the output of FLT-32 (FLTOR) are coupled through AND gates A-2 and A-3 to one input of OR gates OR-C and OR-D. These gates set flip-flops FF-A and FF-B to represent either a transmission fault (ARINC-FLT) or a discrete data fault (DISC-FLT).

In the 96 channel mode (96-CHA is high) the output of FAULT-96 is applied to the set input of flip-flop FF-A through gates A-1 and OR-C and the FLTOR output of FLT-96 (applied to gate A-4) or a no clock NO-CLK condition are passed by OR gate OR-D for setting flip-flop FF-B.

In addition to providing fault signals DISC-FLT and BIT-FLT, these outputs are gated through gate NOR-A to provide the signal FAULT-L. These signals are utilized in a manner to be more fully described.

FIG. 12 show the DIS-BOUNCE circuit in simplified block diagram form, the detailed circuit arrangement being shown in FIGS. 12a-1 and 12a-2, taken together. In the redundant mode, the results of the three bounce tests performed at each of the 32 MATRIX circuits (see FIGS. 8–10, for example) are applied through the 96 lines of the BNC(96:1) bus to associated inputs of the 12 eight input tri-state circuit TS-1 through TS-12 which are identical in design and function to the tri-state circuits described hereinabove. The tri-stage circuits selectively transfer data in 16 bit bytes to the DATA(15:0) bus according to the addresses provided at the NAND gates NG-1 through NG-12, each having eight inputs which include a wired high (HI), a data low (DATA-LO) and a data high (DATA-HI) input, five address bits A-1 through A-5 (both inverted and non-inverted) and a channel enable signal (96-CHA and 32-CHA).

Gates NG-1 and NG-2 are simultaneously enabled to transfer lines 1–8 of the BNC(96:1) bus through tri-state TS-1 to lines 1-8 of the DATA(15:0) bus and to transfer lines 9 through 16 to lines 9–16 of DATA(15:0) bus through TS-2. This transfer cycle is repeated five successive times to transfer six 16 bit bytes, one at a time to the DATA(15:0) bus. Each gate NG-1 through NG-12, when enabled, applies a clock input to its associated flip-flop FF-1 through FF-12, respectively, to develop a reset signal BNC-SRST at the Q output of the associated flip-flop FF-1 whose D inputs are wired high (HI). A read reset signal applied to line READ-RST resets the flip-flops FF-1 through FF-12. The reset signals BNC-8RST through BNC-96RST are generated to reset the flip-flops. R/S-2, R/S-3 and R/S-4 of the MATRIX circuits, see FIGS. 8-1, 8-2, 9-1, 9-2, 10-1 and 10-2 and 8a-1 and 8a-2, BNC-8RST resetting R/S-2 of the MATRIX circuits M-1 through M-8, BNC-16RST resetting R/S-2 of M-9 through M-6, etc.

NAND gates NG-13 through NG-16 are utilized during the redundant mode to transfer data from the TBNC(32:1) bus which outputs are derived from the triple bounce output of R/S-1 of each of the 32 MATRIX circuits M-1 through M-32. The addresses applied to NAND gates NG-13 through NG-16 selectively enable the tri-states TS-13 through TS-16, respectively in a sequential fashion. The tri-states are enabled in pairs to transfer 16 bounce conditions appearing at their inputs to associated lines of the 16 line bus DATA(15:0). The outputs of NAND gates NG-13 through NG-16 further generate the triple bounce reset signals TBNC-8RST, TBNC-16RST, etc., through the flip-flops FF-13 through FF-16.

The terminating circuits T are each coupled to an associated line of the DATA(15:0) bus to provide proper termination for each line of the bus.

FIG. 13 shows the DISCRETE circuit in simplified block diagram form, FIG. 13a showing the DISCRETE circuit in detail. The DISCRETE circuit selectively transfers the results of the triple redundant test from the TDAT(32:1) bus to the data bus DATA(15:0) or alternatively transfers data from the three channel vote tests from each of the 32 matrices, which test results are applied to associated lines of the DAT(96:1) bus for selective transfer to the data bus DATA(15:0). The DISCRETE circuit utilizes a plurality of tri-state circuits TS-1 through TS-16 identical to the tri-state circuits described hereinabove, for example, in conjunction with the DIS-BOUNCE circuit shown in FIG. 12a. The NAND gates NG-1 through NG-16 are identical to those shown in FIG. 12a and receive a wired high (HI), a data low (DATA-LO) or data high (DATA-HI) input, five address bits (A-1 through A-5 inverted and non-inverted) and either a 96-CHA or 32-CHA signal depending upon the operating mode. Pairs of the gates NG-1 through NG-16 transfer the bit states of 16 lines of either the DAT(96:1) bus or the TDAT(32:1) bus to the DATA(15:0) bus. The 96 lines of the DAT(96:1) bus are transferred 16 bits at a time in six successive operations. In a 32-CHA (redundant) mode, the data on the 32 input lines TDAT(32:1) are transferred 16 bits at a time in two successive operations. The data appearing on the DATA(15:0) bus is led to the outside world through the output terminals of the interface 10 (see FIG. 4b).

Since a number of circuits may selectively apply data to the DATA(15:0) bus, the tri-states perform the function of providing a high input impedance whenever the circuitry in which the tri-states are employed is not transferring data so as not to interfere with or degrade the transfer of data from one of the other busses to the DATA(15:0) bus.

Figure 14A:
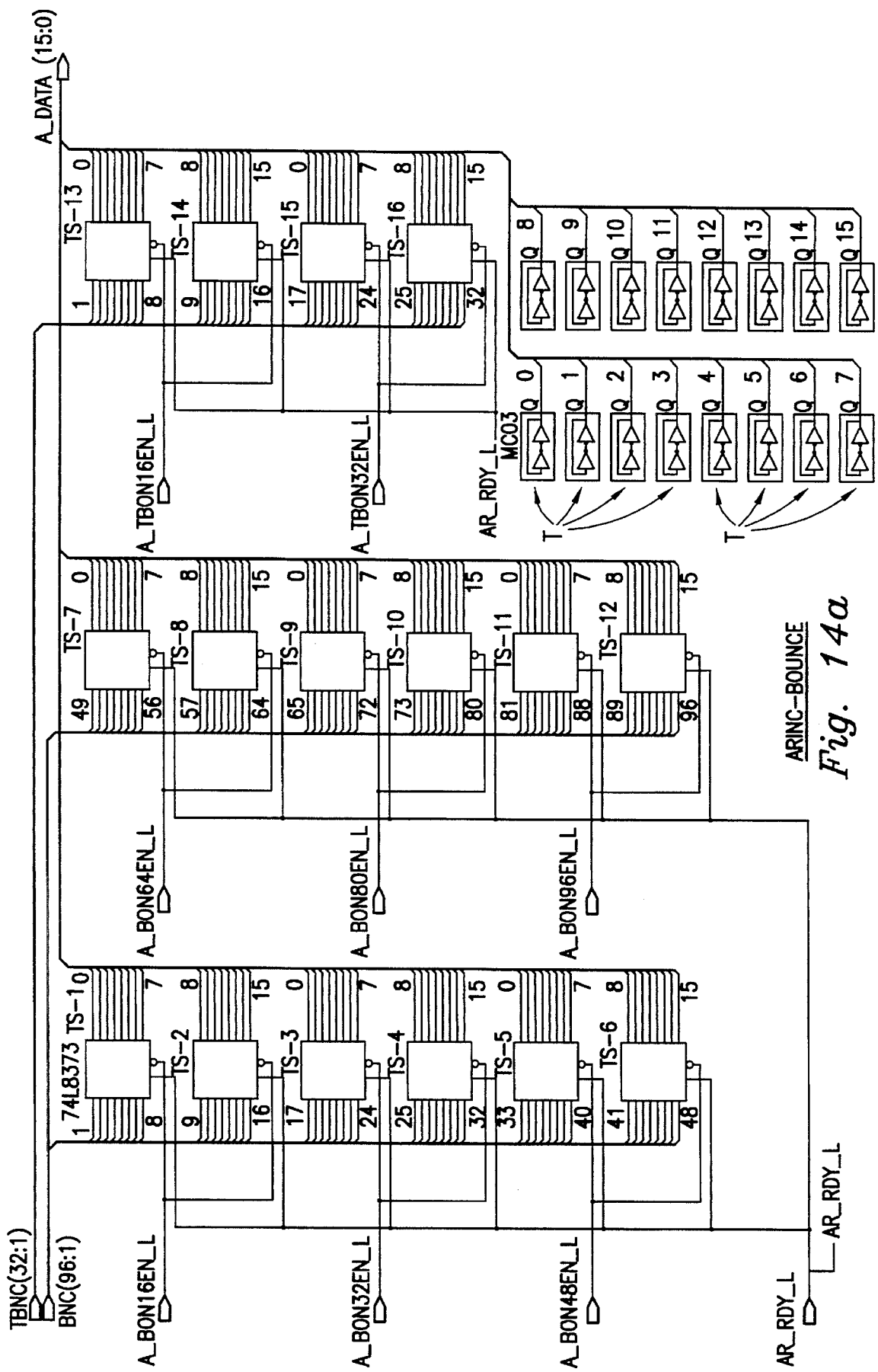
FIG. 14a shows the detailed schematic of the ARINC-BOUNCE circuit of FIG. 14.

FIG. 14 shows the ARINC-BOUNCE circuit in simplified block diagram form, FIG. 14a showing the circuit in detail. The bounce data is transferred to the ARINC-429 transmitter (PSC-1) through the tri-states of the ARINC-BOUNCE circuit.

FIG. 14a is similar to the circuits of FIGS. 12a and 13a, for example, and is comprised of a plurality of tri-state circuits TS-1 through TS-16 which are substantially identical in design and function to the tri-state circuits described hereinabove in connection with FIGS. 12a and 13a, for example.

The bus BNC(96:1) has its 96 lines selectively coupled to the eight input lines of each of the 12 tri-state circuits for transfer, 16 bits at a time, to associated lines of the bus A-DATA(15:0). The transfer signals are derived from the TRANS circuit shown in FIG. 6. The signal AR-RDY-L is simultaneously applied to the enable input EN of each tri-state TS-1 through TS-12, which signal is also derived from the TRANS circuit. The 96 lines of the BNC(96:1) bus are selectively coupled to the 8 input lines of each of the tri-states TS-1 through TS-12 and 16 lines of bit states are transferred at a time to the A-DATA(15:0) bus. For example, the signal A-BON-16-EN-L together with the signal AR-RDY-L permit the 16 lines coupled to tri-states TS-1 and TS-2 to be simultaneously transferred to the A-DATA(15:0) bus (see also FIG. 6h). Each successive pair of tri-states TS-3 and TS-4, TS-5 and TS-6, and so forth, transfers the 16 lines of data coupled to their inputs to the A-DATA(15:0) bus.

The 32 bits of data appearing on the 32 lines of the TBNC(32:1) bus are selectively coupled to 8 input lines of the four tri-states TS-13 through TS-16, 16 lines at a time under control of the signals A-TBON-16-EN-L and A-TBON-32-EN-L, which timing signals, together with AR-RDY-L, are derived from the TRANS circuit of FIG. 6.

The terminators T are each coupled to an associated line of the A-DATA(15:0) bus for proper termination. The data on buses TBNC(32:1) and BNC (96:1) are respectively derived from the 32 MATRIX circuits M-1 through M-32 shown in FIGS. 8–10.

Figure 15A:
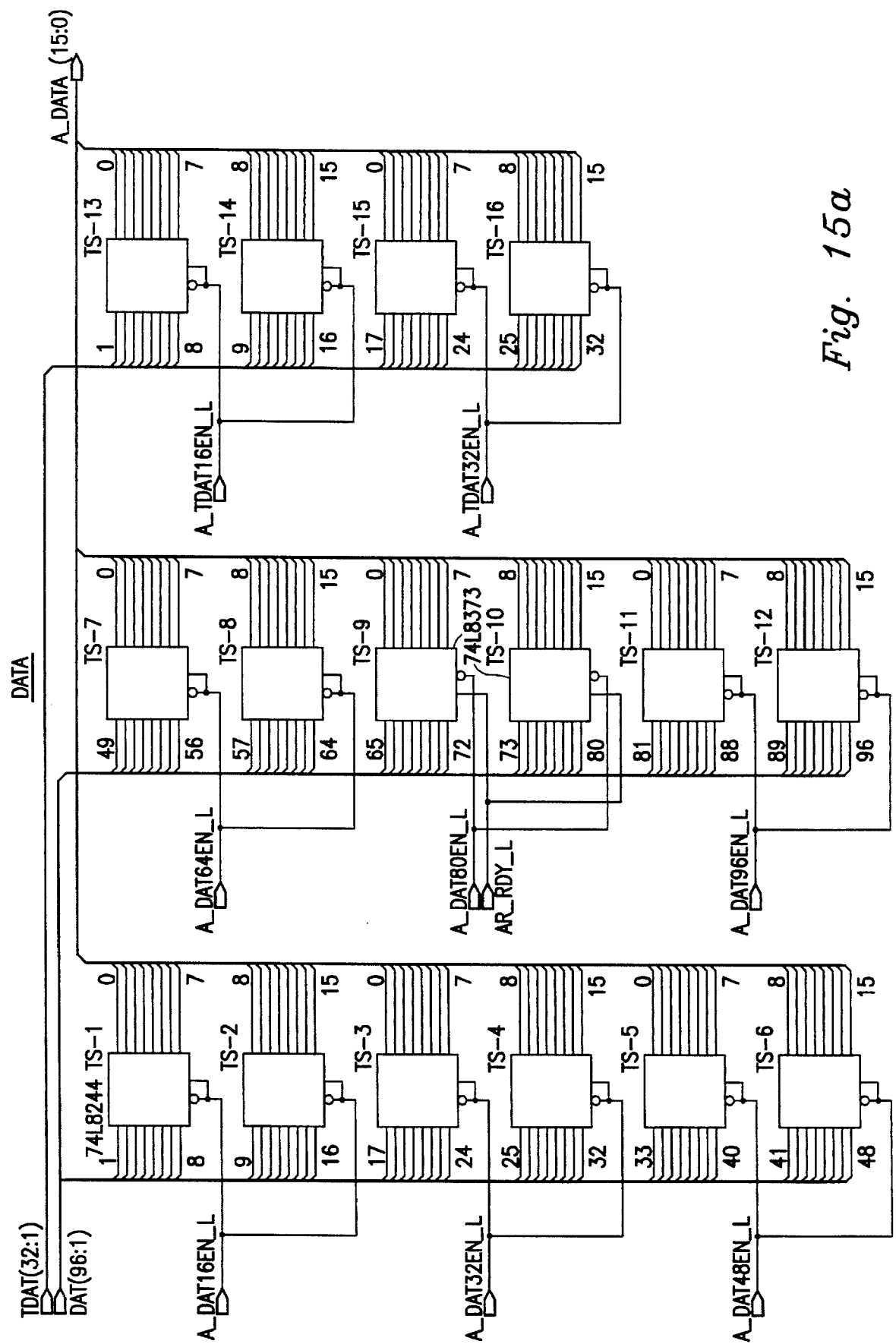
FIG. 15a shows the detailed circuit diagram of the DATA circuit of FIG. 15.

FIG. 15 shows the circuit DATA in simplified block diagram form, FIG. 15a showing the DATA circuit in greater detail. The DATA circuit transfers data from the MATRIX circuits M-1 through M-32 to the bus A-DATA(15:0) for transmission by PSC-1 (FIG. 6h) and is comprised of tri-states TS-1 through TS-16 substantially identical in design and function to the tri-states described previously, for example, as shown in FIG. 14a. The 96 lines of the DAT(96:1) bus are selectively coupled to 8 inputs of the tri-states TS-1 through TS-12 when in the non-redundant mode. The 32 lines of the TDAT(32:1) bus are selectively coupled to the 8 input lines of each of the tri-states TS-13 through TS-16 when in the redundant mode. The data applied to these buses is derived from the MATRIX circuits M-1 through M-32, TDAT data being the result of the triple redundant determination and DAT being the result of the voting results of the three individual redundant channels.

The signals for sequentially reading out 16 lines of data at a time are derived from the TRANS circuit of FIG. 6 which controls the timing for the ARINC-429. Timing signals for providing read out are each coupled to a pair of adjacent tri-states. Note, for example, the signal A-DAT-16-EN-L is simultaneously applied to the control inputs of tri-states TS-1 and TS-2. The remaining signals are applied in a like manner to a pair of associated tri-states.

The transfer of data on the lines of the TDAT(32:1) bus is controlled by the timing signal ATDAT-16-EN-L which is simultaneously applied to the control inputs of tri-states TS-13 and TS-14 while the timing signal A-TDAT-32-EN-L is simultaneously applied to the control inputs of tri-states TS-15 and TS-16, for transfer of data from bus TDAT(32:1) 16 lines at a time to the A-DATA(15:0) bus.

Figure 16A:
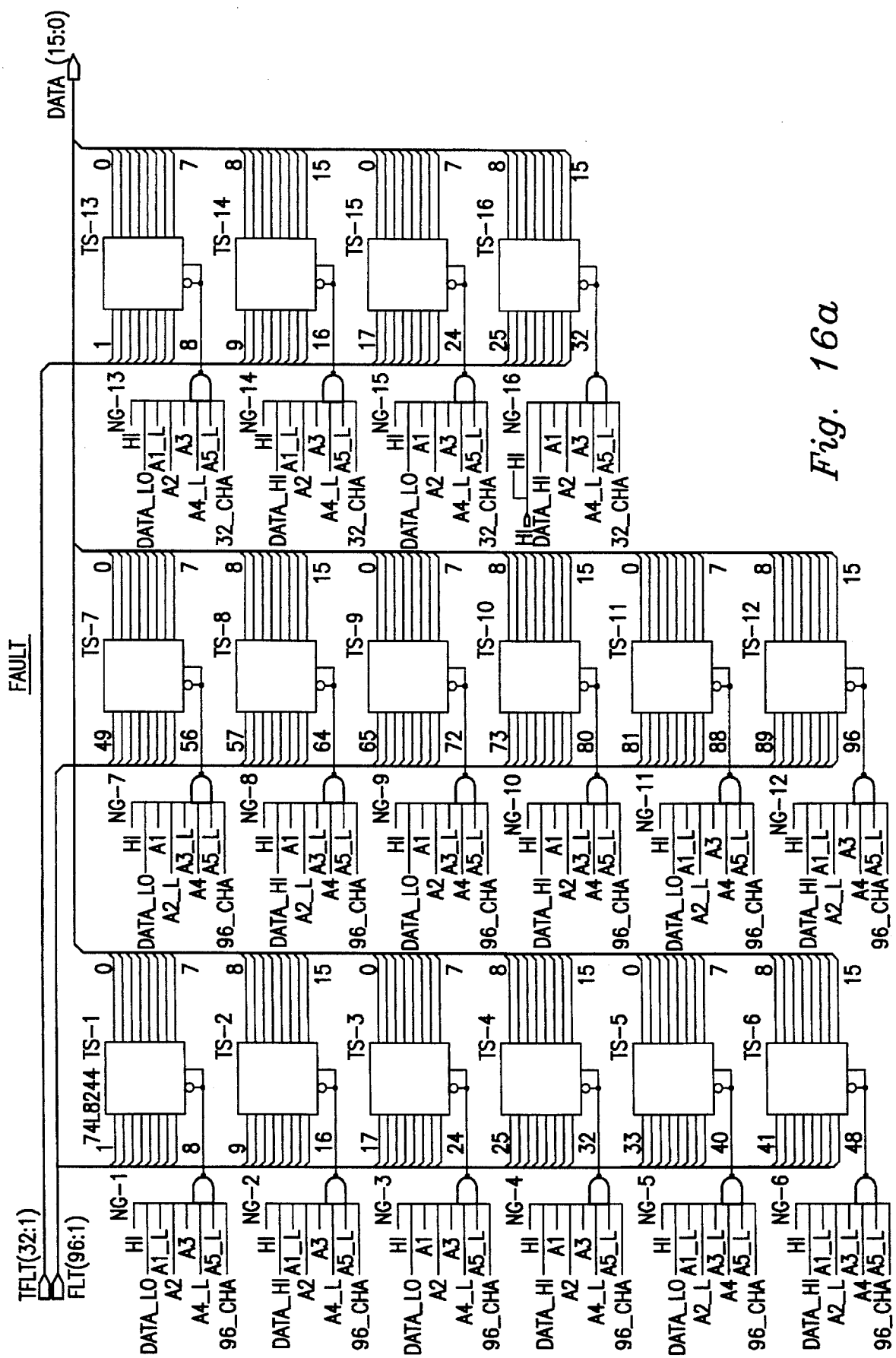
FIGS. 16a–16c show the detailed schematic circuitry of the FAULT circuit of FIG. 16.
Figure 16B:
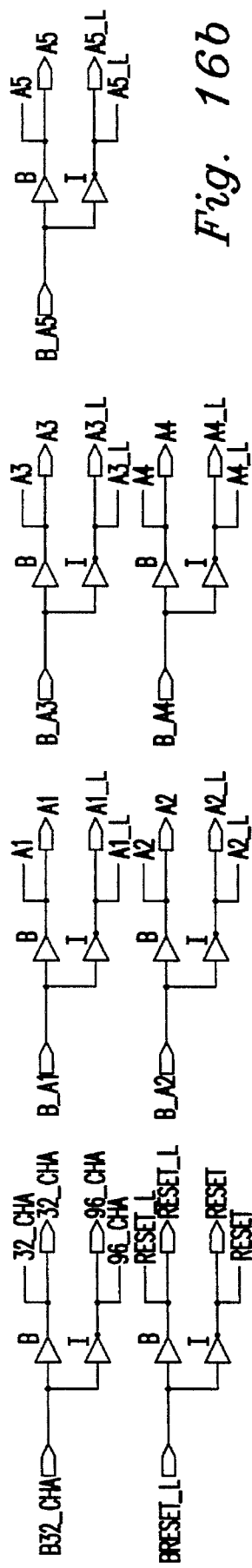
Figure 16C:
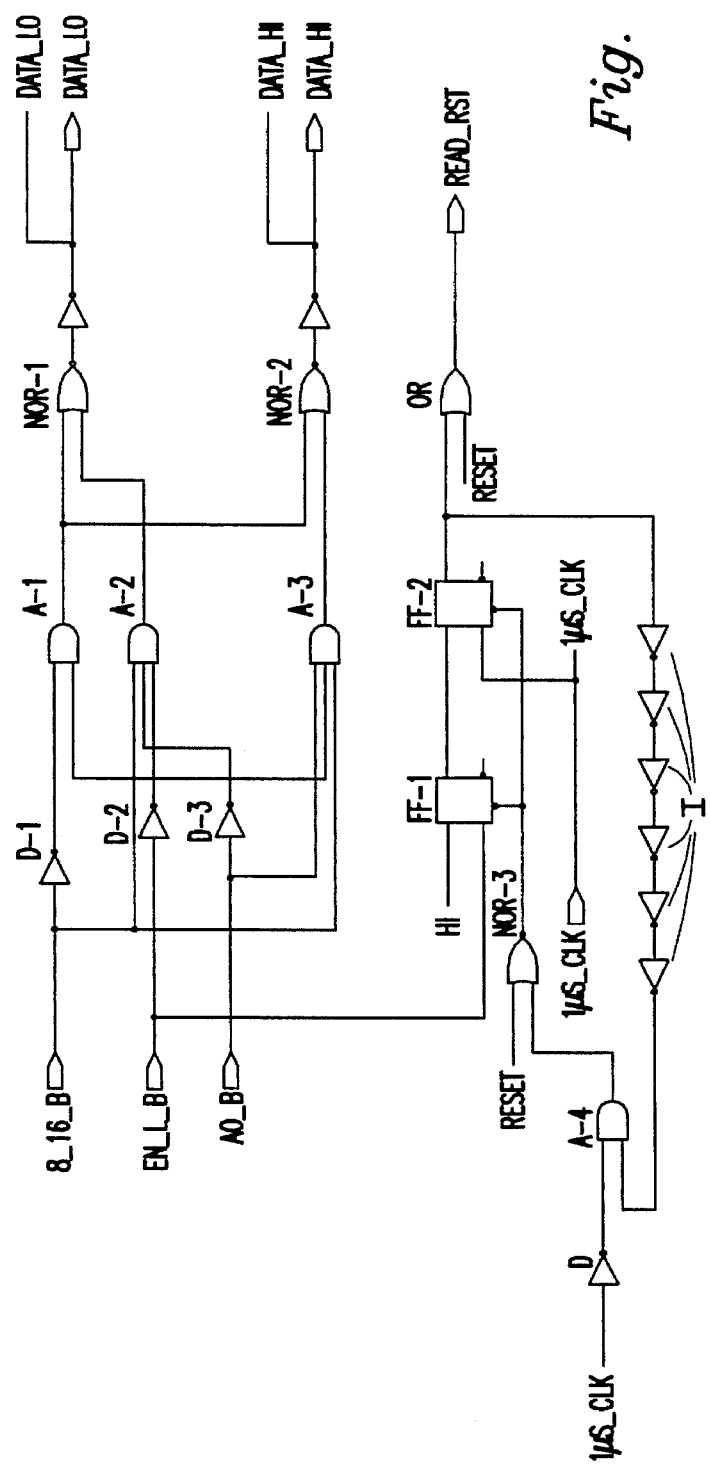

FIG. 16 is a simplified block diagram of the FAULT circuit which is shown in greater detail in FIGS. 16a, 16b and 16c. The FAULT circuit transfers fault data from the MATRIX circuits M-1 through M-32 to the output bus DATA(15:0) under control of the outside world. FIG. 16a employs tri-states TS-1 through TS-16 substantially identical in design and function to those described hereinabove. The 96 lines of the FLT(96:1) bus are selectively coupled to the 8 input lines of the 12 tri-states TS-1 through TS-12. The bit states on these lines applied to the FLT(96:1) bus are derived from the MATRIX circuits of FIGS. 8–10 and specifically represent the results of the vote circuits for each of the three redundant channels. The data on bus TFLT(32:1) bus is derived from the result of the triple fault tests. This triple fault data is transferred to the DATA(15:0) bus in 16 bit bytes. The NAND gates NG-1 through NG-12 which are substantially identical to those described hereinabove, selectively enable the tri-states one pair at a time to transfer 16 lines of data from one bus to another. For example, as was described hereinabove, gates NG-1 and NG-2 are simultaneously enabled with address data A-1 through A-5 a DATA-LO signal and a 96-CHA (non-redundant mode) signal to enable tri-states TS-1 and TS-2 to transfer data from lines 1–16 of the FLT(96:1) bus to the 16 lines of the DATA(15:0) bus. Thus, the 96 bits of fault information are transferred, 16 bits at a time, to the DATA(15:0) bus for coupling to the outside world.

Data on the 32 lines of the TFLT(32:1) bus is transferred 16 lines at a time through tri-states TS-13 through TS-16 under control of the gates NG-13 through NG-16, respectively. Gates NG-13 and NG-14 simultaneously receive the same data at their 8 inputs to simultaneously enable tri-states TS-13 and TS-14 to transfer bit states on the first 16 lines of the TFLT(32:1) bus to associated lines of the DATA(15:0) bus. The remaining 16 lines of the TFLT(32:1) bus are transferred under control of the gates NG-15 and NG-16.

FIG. 16b shows a plurality of inverter circuits for converting the address signals B-32-CHA-BRESET-L and B-A-1 through B-A-5 to inverted and non-inverted form through the buffers B and inverters I provided for each of these lines. The condition B-32-CHA in non-inverted form provides the signal 32-CHA used to control transfer of data through the tri-states TS-13 through TS-17. When B-32-CHA is low, this signal, in its inverted form, provides the 96-CHA signal for controlling the transfer of data through tri-states TS-1 through TS-12. The 32-CHA and 96-CHA states and address signals A-1 through A-5 and A-1-L through A-5-L are selectively coupled to the gates NG-1 through NG-16.

The circuitry of FIG. 16c, forming part of the FAULT circuit provides the DATA-LO and DATA-HI and read reset (READRST) signals under control of the signals 8-16-B, EN-L-B, and A-0-B as well as the one microsecond clock. 1-US-CLK. The DATA-LO and DATA-HI signals represent the lower and upper 8 bits of the 16 bits transferred to the DATA(15:0) bus by each associated pair of tri-states TS-1 and TS-2, TS-3 and TS-4, and so forth. The read READ-RST signal removes the clear signal which clears the data which generated the fault information from storage and removes the clear so as to prevent the clear signal from affecting the next sampling of discretes to be examined by the MATRIX circuits.

Figure 17:
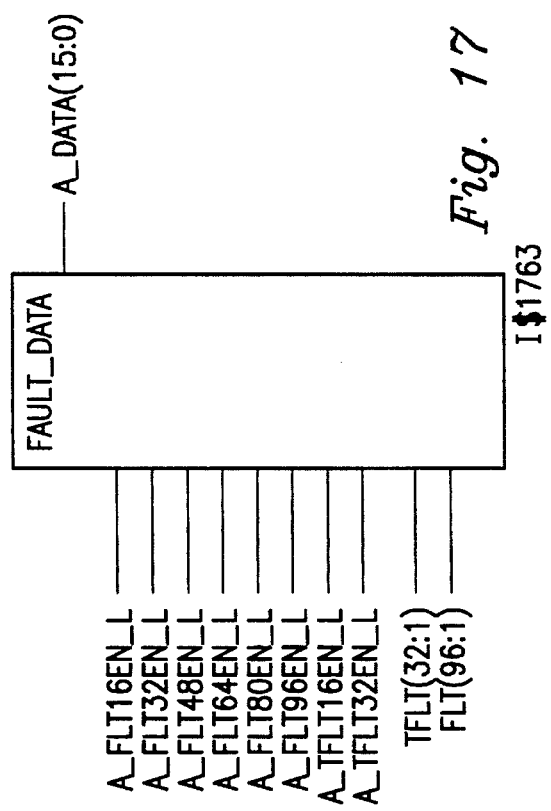

FIG. 17 shows a simplified block diagram of the FAULT DATA circuit which is shown in greater detail in FIG. 17a and is similarly comprised of tri-states TS-1 through TS-16 similar to in design and function to the tri-states described hereinabove. The FAULT DATA circuit transfers triple fault data to PSC-1 in the non-redundant mode and transfers fault data to PSC-1 in the redundant mode.

Figure 17A:
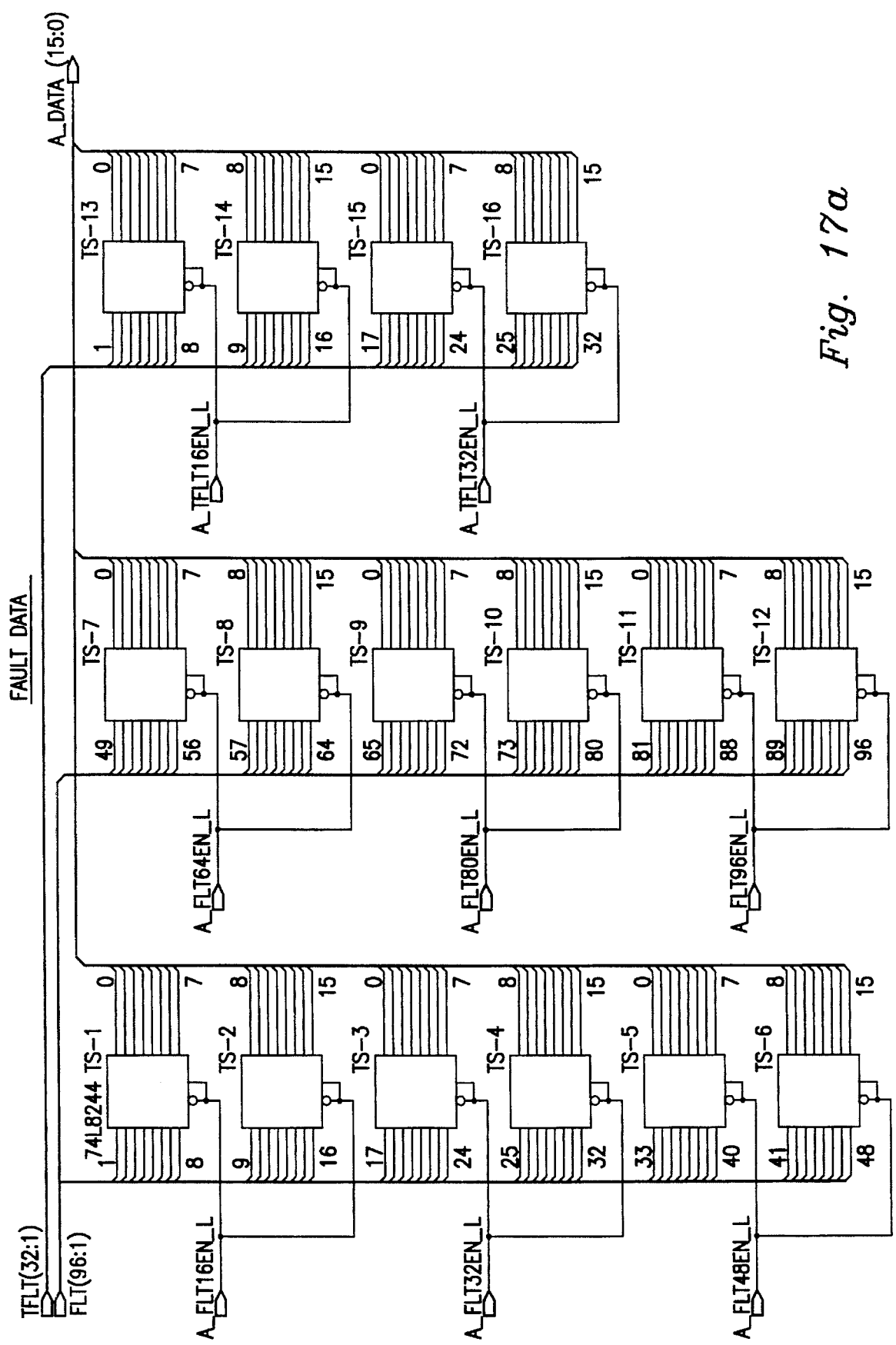
FIG. 17a shows a detailed circuit diagram of the FAULT-DATA circuit of FIG. 17.

The FAULT DATA circuit shown in detail in FIG. 17a is comprised of tri-states TS-1 through TS-16 substantially identical to the tri-states described hereinabove. Tri-states TS-1 through TS-12 transfer bit states on the 96 lines of the FLT(96:1) bus to the A-DATA(15:0) bus. Tri-states TS-13 through TS-16 transfer bit states on the 32 lines of the TFLT(32:1) bus to the DATA(15:0) bus. The data on the FLT(96:1) and TFLT(32:1) buses is derived from the 32 MATRIX circuits and is identical to the data transferred by the tri-state circuits in the FAULT circuit of FIG. 16a. However, the FAULT circuit transfers this data to the output bus DATA(15:0) while the FAULT-DATA-circuit transfers the same data to PSC-1 of the ARINC-429 (see FIG. 6h). The timing of this transfer is controlled by the timing signals A-FLT-16-EN-L through A-FLT-96-EN-L when transferring data on the FLT(96:1) bus whereas timing signals A-TFLT-16-EN-L and A-TFLT-32-EN-L are utilized when transferring data on bus TFLT(32:1) to the DATA(15:0) bus. These timing signals are derived from the TRANS circuit of FIG. 6, which sequences the transfer of data on the TFLT(32:1) and FLT(96:1) buses to the ARINC-429.

Figure 18:
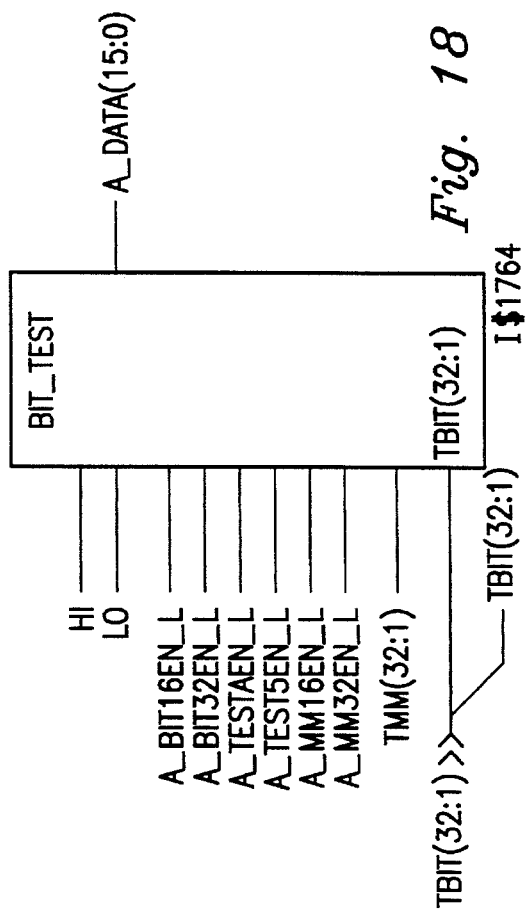
Figure 18A:
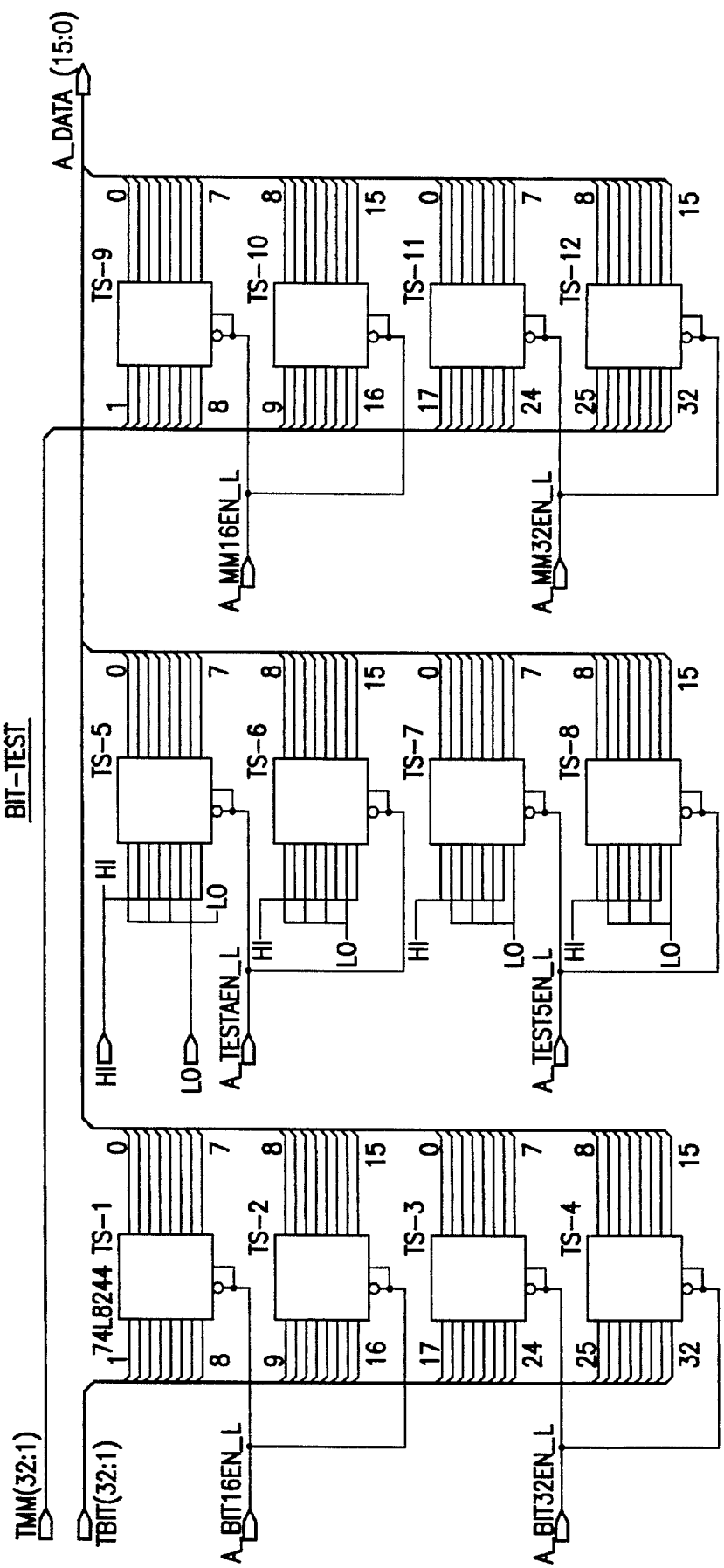
FIG. 18*a* is a detailed schematic of the BIT-TEST circuit of FIG. 18.

The BIT-TEST circuit is shown in simplified block diagram form in FIG. 18 and is shown in greater detail in FIG. 18a. The BIT-TEST circuit transfers data from the TBIT(32:1) bus to the A-DATA(15:0) bus in the non-redundant mode and transfers data from the TMM(32:1) bus to the A-DATA(15:0) bus in the redundant mode (for transmission by PSC-1 in both modes).

The bus TBIT(32:1) has its lines selectively coupled to the 8 input lines of each of the tri-state circuits TS-1 through TS-4, the output lines of these tri-states being coupled to the A-DATA(15:0) bus. The TMM(32:1) bus has its 32 lines selectively coupled to associated ones of the tri-states TS-9 through TS-12 for selective coupling, 16 bits at a time, to the A-DATA(15:0) bus. The tri-states TS-5 through TS-8 each have their 8 inputs coupled in alternating fashion to high and low level states HI and LO, respectively, for test purposes to assure that the integrity of the data applied to the A-DATA(15:0) bus.

The timing control signals A-BIT-16-EN-L and A-BIT-32-EN-L are derived from the TRANS circuit. Data on the 32 lines of the TBIT(32:1) bus are transferred 16 lines at a time to the A-DATA(15:0) bus.

Data from the 32 lines of the TMM(32:1) bus is transferred, 16 lines at a time, to the A-DATA(15:0) bus in accordance with the timing control signals A-MM-16-EN-L and A-MM-32-EN-L, which timing signals are also derived from the TRANS circuit as shown in FIG. 6.

The A-TESTA-EN-L and A-TEST5-EN-L control the transfer of the alternating high and low states applied to the inputs of the tri-states TS-5 and TS-6 and subsequently thereto, TS-7 and TS-8 in 16 bit bytes to the A-DATA(15:0) bus. The control signals A-TESTA-EN-L and A-TEST5-EN-L are derived from the TRANS circuit, as shown in FIG. 6.

The data on the TMM(32:1) bus is derived from the triple mismatch output line provided in each of the 32 MATRIX circuits M-1 through M-32 shown in FIGS. 8-1 to 10-2.

The data on the TBIT(32:1) bus is derived from the triple bit fault output of each of the 32 MATRIX circuits shown in FIGS. 8–10.

The A-DATA(15:0) bus is coupled to PSC-1 (FIG. 6h) for transmission.

Figure 19:
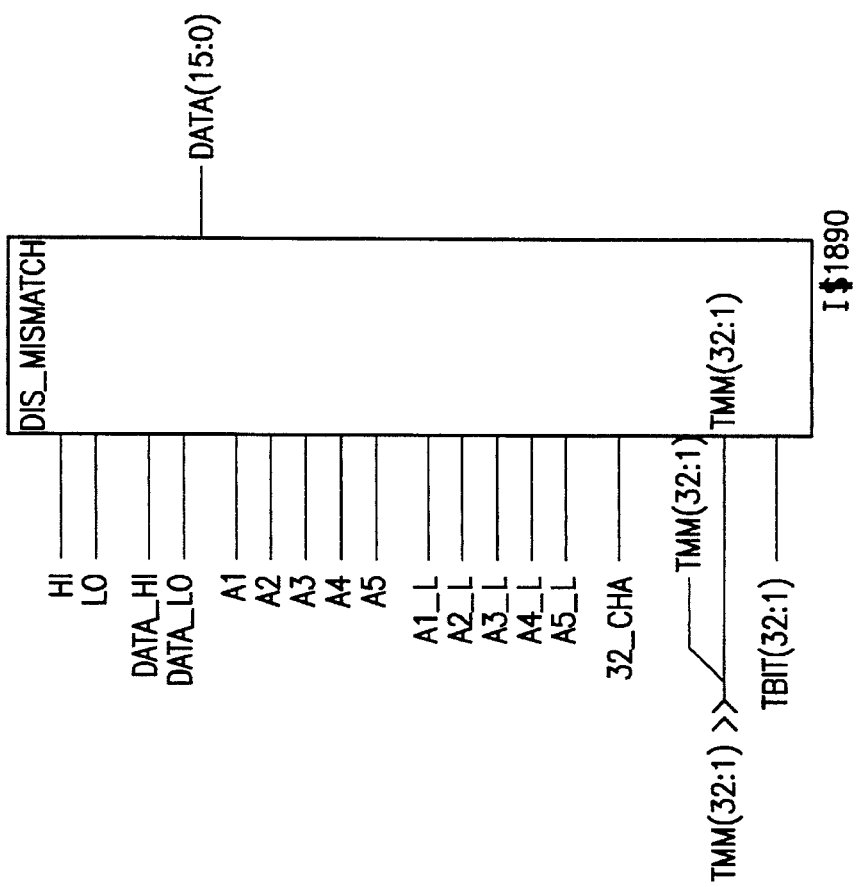
Figures 19A, 19B:
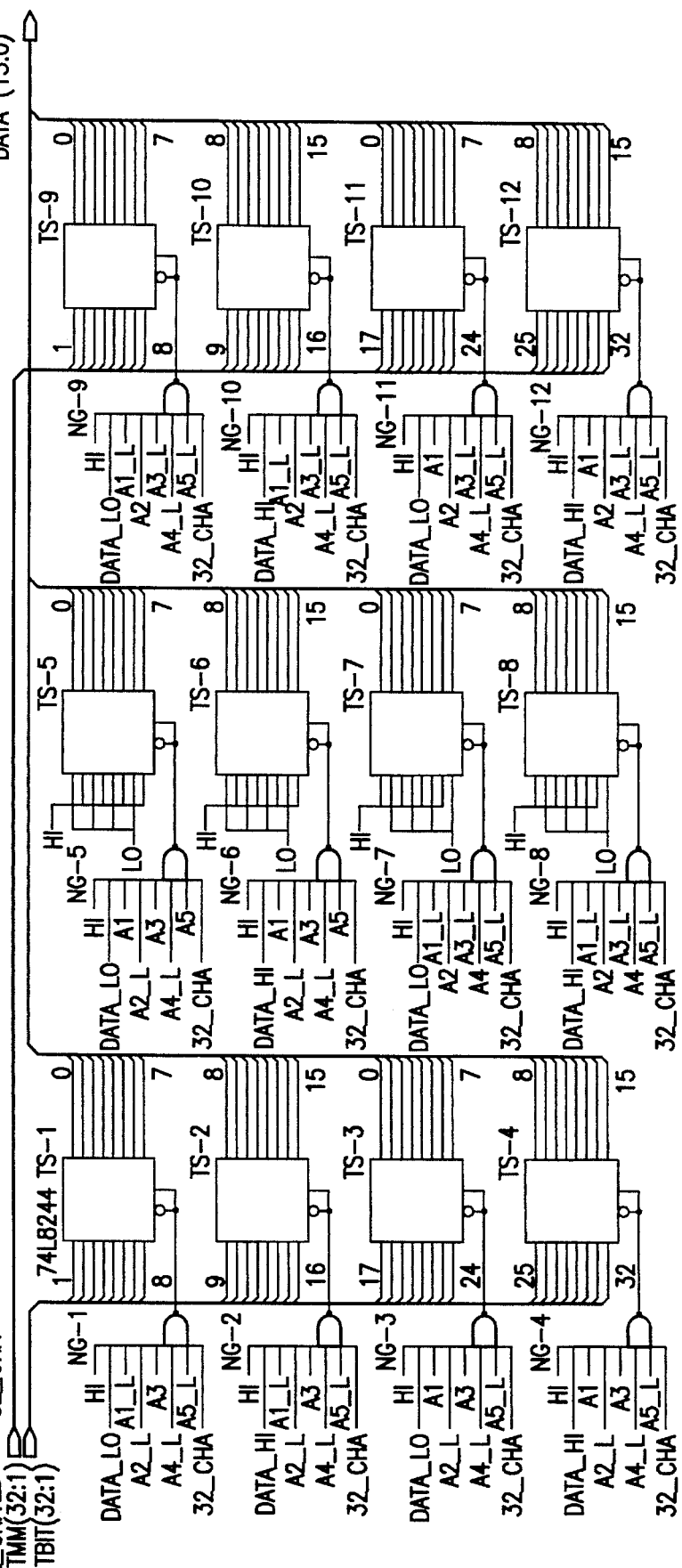
FIGS. 19*a* and 19*b* show the detailed circuitry employed in the DIS-MISMATCH circuit of FIG. 19.

FIG. 19 shows the DIS-MISMATCH circuit in simplified block diagram form. FIG. 19a is a detailed schematic of the DIS-MISMATCH circuit which transfers data on the buses TMM(32:1) and TBIT(32:1) which are the same buses applied to the tri-state circuits of FIG. 18a. However, the data on these buses is transferred to the DATA(15:0) bus under control of the outside world for coupling triple bit data (in the non-redundant mode) and triple mismatch data (in the redundant mode) to the output bus DATA(15:0).

The timing signals for transfer of the data are derived, as shown in FIG. 19b, from the outside world to provide the address and operating mode control signals for operating the NAND gates NG-1 through NG-12. Data on the lines of the TBIT(32:1) bus are transferred to the data(15:0) bus 16 bits at a time. For example, NAND gates NG-1 and NG-2 receive the identical control signals to enable tri-states TS-1 and TS-2 to transfer data at their input lines to the associated 16 lines of the data (15:0) bus. Gates NG-3 and NG-4 operate in a similar fashion, subsequent to the operation of NG-1 and NG-2.

The test conditions of alternating high and low levels are applied to the inputs of the tri-states TS-5 through TS-8 and the states of these inputs are transferred to the DATA(15:0) bus 16 bits at a time under control of the signals applied to the NAND gates NG-5 through NG-8 from the outside world, as shown. The triple mismatch data (TMM) derived from the 32 MATRIX circuits and applied to the 32 lines of the TMM (32:1) bus are transferred by TS-9 through TS-12, 16 bits at a time, to the DATA(15:0) bus for transmission to the outside world.

Figure 20:
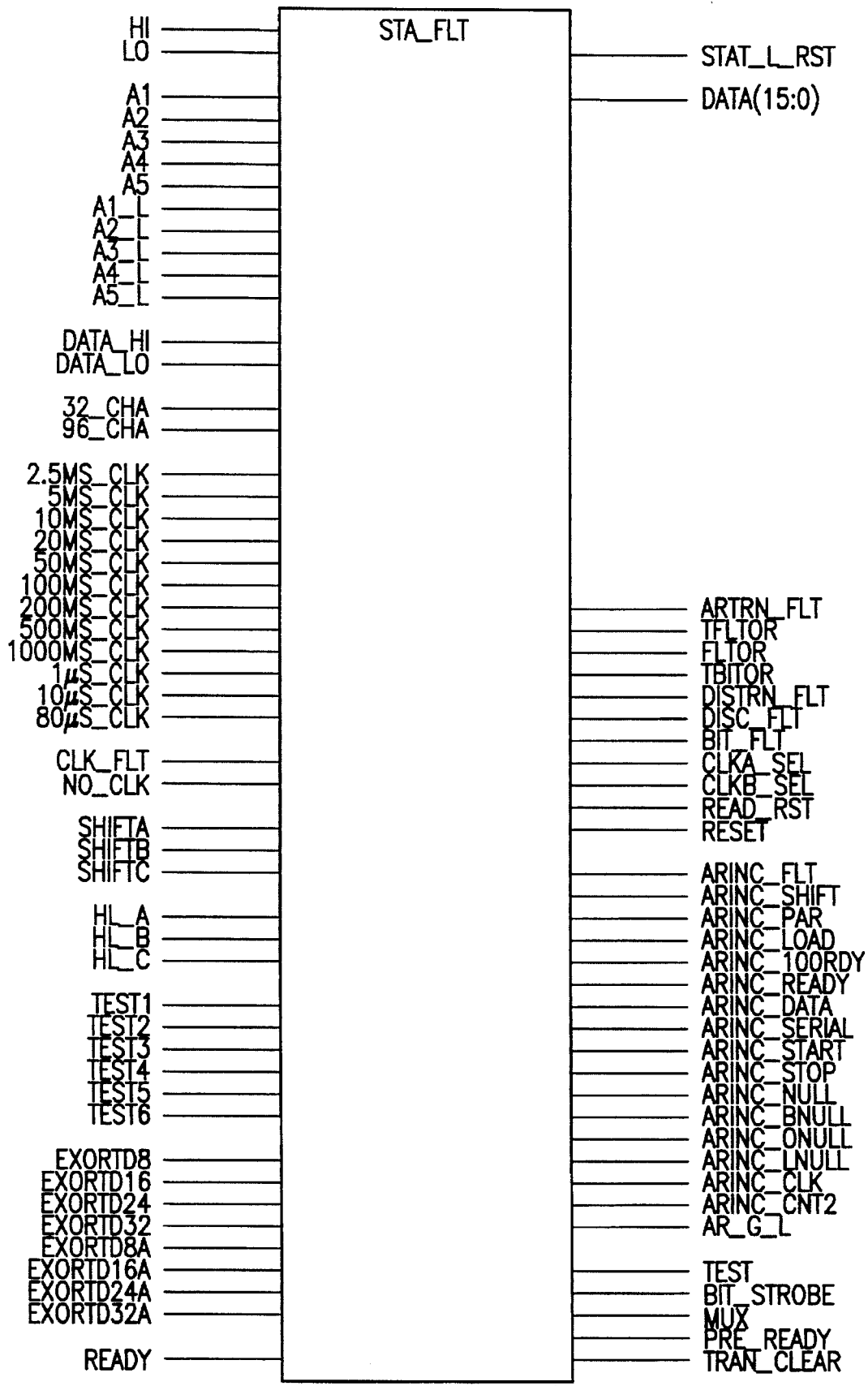

FIG. 20 is a simplified block diagram of the STA-FLT circuit which is shown in greater detail in FIGS. 20a-1, 20a-2, 20b and 20c.

Figures 1, 20A:
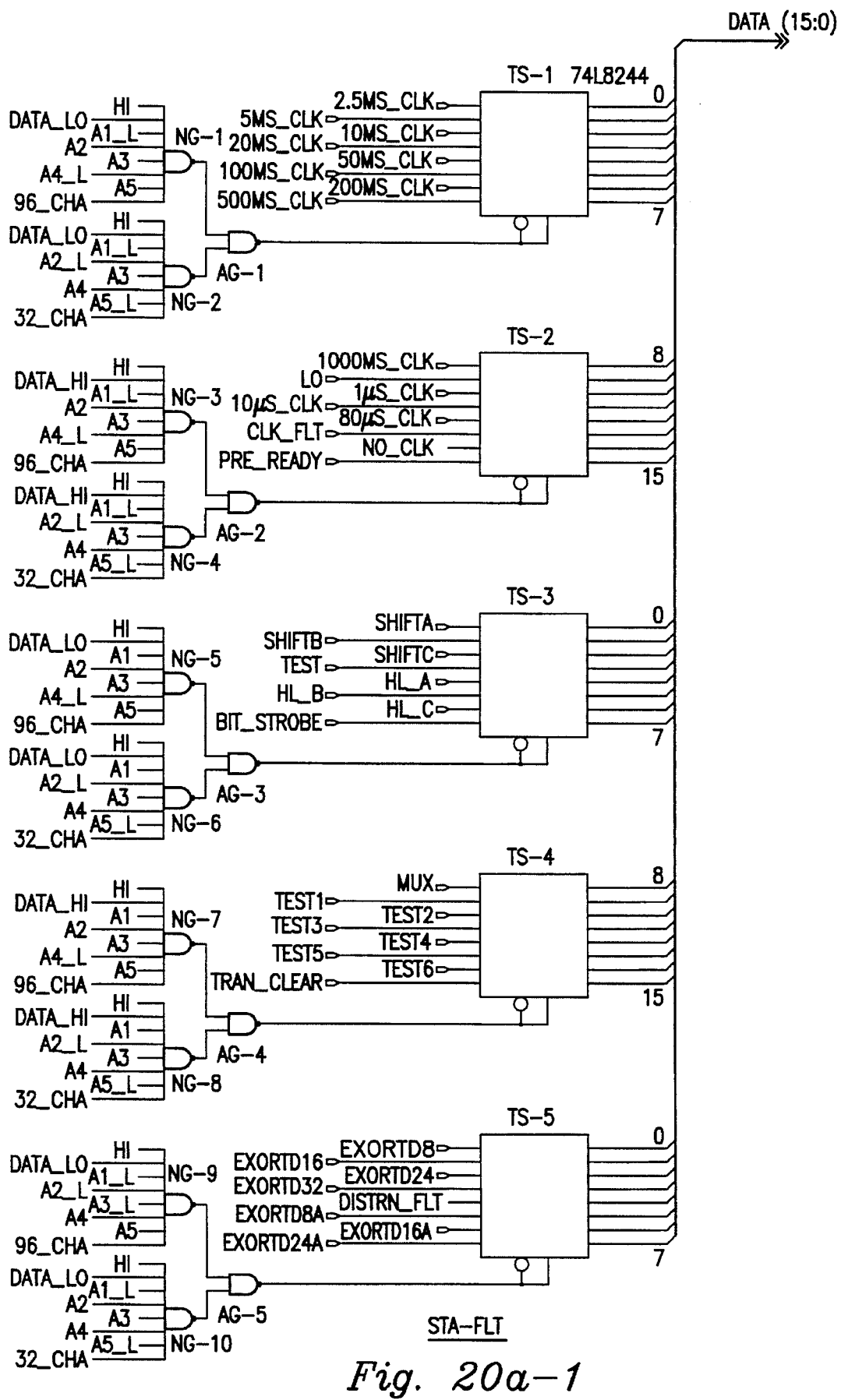
Figures 2, 20A:
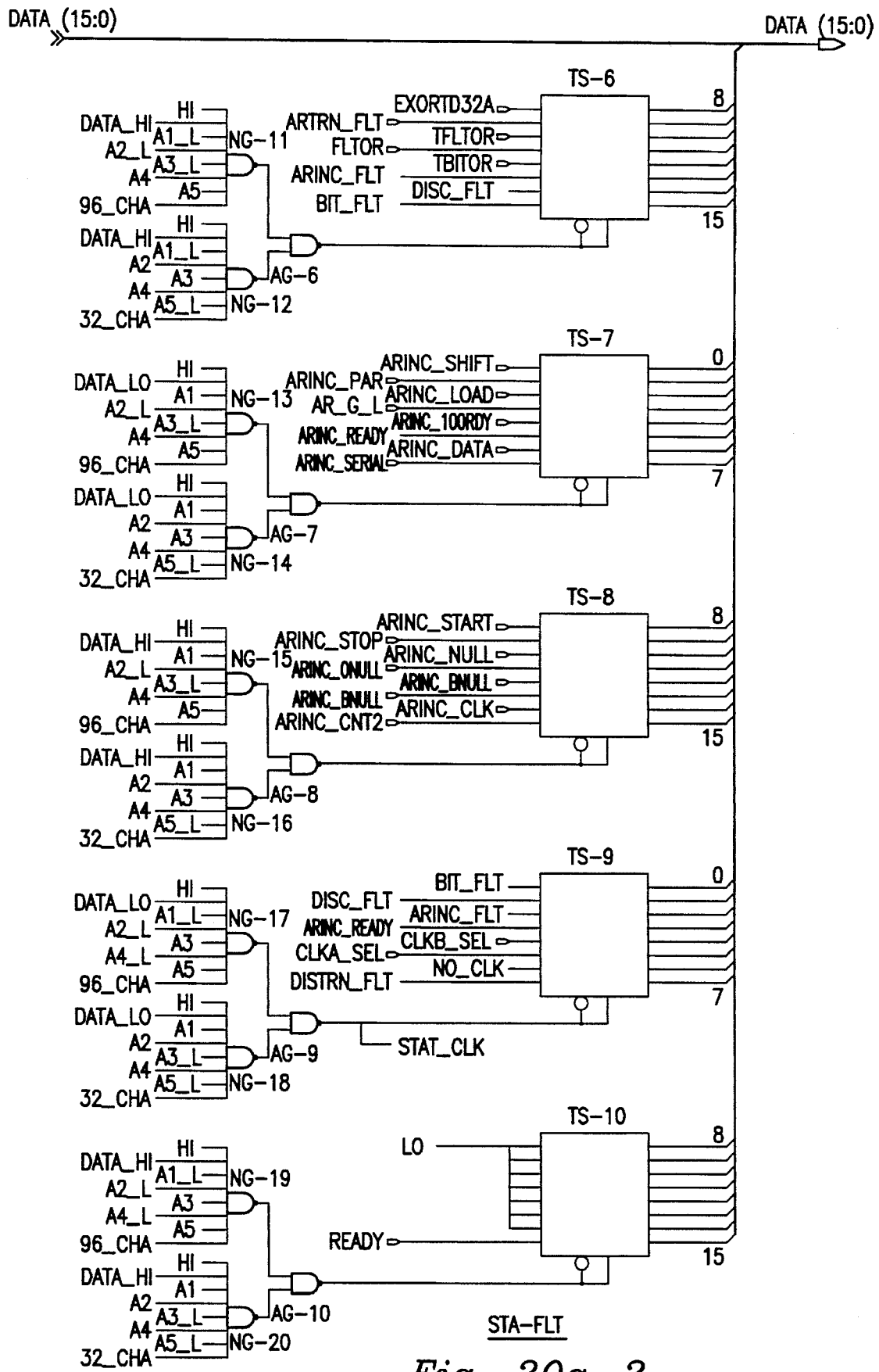

The STA-FLT circuit is utilized for purposes of debugging the interface 10 by providing the outputs of all of the control circuits to the outside world through the DATA(15:0) bus. The principal circuitry is shown in FIGS. 20a-1 and 20a-2 and is comprised of a plurality of tri-states TS-1 through TS-10. The 8 inputs of the tri-states TS-1 through TS-10 receive control signals from a variety of different circuits. For example, tri-state TS-1 receives the 5 millisecond, 20 millisecond, 100 millisecond and 500 millisecond clock signals in both the inverted and non-inverted form. When it is desired to examine any one or all of these signals, the NAND gates NG-1 and NG-2 are enabled by the five address signals A-1 through A-5, the data low signal (DATA-LO) and the 96-CHA signal, enabling the tri-state TS-1 to couple the 8 input lines receiving the aforementioned clock signals in their inverted and non-inverted form to the DATA(15:0) bus. Tri-state TS-2 is enabled when the signal states appearing at the inputs of one of the NAND gates NG-3 or NG-4 are all high enabling eight additional signals developed by the CONTROLLER circuit of FIG. 7 to be examined at the output of the interface 10. The inputs of the tri-states TS-1 through TS-4 selectively transfer signals derived from the CONTROLLER circuit of FIG. 7 to the outside world. Tri-states TS-5 and TS-6 are activated by their associated gates NG-9 and NG-10, and NG-11 and NG-12, respectively, the tri-states TS-5 and TS-6 making available signals developed by the LOGIC-2 circuit shown in FIG. 11. Tri-states TS-7 and TS-8 transfer signals generated by the TRANS circuit shown in FIG. 6 to the DATA(15:0) bus, when selectively enabled by the NAND gates NG-13 through NG-16.

The tri-state TS-9 couples signals generated by the LOGIC-2 circuit, in addition to the signals from the LOGIC-2 circuit selectively transferred to the data bus by tri-states TS-5 and TS-6.

Tri-state TS-10 transfers the ready signal READY signal, also derived from the LOGIC-2 circuit, the remaining 7 lines being connected to a low level LO.

Figures 20B, 20C:
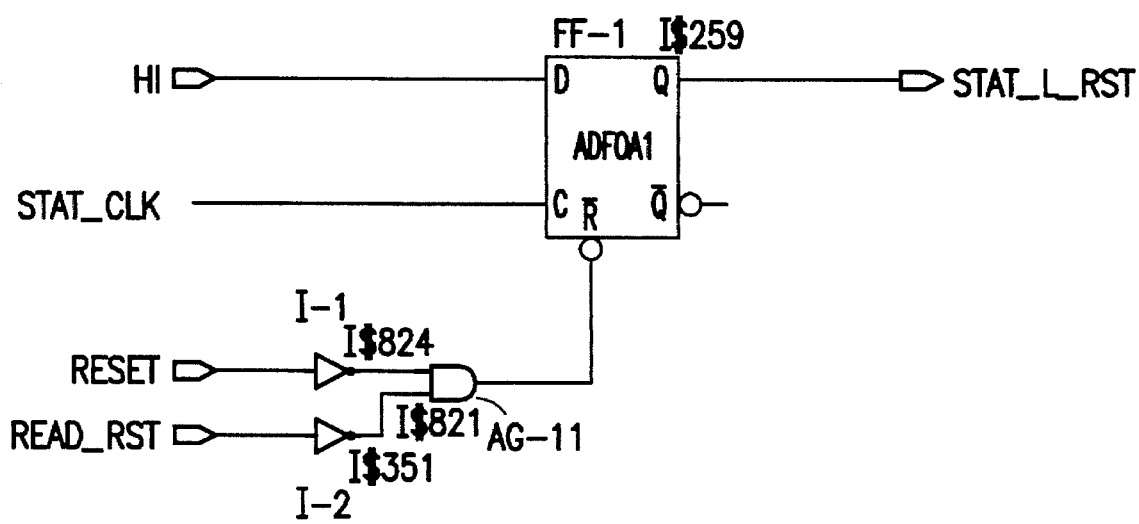

The NAND gates NG-17 and NG-18 and AND gate AG-9, in addition to enabling the tri-state TS-9 to transfer the signals at its output to the DATA(15:0) bus, further generates the status clock signal STAT-CLK which is applied to the clock input of a flip-flop circuit FF shown in FIG. 20c, whose D input is wired high. When the STAT-CLK signal is generated, the Q output of FF-1 generates a status low reset signal STAT-L-RST which clears all of the R-S flip-flops in the FAULT circuit shown in FIG. 16. The clear signal is itself cleared by a reset signal applied to reset input R of FF-1 derived from the input signals RESET and READ-RST applied to the reset input of FF-1 through inverters I-1 and I-2 and AND gate AG-11.

The operation of the interface 10 is as follows:

Interface 10 has the capability of operating in either the redundant or non-redundant mode.

In the redundant mode, the interface is wired so that channels 1, 33 and 65 are coupled in common, channels 2, 34 and 66 are coupled in common, and so forth (see FIG. 2b). In this manner, 32 discretes may be examined through three redundant channel arrays, said channel arrays being shown, for example, in FIG. 2a.

The interface is provided with two separate and independent means by which to communicate with the outside world, namely, the ARINC-429 transmitter and the data bus DATA(15:0) which applies the data on the 16 lines of the bus to output terminals for transfer to the outside world. Since the ARINC-429 transmitter and the DATA(15:0) bus are independent of one another, there is no synchronization required as between the transmission of data except that the ARINC-429 transmitter is initiated by the ARINC-READY signal which is derived either from the READY signal generated by the CONTROLLER circuit (see FIG. 7) or a switch signal from the outside world identified as SAM-100MS which is an input applied to the TRANS circuit shown in FIG. 6.

In the redundant mode, each of the 32 input channels is simultaneously wired to three associated channels of the interface 10. Typically, channel 1 from the outside world is coupled to channels 1, 33 and 65 of the interface, channel 2 of the outside world is wired in common to the channels 2, 34 and 66 of interface 10, and so forth, which channels are shown in FIG. 2a.

Let it be assumed that, when operating in the redundant mode, a device which is to be monitored and which is coupled to channel 1 of the outside world changes from a low state to a high state at time $t_0$. Every 20 microseconds the high state of channel 1 is shifted through the stages of the shift register provided for each channel as shown in the MATRIX circuit of FIGS. 8a-1 and 8a-2. The 20 microsecond shift pulses SHIFTA, SHIFTB, and SHIFTC are derived from the CONTROLLER circuit shown in FIG. 7. The VOTE and BOUNCE circuits generate the results of the vote and bounce tests which appear at the outputs DATAOUT-A through DATAOUT-C and a triple redundant vote is performed by a VOTE circuit based on three aforementioned outputs.

The CONTROLLER circuit further controls the internal tests TEST-1 through TEST-6 which are applied to the MISMATCH-BIT circuit forming part of the MATRIX circuit shown in FIGS. 8-1 to 10-2, for example.

The READY signal generated by the CONTROLLER circuit initiates operation of the TRANS circuit shown in FIG. 6 which sequences through the fault, bounce, data, triple fault, triple bounce, triple data, mismatch, bit and test signals of its state machine responsive to the READY signal. The internal testing (TEST-1 through TEST-6) is performed during the first 440 microseconds of the READY signal which is identified as the low state of the READY signal. When the READY signal goes high, the state machine of the TRANS circuit is initiated and all of the aforementioned fault, bounce, data, triple fault, triple bounce, triple data, mismatch bit and test information is sequentially applied to the ARINC-429 transmitter comprised of the shift register PSC-1 of the TRANS circuit shown in FIG. 6h for converting parallel data, transferred to the registers REG-2 and REG-3 of PSC-1, into serial data for transmission to the ARINC-429 transmission line ARINC-SERIAL shown in FIG. 6c. The state machine comprised of the ARINC-DEC circuit shown in simplified block diagram in FIG. 6a, controls the LAB-EN decoder circuit shown in FIG. 6c to couple the LAB-01 through LAB-010 outputs to selected stages of the registers REG-1 and REG-4 which comprise the first and fourth stages of the parallel to serial converter PSC-1.

The data sequenced to the PSC-1 includes the fault data from FAULT-DATA circuit shown in FIG. 17, the signals A-FLT-16-EN-L through A-TFLT-32-EN-L generated by TRANS circuit as shown in FIG. 6 for timing the transfer of data from the 32 bit bus TFLT(32:1) to the ARINC-429 transmitter data bus A-DATA(15:0) which is the output of FIG. 17 and the input of the PSC-1 shown in FIG. 6c. The timing circuits so generated by the TRANS circuit transfer 32 bits of information 16 bits at a time. Thus, two 32 bit words are transmitted by PSC-1 into the output line ARINC-SERIAL in the form of two successive 32 bit words. FIG. 21 shows the format of the 32 bit words transmitted in serial fashion by PSC-1, each 32 bit word being made up of a parity bit (32), 16 data bits (bits 14–29) and a plurality of other bits for a total of 32 bits. Two 32 bit serial words are transmitted in order to transmit 32 bits of data, 16 bits of data per word.

Signals A-BON-16-EN-L through A-TBON-32-EN-L generated by the TRANS state machine, are applied to the ARINC-BOUNCE circuit for transferring bounce data to the ARINC-429 bus, i.e. A-DATA(15:0). The TDAT data is applied in a similar fashion to the A-DATA(15:0) bus by way of the DATA circuit shown in FIG. 15. Data on the TFLT(32:1) bus is transferred to the A-DATA(15:0) bus through the FAULT-DATA circuit of FIG. 17 under control of the fault timing signals generated by the TRANS circuit shown in FIG. 6. The triple fault, triple bounce, triple data mismatch bit and test data are transferred to the A-DATA(15:0) bus in a similar fashion. The aforesaid data is transmitted in a fixed sequence as shown in the table of FIG. 21, the Triple Bounce 16 (upper 16 bit states) being transmitted first, Triple Bounce 32 (lower 16 bit states) being transmitted next, Mismatch 16 being transmitted next, and so forth, until all twelve 32 bit words have been transmitted, the sequence continually cycling in this fashion upon the occurrence of each positive going level of the READY signal applied to the TRANS circuit of FIG. 6 by the CONTROLLER circuit shown in FIG. 7.

As an alternative to initiation of the state machine of the TRANS circuit by the READY signal, the state machine may be initiated by the 100 millisecond signal applied to SAM-100MS input derived from the outside world.

Figure 6I:
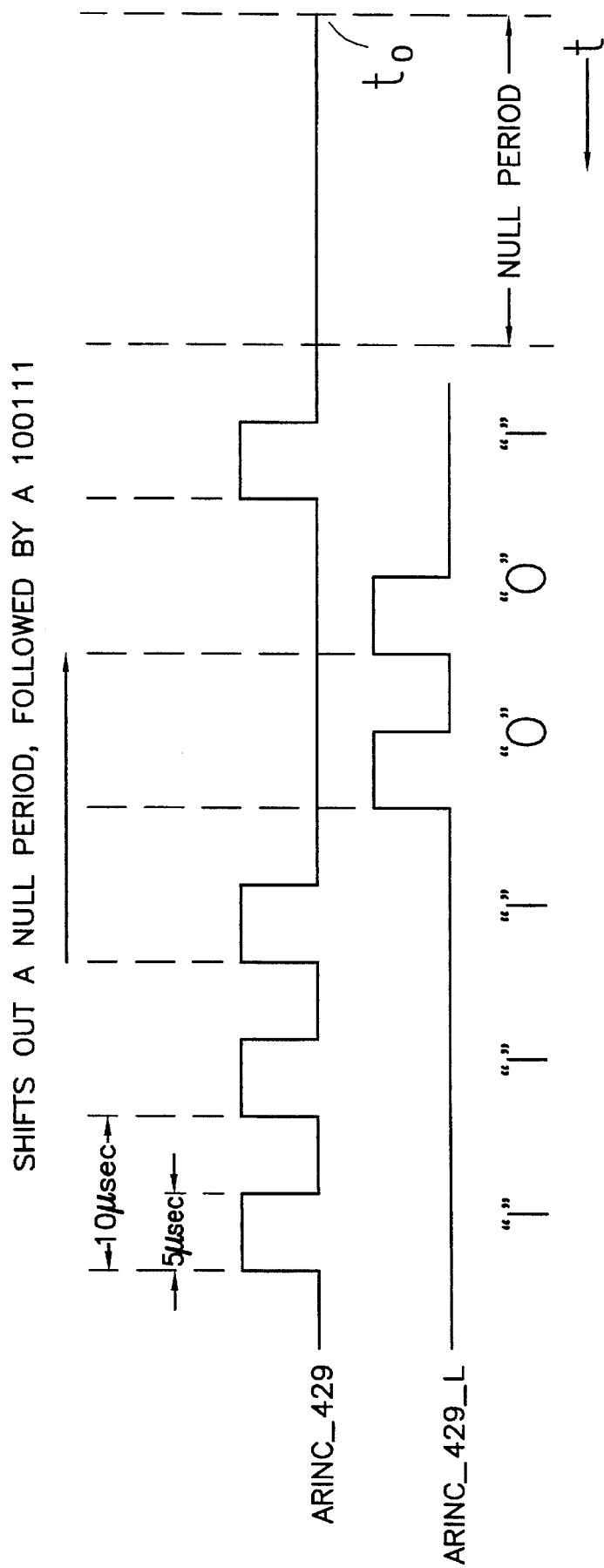
FIG. 6i is a waveform diagram which is useful in explaining the operation of the ARINC-429 transmitter.

Data is transmitted according to the selected bit rate. For example, at the 100 kilohertz rate, bits have a width of 10 microseconds, the binary one bit being represented by a high level during the first 5 microseconds of a bit interval and a low level during the remaining five microseconds. When operating at a bit rate of 12.5 kilohertz, the bit width is 80 microseconds, binary one being represented by a high level during the first 40 microseconds of the bit interval and a low level during the remaining 40 microseconds. Transmission takes place over two output lines, namely, ARINC-429 and ARINC-429-L. Noting the parallel to serial converter PSC-1 shown in FIG. 6h, the output ARINC-SERIAL of FIG. 6h is coupled to one input of gate GAA whereby either the parity bit is transferred by gate GZ or the serial data is transferred by GAA through OR gate GAB to inverter $I_H$ to set flip-flop FF-6 and is directly coupled to the D input of flip-flop FF-7 (FIG. 6c). The RESET inputs of FF-6 and FF-7 receiving a RESET input from NOR gate NOR-1. When transmitting a binary one state, output OUT-429 generates a high level during the first half of the bit interval followed by a low level during the second half of the bit interval (controlled by the RESET signal) while output OUT-429-L generates a low level throughout the bit interval. A binary zero bit is represented by a bit interval which is at a high level during the first half of the interval and a low level during the remaining half of the interval which appears at output OUT-429-L while output OUT-429 provides a low during the entire interval. The outputs generated at ARINC-429 and ARINC-429-L for a particular bit sequence is shown in FIG. 6i.

Data is transferred to the outside world through the DATA(15:0) bus under control of the outside world, the interface user providing the address signals A-0 through A-5 (in both inverted and non-inverted form), the mode signals 32-CHA and 96-CHA and the data high and data low signals for transfer of real data, bounce data, fault data, etc. to the DATA(15:0) bus for use by the outside world. For example, note: default circuit FAULT shown in FIG. 16 which transfers data from the triple fault bus TFLT(32:1) to the data bus DATA(15:0); the DIS-BOUNCE circuit shown in FIG. 12 which transfers triple bounce data from bus TBNC(32:1) to the DATA(15:0) bus; the DISCRETE circuit shown in FIG. 13 which transfers triple data from the bus TDAT(32:1) to the DATA(15:0) bus; the DIS-MISMATCH circuit, shown in. FIG. 19 which transfers triple mismatch and triple bit data from buses TMM(32:1) and TBIT(32:1) to the DATA(15:0) bus and the STA-FLT circuit shown in FIG. 20 which makes available a number of the control signals for diagnostic purposes by transferring this data to the DATA(15:0) bus under selection and control of the outside world, all of said transfers being in either 8 bit or 16 bit groups. The control signals for transferring all of the above data to the output data bus may be generated in any suitable fashion such as, for example, by means of a computer, such as a PC having a 16 line input port for coupling to the output lines of the DATA (15:0) bus, a five-line output port for generating the address signals, outputs for generating the redundant and non-redundant mode signals and for generating the DATA-LO and DATA-HI control signals generated by a stored program.

The data applied to the output data bus DATA(15:0) is compared against data appearing at the input through the LOGIC-2 circuit shown in FIG. 11 as a self-test to insure integrity of the interface circuitry. Data from discretes is compared, for example, as shown in FIGS. 11a and 11b, triple fault data on the TDAT(32:1) bus is compared against the data applied from the outside world and coupled to the bus D-B(15:0). Data on the lines of the TDAT(32:1) bus is compared against input data appearing on the D-B(15:0) bus in order to assure that output data generated by the interface 10 compares with input data coupled to the interface from the outside world. These comparisons are made by the exclusive-OR circuits shown in FIGS. 11a and 11b forming part of the LOGIC-2 circuitry. The results of these comparisons are provided as fault information at the output of the LOGIC-2 circuit.

The non-redundant mode of interface 10 operates in substantially the same manner as the redundant mode except that the three groups of 32 channels are not wired together and the interface is thus capable of monitoring 96 independent inputs. Since all 96 inputs are independent of one another, the interface does not look for mismatches. The sequence of the TRANS and CONTROLLER circuits is basically the same as the sequence in the redundant mode with the differences residing in the fact that data presented to the ARINC-429 transmitter requires three times the number of data words (see FIG. 21) to transmit actual data. In the non-redundant mode, 20 words each of 32 bits are required for transmission of all of the data to the outside world.

Data is transferred from the interface 10 to the outside world through the DATA(15:0) bus under control of the outside world through the use of the address data, data high, data low and redundant and non-redundant mode signals provided by the user and applied to the DIS-MISMATCH circuit shown in FIG. 19, the discrete circuit shown in FIG. 13 and the DIS-BOUNCE circuit shown in FIG. 12 as well as the FAULT circuit shown in FIG. 16. The aforementioned control data provided by the user is also applied to the STA-FLT circuit shown in FIG. 20 to examine signals internally generated by interface 10 for diagnostic purposes, as was mentioned hereinabove.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

For example, the number of redundant lines coupled to monitor each discrete may be an odd number other than three (for example, five (5) or seven (7)) to enable the performance of a majority vote. Also, the bounce test may be taken by storing an odd number of lines greater than three (for example, five (5) or seven (7)).

What is claimed is:

1. Apparatus for examining signals produced by a plurality of devices, said signals being capable of assuming at least two operating states, comprising:

a plurality of input lines each being coupled to an output of an associated device;

a plurality of comparator means for determining a binary state of a signal appearing at each input line responsive to a predetermined threshold level;

means for sampling a binary state of a signal of each device appearing at an output of an associated comparator means, said sampling being performed at a constant predetermined rate;

a plurality of means for storing three successive samples of an operating state appearing at an associated input line responsive to said sampling means;

a plurality of vote means for each input line for determining a binary state of its associated input line responsive to a majority of the stored samples of the associated input line being in the same state;

a plurality of bounce generating means for each input line, each generating a bounce condition when adjacent states of the associated input line stored in said storing means are different;

a common output bus having a plurality of coupling lines for coupling binary states on each input line to a plurality of output terminals;

first bus means having a plurality of lines, the inputs of each first bus means line being coupled to an output of one of said bounce generating means;

second bus means having a plurality of lines each coupled to an associated output of one of said vote means;

first transfer means having a plurality of lines for selectively transferring binary data on at least a portion of the lines of said first transfer bus means to predetermined inputs of said common bus means when in a first operating state and for isolating said first transfer bus means from said common output bus means when in a second state;

second transfer means having a plurality of lines for transferring binary data on at least a portion of the lines of said second transfer bus means to selected inputs of said common output bus means when in a first state and for isolating said second transfer bus means from said common output bus means when in a second state; and means for controlling the operating state of said first and second transfer means to transfer data therefrom to said common output bus means in sequential fashion.

2. The apparatus of claim 1 wherein said control means further comprises means for clearing said storing means and initiating a new start signal responsive to successive transfer of binary data from said first and second transfer bus means to said common output bus means.

3. The apparatus of claim 2 wherein said third transfer means comprises means for clearing said storing means and initiating a new start signal responsive to transfer of binary data from said third and fourth transfer bus means to said transmission means.

4. The apparatus of claim 1 wherein said first transfer means includes a plurality of inputs coupled to selected outputs of said first transfer bus means; and a plurality of outputs coupled to selected inputs of said common bus means and a control input for receiving a control signal for operating said first transfer means in said first state when said control signal is in a first binary state and for operating said first transfer means in said second state when said control signal is in an opposite binary state.

5. The apparatus of claim 4 wherein in said first transfer means includes means for presenting a high impedance to the inputs of said common output bus means coupled to said first transfer means when said first transfer means is in said second state.

6. The apparatus of claim 4 wherein said second transfer means includes a plurality of inputs coupled to selected outputs of said second transfer bus means and a plurality of outputs coupled to selected inputs of said common bus means and a control input for receiving a control signal for operating said second transfer means in said first state when said control signal is in a first binary state and for operating said second transfer means in said second state when said control signal is in an opposite binary state.

7. The apparatus of claim 6 wherein in said second transfer means includes means for presenting a high impedance to the inputs of said common output bus means coupled to said first transfer means when said first transfer means is in said second state.

8. The apparatus of claim 1 further comprising data transmission means for transmitting binary data in serial fashion including means for receiving data at a plurality of receiving inputs in parallel fashion;

third transfer means for selectively coupling predetermined lines of said first transfer bus means to said parallel receiving inputs when in a first state and for isolating said parallel receiving inputs from said first transfer bus means when in a second state;

fourth transfer means for selectively transferring data at predetermined lines of said second transfer bus means to said parallel receiving inputs when in a first state and for isolating said parallel receiving inputs from said second transfer bus means when in a second state; and said control means further comprising means for controlling operating states of said third and fourth transfer means to sequentially transfer data to said parallel inputs from said first and second transfer bus means.

9. The apparatus of claim 8 wherein said control means further comprises means for operating said serial transmission means responsive to each transfer of data to said parallel inputs by said third and fourth transfer means to transfer bit states applied at the receiving inputs in serial fashion to a transmission output terminal.

10. The apparatus of claim 8 wherein said transmission means further comprises parallel to serial converter means including a plurality of shift register stages each having a plurality of inputs for receiving data in parallel fashion and control means responsive to a control signal for transferring data from said shift register stages in serial fashion to said transmission output terminal.

11. The apparatus of claim 10 further comprising first and second transmission line means;

said transmission output terminal being coupled to said first output transmission line means;

inverter means for coupling said transmission output line to an input of said second transmission line output means;

said first transmission line output means further comprising means for generating a given level throughout a bit interval responsive to a binary zero state and for generating a binary one level during a first half of a bit interval and generating a binary zero level during a remaining half of said bit interval responsive to a binary one state applied to said first output transmission means upon a start of the bit interval; and said second output transmission line means comprising means for generating a given level throughout a bit interval responsive to a binary zero state and for generating a binary one level during a first half of a bit interval and generating a binary zero level during a remaining half of said bit interval responsive to a binary one state applied to said first output transmission means upon a start of the bit interval.

12. The apparatus of claim 1 further comprising means for generating a plurality of sampling rates responsive to a master clock means; and means for selecting one of said sampling rates responsive to a predetermined selection code.

13. The apparatus of claim 12 wherein said predetermined selection code comprises a plurality n of binary bits wherein the number of possible codes is equal to $2^n$.

14. The apparatus of claim 13 wherein n is equal to three.

15. The apparatus of claim 1 wherein said control means comprises a master clock;

means for generating a ready signal responsive to said master clock, said ready signal having a predetermined interval, a first portion of said interval being in a first binary state and a second portion of said interval being in an opposite binary state;

the first portion of said interval being of a length sufficient to complete transfer of data into said storage means; and said control means for transferring data from said transmission means in serial fashion being responsive to initiation of said second portion of said interval.

16. The apparatus of claim 1 wherein at least one of said first and second input transfer buses is provided with a predetermined number of lines N1;

said common output bus having a predetermined number of lines N2 wherein N1 is a multiple of N2 such that N1 equals KN2 wherein K is an integer between two and twelve;

said first transfer means having an equal number of input and output lines which is equal to N3 and wherein N2 is equal to CN3 wherein C is an integer between one and two;

the input lines of each of a plurality of transfer devices making up said first transfer means being coupled to different groups of lines of said first transfer bus means;

the output lines of each of said plurality of transfer devices making up said first transfer means being coupled to different groups of output lines of said common output bus means; and said control means including means for sequentially operating each of said transfer devices to said first state for sequentially transferring data from each of said different groups of lines of said first transfer bus means to associated lines of said common output bus means.

17. The apparatus of claim 1 wherein each of said input lines is coupled to an associated device by an input terminal;

said terminals being arranged along a substantially rectangular-shaped substrate, such that first, second and third arrays of said terminals are respectively arranged along edges of first, second and third adjacent sides of said substrates.

18. The apparatus of claim 17 wherein an array of output terminals are arranged along an edge of a fourth side of said substrate.

19. Apparatus for examining signals generated by a plurality of devices each signal being capable of assuming at least two operating states, comprising:

an array of groups of lines, each group of lines comprising first, second and third lines having their inputs coupled in common to an output of an associated device;

a plurality of matrix circuits equal in number to said plurality of devices each being comprised of first, second and third storage means for respectively storing bit states of signals on first, second and third lines of an associated group of lines;

means for sampling signals on said first, second and third lines at a given sampling rate for transfer of at least three successive samples of each of said first, second and third lines into associated storage positions of first, second and third storage means, respectively, for storing said samples;

first, second and third vote means respectively coupled to said first, second and third storage means for generating a majority output when at least a majority of the state of the three stored samples occurring at a given sampling time are in the same state, the state of the majority output being the same as the state of the signal samples comprising the majority;

first, second and third bounce generating means each associated with one of said first, second and third storage means for generating a bounce state when signal states of the successive stored signal samples in the associated storage means are different;

a common output bus having a plurality of lines for coupling bit states of the signals on each of said lines to output terminals;

vote bus means having a plurality of lines equal in number to the total number of said vote means, each line being coupled to one of said vote means;

bounce bus means having a plurality of lines equal in number to the total number of said bounce generating means, each line being coupled to one of said bounce generating means;

first transfer means arranged between said vote bus means and said common output bus means and having a first operating state for coupling said vote bus means to said common output bus means and having a second operating state for isolating said vote bus means from said common output bus means;

second transfer means coupled to said bounce bus means and said common output bus means and having a first operating state for coupling said bounce run means to said common output state and having a second operating state for isolating said bounce bus means from said common output bus means; and means controlling the operating states of said first and second transfer means for transferring data on said vote bus means and said bounce bus means to said common output bus means in sequential fashion.

20. The apparatus of claim 19 wherein each matrix means further comprises:

triple vote means for generating a triple majority output state responsive to a majority output state of said first, second and third vote means, an output state of said triple vote means being the same as an output state of the inputs comprising the majority result;

triple vote bus means having a plurality of lines each coupled to an associated one of all of said triple vote means;

third transfer means coupled between said triple vote bus means and said common output bus means and having a first operating state for coupling the data on said triple vote bus means to said common output bus means and a second operating state for isolating said triple vote bus means from said common output bus means; and said controlling means further including means for controlling the operating state of said third transfer means to transfer data on said triple vote bus means to said common output bus means in sequential fashion along with data on said vote bus means and said bounce bus means.

21. The apparatus of claim 19 wherein each matrix means further comprises triple bounce voting means for generating a triple bounce output state when a majority of the first, second and third bounce generating means of the associated matrix means generates a bounce condition;

triple bounce vote bus means having a plurality of output lines each being coupled to one of the total number of triple bounce vote means;

third transfer means coupled between said triple bounce vote bus means and said common output bus means, and having a first operating state for coupling the data on said bounce vote bus means to said common output bus means and a second operating state for isolating said triple bounce vote bus means from said common output bus means; and said controlling means further including means for controlling the operating state of said third transfer means to transfer data on said triple bounce vote bus means to said common output bus means in sequential fashion along with data on said bus means and said bounce bus means.

22. The apparatus of claim 19 wherein each matrix means further comprises:

mismatch means including means for comparing the states of at least one of the samples in a given storage position in said first storage means with the samples in the associated storage position in said second and third storage means, said mismatch means generating a mismatch output when the compared states are not the same;

mismatch bus means coupled to said mismatch means;

third transfer means coupled between said mismatch bus means and said common output bus means, and having a first operating state for coupling the data on said mismatch bus means to said common output bus means and a second operating state for isolating said mismatch bus means from said common output bus means; and said controlling means further including means for controlling the operating state of said third transfer means to transfer data on said mismatch bus means to said common output bus means in sequential fashion along with data on said vote bus means and said bounce bus means.

23. The apparatus of claim 19 wherein each matrix means comprises:

mismatch means including first comparing means for comparing the states of first, second and third positions in said first storage means;

second comparing means for comparing states of first, second and third storage positions in said second storage means; and third comparing means for comparing the states of the first, second and third storage positions in said third storage means, said mismatch means generating a mismatch output when at least one of states of inputs to said first, second and third comparison means do not compare;

mismatch bus means coupled to all of said first, second and third comparing means of said mismatch means;

third transfer means coupled between said mismatch bus means and said common output bus means, and having a first operating state for coupling the data on said mismatch bus means to said common output bus means and a second operating state for isolating said mismatch bus means from said common output bus means; and said controlling means further including means for controlling the operating state of said third transfer means to transfer data on said mismatch bus means to said common output bus means in sequential fashion along with data transfer from said vote bus means and bounce bus means.

24. The apparatus of claim 19 wherein each matrix means further comprises:

means for inverting the states of samples stored in each position of said first, second and third storage means;

mismatch means comprising first comparing means for comparing the states of samples stored in first, second and third positions of said first storage means;

second comparing means for comparing the inverted states of samples stored in the first, second and third positions of said first storage means;

third comparing means for comparing the states of samples stored in first, second and third positions of said second storage means;

fourth comparing means for comparing the inverted states of samples stored in the first, second and third positions of said second storage means;

fifth comparing means for comparing the states of samples stored in first, second and third positions of said third storage means;

sixth comparing means for comparing the inverted states of samples stored in first, second and third position of said third storage means;

said mismatch means further comprising means for generating a mismatch when any of the inputs to the first through the sixth groups of comparing means do not compare;

mismatch bus means coupled to all of said first, second and third comparing means of said mismatch means;

third transfer means coupled between said mismatch bus means and said common output bus means, and having a first operating state for coupling the data on said mismatch bus means to said common output bus means and a second operating state for isolating said mismatch bus means from said common output bus means; and said controlling means further including means for controlling the operating state of said third transfer means to transfer data on said mismatch bus means to said common output bus means in sequential fashion along with data transfer from said vote bus means and bounce bus means.

25. The apparatus of claim 19 wherein each matrix means further comprises:

means for inverting the states of samples stored in each position of said first, second and third storage means;

mismatch means comprising first comparing means for comparing the states of samples stored in first, second and third positions of said first storage means;

second comparing means for comparing the inverted states of samples stored in the first, second and third positions of said first storage means;

third comparing means for comparing the states of samples stored in the first, second and third positions of said second storage means;

fourth comparing means for comparing the inverted states of samples stored in the first, second and third positions of said second storage means;

fifth comparing means for comparing the states of samples stored in the first, second and third positions of said third storage means;

sixth comparing means for comparing the inverted states of samples stored in the first, second and third positions of said third storage means;

first test compare means for comparing the outputs of the second, fourth and sixth comparing means;

second test compare means for comparing the outputs of the first, third and fifth comparing means;

third test compare means for comparing the outputs of said second, third and sixth comparing means;

fourth test compare means for comparing the outputs of said first, fourth and fifth groups of comparing means;

test control means for selectively coupling output states of said first, second, third and fourth test compare means to a common fault output terminal in a sequential fashion;

fault bit storage means for storing a fault bit when the inputs of any one of said first, second, third and fourth test compare means fails to compare;

fault bit bus means coupled to all of said fault bit storage means of all of said matrix means;

third transfer means coupled between said fault bit bus means and said common output bus means, and having a first operating state for coupling the data on said fault bit bus means to said common output bus means and a second operating state for isolating said fault bit bus means from said common output bus means; and said controlling means further including means for controlling the operating state of said third transfer means to transfer data on said fault bit bus means to said common means in sequential fashion along with data transfer from said vote bus means and bounce bus means.

26. The apparatus of claim 19 further comprising:

third transfer means having a plurality of inputs and a plurality of outputs, said outputs being coupled to said common output bus means, and having a first operating state for coupling the data on the inputs of said third transfer means to said common output bus means and a second operating state for isolating inputs of said third transfer means from said common output bus means;

test means for selectively coupling a first state to all inputs of said third transfer means when in a first operating state, for coupling a second state to all inputs of said third transfer means when in a second operating state, and for coupling a first state to alternating ones of the inputs and a second state to remaining ones of said inputs when in a third operating state;

said controlling means further including means for sequentially changing the operating states of said third transfer means for transferring test states to said common output bus means in a sequential fashion along with data transfer from said first and second transfer means.

27. The apparatus of claim 19 further comprising:

means for comparing data transferred to said common output bus means from said vote bus means with the vote data applied to said vote bus means; and fault storing means for storing an internal fault condition when the data on said common output bus means and said vote bus means do not compare; and means for transferring the state of said fault storing means to an output terminal.

28. The apparatus of claim 19 wherein each of said input lines is coupled to an associated device by an input terminal;

said terminals being arranged along a substantially rectangular-shaped substrate, such that first, second and third arrays of said terminals are respectively arranged along edges of first, second and third adjacent sides of said substrates.

29. The apparatus of claim 28 wherein an array of output terminals are arranged along an edge of a fourth side of said substrate.

30. A method for examining a signal developed by each of a plurality of devices, a signal being capable of assuming either of two binary states, said method comprising the steps of:

(a) sampling the signals developed by the devices at a predetermined sampling rate;

(b) storing at least three successive samples;

(c) generating a majority vote state when at least a majority of the stored samples are in the same state, the vote state being the same state as the state of the majority of samples;

(d) generating a bounce state signal when the states of successive samples are different from one another;

(e) transferring the results of steps (c) and (d) for each device to a common output bus in a sequential fashion.

31. The method of claim 30 further comprising the step of:

transmitting the results of steps (c) and (d) through a common transmission bus in serial fashion.

32. A method for examining signals developed by a plurality of devices, said signals being capable of assuming either of two binary states, each device being coupled to an odd number of lines equal to at least three, said method comprising the steps of:

(a) determining the binary state of each signal appearing on the lines associated therewith responsive to a predetermined threshold;

(b) sampling the signal state at each of said lines at constant, predetermined intervals;

(c) storing a plurality of the samples of each line in storing means, said plurality of samples being at least three in number;

(d) taking a vote to generate a majority output state for each storage means when a majority of the samples stored therein are in a given state, the majority state being the same state as the state of the majority of samples;

(e) generating a bounce state for each storage means when successive samples stored therein are in different states;

(f) coupling all of the majority vote states generated in step (d) to a vote bus having a plurality of lines equal in number to the total plurality of storage means;

(g) coupling the bounce states generated in step (e) to a bounce bus having a plurality of lines equal in number to the total number of said storage means; and (h) sequentially coupling the states on the lines of the vote bus and on the lines of the bounce bus to a common output bus having a plurality of lines fewer in number than the lines of said vote bus and bounce bus.

33. The method of claim 32 further comprising the steps of:

(i) generating a triple vote state when a majority of the votes taken for all three lines of a given device generated in step (d) are in a given state, the triple bit vote state being the same state as the state of the majority bits;

(j) coupling said triple vote states to a triple vote state bus having a plurality of lines equal in number to the number of said devices;

(k) transferring states on said triple vote state bus to said common output bus in sequential fashion along with the transfer of states on said single bit vote bus and said bounce bus.

34. The method of claim 32 further comprising the steps of:

(i) generating a triple bounce state when a majority of the bounce states for a given device and generated in step (c) are in a given state, the triple bit bounce state being the same state as the state of the majority bits;

(j) coupling said triple bit bounce states to a triple bit bounce state bus having a plurality of lines equal in number to the number of said devices; and (k) transferring states on said triple bit bounce state to said common output bus in sequential fashion along with the transfer of states on said vote bus and said bounce bus, 35. The method of claim 32 further comprising the steps of:

(i) comparing the states on the common output bus with the states applied to said vote bus; and (j) generating a fault condition when at least one of the states of associated lines of said output bus and said vote bus do not agree, 36. The method of claim 32 further comprising the steps of:

(i) transferring the data on said vote bus and on said bounce bus in sequential fashion to a transmitter bus; and (j) transmitting data presented to said transmitter bus in serial fashion to a transmitter output line.

37. The method of claim 32 further comprising the steps of:

(i) testing the vote bus and output bus by presenting first state to all lines of said vote bus;

(j) transferring the states of said vote bus to said common output bus; and (k) determining the presence of a fault condition when at least one line of the output bus is not at said first state.

38. The method of claim 32 further comprising the steps of:

(i) presenting different states to different lines of said vote bus;

(j) transferring the states of said vote bus to said common output bus; and (k) determining the presence of a fault condition when at least one line of the output bus does not compare with an associated line of said vote bus.

39. The method of claim 32 further comprising the steps of:

(i) testing the vote bus by presenting given states at inputs of said vote bus;

(j) comparing the states at outputs of said vote bus associated therewith; and (k) generating a fault condition when at least one of the comparisons performed during step (j) fails.

40. The method of claim 32 further comprising the steps of:

(i) sequentially testing the vote bus and bounce bus by presenting given states at inputs of said vote bus and bounce bus;

(j) comparing the states at outputs of said vote bus associated therewith and outputs of said bounce bus associated therewith; and (k) generating a fault condition when at least one of the comparisons performed during step (j) fails.

* * * * *